United States Patent [19]

Benson et al.

[11] Patent Number: 4,682,261

[45] Date of Patent: Jul. 21, 1987

[54] PRODUCTION CONTROL SYSTEM, ESPECIALLY FOR GARMENT MANUFACTURE

[75] Inventors: Keith Benson, Sheffield; John McCormack, Derbyshire, both of England

[73] Assignee: Production Control Information (PCI) Limited, England

[21] Appl. No.: 494,147

[22] Filed: May 12, 1983

[30] Foreign Application Priority Data

May 14, 1982 [GB] United Kingdom ................. 8214090
May 14, 1982 [GB] United Kingdom ................. 8214191

[51] Int. Cl.[4] .......................... G06F 1/00; G06F 15/46
[52] U.S. Cl. ................................. 364/468; 340/310 R
[58] Field of Search ... 364/468, 469, 470, 200 MS File, 364/900 MS File; 340/310 R; 363/19

[56] References Cited

U.S. PATENT DOCUMENTS

| | | | |
|---|---|---|---|
| 2,791,739 | 5/1957 | Light | 363/19 |
| 2,854,614 | 9/1958 | Light | 363/19 |
| 2,854,615 | 9/1958 | Light | 363/19 |
| 3,072,837 | 1/1963 | Hakimoglu | 363/19 |
| 3,702,961 | 11/1972 | Erickson | 363/19 |
| 4,084,219 | 4/1978 | Furakawa | 363/19 |
| 4,102,492 | 7/1978 | Gold et al. | 364/468 |
| 4,139,737 | 2/1979 | Shimada et al. | 340/310 R |
| 4,228,422 | 10/1980 | Perry | 340/310 R |
| 4,246,634 | 1/1981 | Purol | 363/19 |
| 4,263,643 | 4/1981 | Koike | 363/19 |
| 4,272,758 | 6/1981 | Giraud | 340/310 R |
| 4,272,805 | 6/1981 | Iguchi | 363/19 |
| 4,283,759 | 8/1981 | Koiki | 363/19 |
| 4,314,350 | 2/1982 | Toy | 364/740 |
| 4,327,404 | 4/1982 | Horiguchi | 363/19 |
| 4,340,880 | 7/1982 | Baumann | 340/310 R |
| 4,348,582 | 9/1982 | Budek | 340/310 R |
| 4,408,291 | 10/1983 | Gunzberg et al. | 364/900 |
| 4,467,406 | 8/1984 | Hattori | 363/19 |

OTHER PUBLICATIONS

Z-80 *Microcomputer Design Projects,* William Baiden, Jr., 1981.

*Primary Examiner*—Jerry Smith
*Assistant Examiner*—Allen MacDonald
*Attorney, Agent, or Firm*—Hall, Myers & Rose

[57] ABSTRACT

A production control system is provided, especially for use in a works environment, in which a microsequencer controlled by a Z80 microcomputer board (MUXC) performs continuous high-speed scanning of a multiplicity of operator input devices (OIDs) located at the work stations of individual human operatives. The microsequencer is essentially a single-level pipelined microprocessor communicating with the OIDs via channels and sub-channels, each OID being connected to a respective sub-channel by a single twisted-pair cable. The cable lines are maintained at 24 volts d.c. to supply power to the OID, and the OID, which has a card-reader for reading bar code on cards or tickets passed through it by the operative, transmits data to its sub-channel, and hence the microsequencer, over the same cable by shorting out the two cable lines for short and long pulse periods. The microsequencer checks the validity of each read and responds to the OID to indicate a good read or otherwise—this response is sent in a morse-type code to audio and visual responders in the OID by temporarily reversing the polarity of the same two lines of the communicating cable. The Z80 microcomputer loads microcode into the microsequencer and thereafter supervises the scanning and data-reception and checking functions. Good reads are stored in short-term storage in the MUXC and can be transmitted to up-date the data base of a host minicomputer. Serial link communication between the MUXC and the host computer is via channels incorporating adapters having optical isolating devices to ensure compatibility and satisfactory transmission over distances in a factory environment.

20 Claims, 21 Drawing Figures

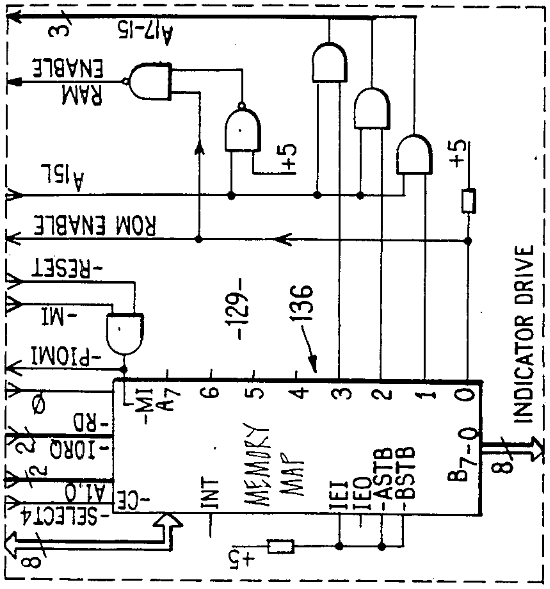
FIG.8E
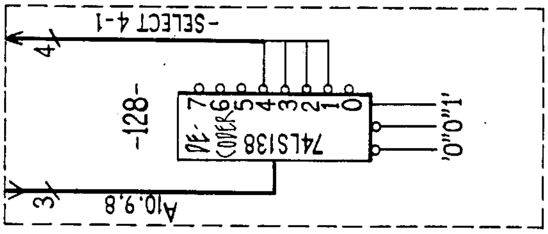
FIG.8D
FIG.8J
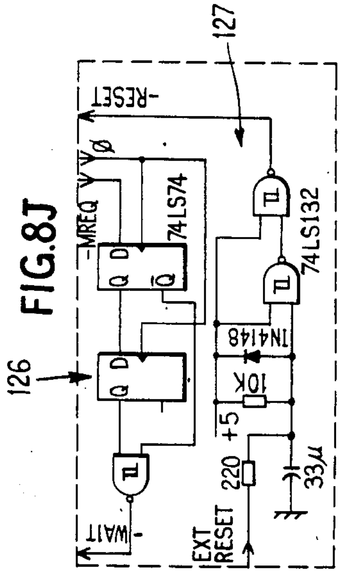
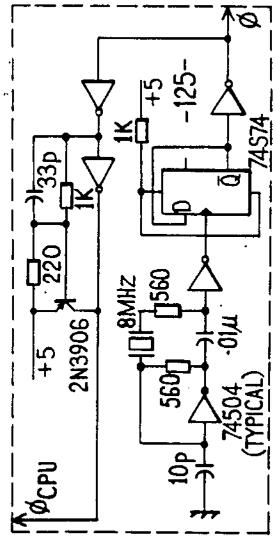
FIG.8C

PRODUCTION CONTROL SYSTEM, ESPECIALLY FOR GARMENT MANUFACTURE

This invention relates to a production control system for on-line control of factory operations and, in particular but not exclusively, to the control of various functions in a garment manufacturing factory.

In today's operating conditions, clothing manufacturers need to maintain tight controls over both factory costs and their investment in stocks and work-in-progress, if their business is to survive. Whilst clothing companies have generally become much more complex to organise and operate over recent years, the tools provided to assist management and supervision in the control of factory operations have not changed dramatically.

One object therefor of the production control system disclosed herein is to provide real-time control of major functions in a garment manufacturing factory, such as production planning, production scheduling, factory loading, factory progress control, section/line balancing, work-in-progress level control, and gross payroll and labour cost control. Whilst existing systems report historically on what happened in the factory yesterday, the aim of the on-line production control system now to be disclosed herein is to achieve up-to-the-minute control of manufacturing operations so that corrective action can be taken to prevent potential problems occuring in the future.

According to one aspect of the present invention there is provided a production or work control system for a works environment, comprising a multiplicity of operator input devices (OIDs) situated at the work stations of human operatives and each having a card reader; and a multiplexor/concentrator consisting of the combination of a microcomputer and a microprocessor, the microprocessor comprising a microsequencer repeatedly scanning the OIDs in a continuous operation to acquire data therefrom which is passed to the microcomputer, the microcomputer carrying out validity checking on the data input from the OIDs by the microsequencer, storing good data in short-term store and returning to the microsequencer signals indicative of the validity or otherwise of each data input consequent upon a card reading at an OID, the microsequencer returning to the individual OIDs the signals indicative of the validity or otherwise of their data inputs, and the microcomputer having input and output ports for communication with a host computer, such as a minicomputer.

The microprocessor/microsequencer may be a bipolar bit-slice microprocessor of the single-level pipelined type driven by writeable microcode. The microcomputer may be a Z80 computer board.

According to another aspect of the invention there is provided an operator input device (OID) for use in a system of production or work control, comprising a card reader for scanning a card or ticket bearing encoded data when said card is placed in the card reader and generating electrical signals representative of said encoded data, a cable for supplying low-voltage external electrical power to the OID over a pair of electrical lines, pulse train-generating-circuitry responsive to the card reader output signals to derive a stream of pulses of at least two different durations representing the encoded data, said pulse train-generating-circuitry taking its electrical supply from said pair of lines, and short-circuiting means powered from said pair of lines and responsive to said stream of pulses to substantially short together said lines for a succession of time periods corresponding to the time durations of said pulses, whereby the data from the card or ticket is transmitted by the OID on the same cable pair as supplies the OID with its electrical power.

The short-circuiting means may be driven by an optical isolator having a radiation emitter to which said stream of pulses is applied, and a receiver responsive to the radiation from said emitter and electrically isolated therefrom, such as by diodes.

In the preferred embodiment, each card or ticket bears two parallel bar code tracks, the first being a clock track of regularly spaced thin bars, and the second a data track having either a thick bar or a space opposite each thin bar bit of the clock track to indicate 'ones' and 'zeros', and the scanning means comprises a first emitter/receiver combination scanning the clock track and a second emitter/receiver combination scanning the data track. The OID includes two monostable circuits having different time periods to generate pulses of different widths, and logic circuitry responsive to the signals from the receivers of the scanning emitter/receivers to direct each clock bit to the triggering input of one or other of the monostable circuits according to whether the data track is simultaneously showing a bar or a space. The outputs of the two monostable circuits are gated together to provide the stream of pulses that is applied to the transistor feeding the light-emitting diode of the optical isolator. The OID further comprises audio and/or visual response means which is energized by the external power supply cable when the polarity of the voltage on the cable line pair is reversed.

According to a further aspect, communication between the MUXC and a host minicomputer is established over a serial link including optical isolating devices. Power is transferred via a transformer.

The system can load the factory with an optimum style mix to maintain targetted production levels, whilst meeting customer delivery requirements. The level or work-in-progress can be maintained at the level required for efficient factory operation, and production orders can be systematically progressed so that they emerge completed into the warehouse in the minimum throughput time.

Much of the hardware used in the system to be described has been designed and built specifically for the needs of the clothing industry, but such hardware may be used in many other industries, particularly the OID as a means of inputting information relating to the human operative, his particular task and the operation to be performed in a computer processor (CPU).

An OID is mounted at each human operative's workplace and is used to read bar-coded operator cards, operation cards, and bundle cards submitted by the operative.

Each OID is connected to a data concentrator or multiplexor (MPX), which is microcomputer controlled. The MPX performs certain checks on data fed in from the OID's, then transmits the data for processing to the central computer system, which may comprise a minicomputer system, e.g. a Hewlett-Packard HP1000, with central processor, disk drive, visual display unit(s), printer and optional magnetic tape back-up.

Each human supervisor may have a terminal comprising a small visual display unit, which is connected to the central computer system and is used to input information to, or request data from, the computer.

The OID enables each operative to clock in and out, at the beginning and end of a day, thereby eliminating time wasting at traditional clocking station. The operative also used the device to notify the central computer of the operation currently being carried out and what job lot is currently being worked on. This enables the central computer to calculate gross payroll, fully automatically. The operative uses three kinds of card, a personal card with which he/she clocks in and out, an operation card, with which he/she indicates the operation he/she is performing, and a job lot card, which travels with each job lot through the factory and indicates on which job lot the operative is working.

The supervisor terminal, which is of the television type, has a keyboard by means of which the supervisor can call up information as to how much work each operative has done that day and at what rate he/she is working, also information as to where each job lot is in the factory, and information on how much work is waiting at each operator station, to enable the supervisor to balance the work flow through the factory much better. Also, on the screen, he/she can obtain accounting reports showing all off-standard work and operator down-time on his/her section, by operative, by time and by cost.

The whole system is real time, which means that any time a supervisor enquires for information it is up to date.

The system also allows for a whole series of problem types to trigger warning signals at the supervisor's terminal, such as production at a certain operation falling below the minimum rate per hour or a particular machine being broken down for more than a certain time or the pile of work at any particular station rising above a critical level.

Arrangements according to the invention will now be described by way of example and with reference to the accompanying drawings, in which.

Figure 3:
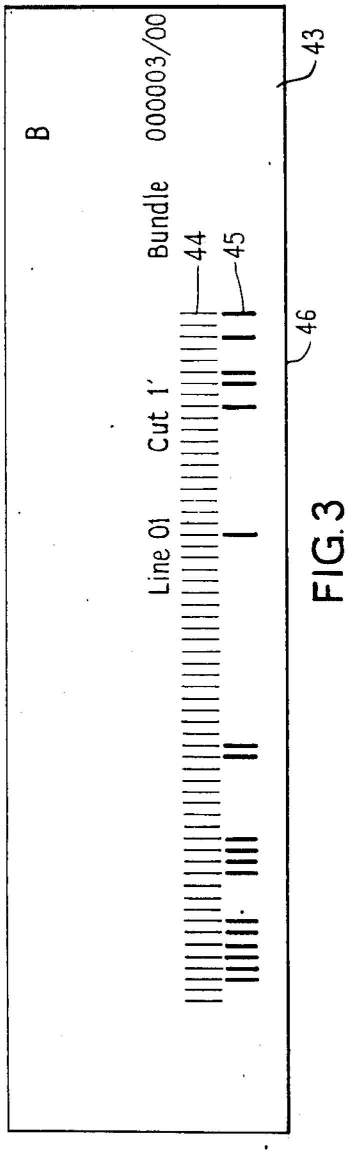
Figure 7:
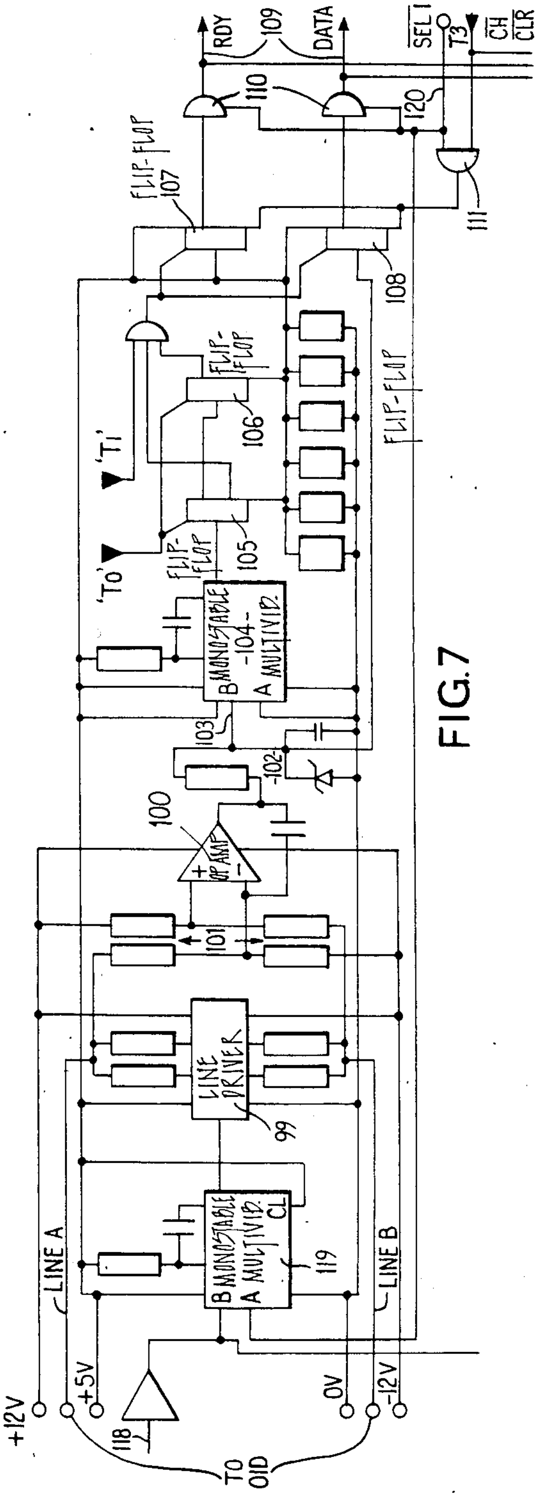
Figure 4:
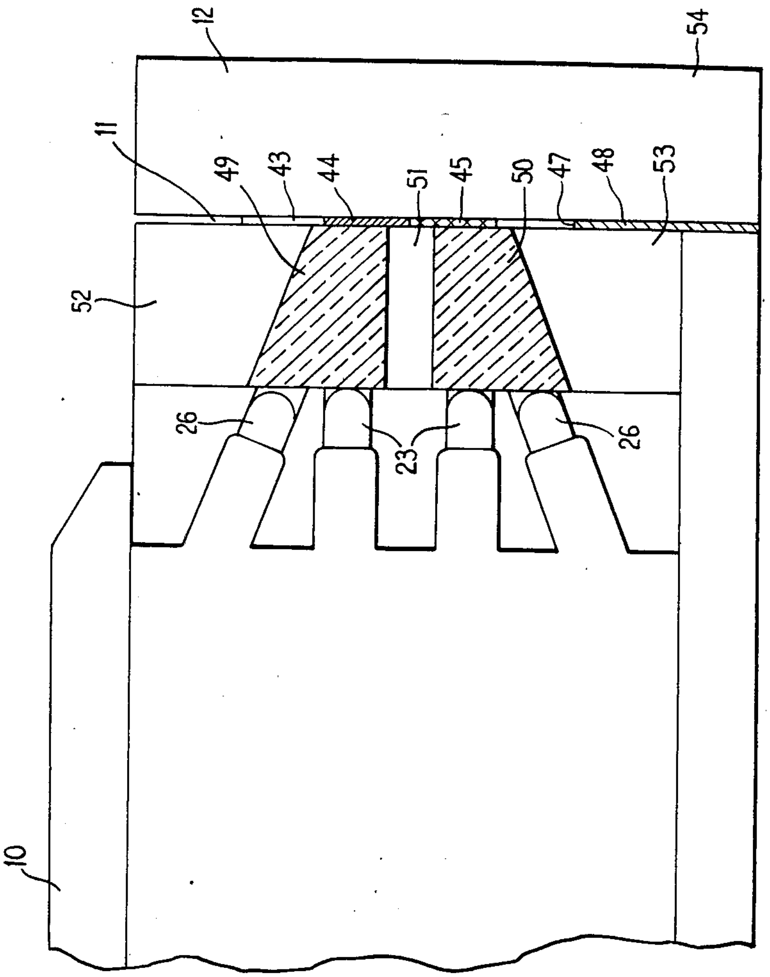
Figure 5A:
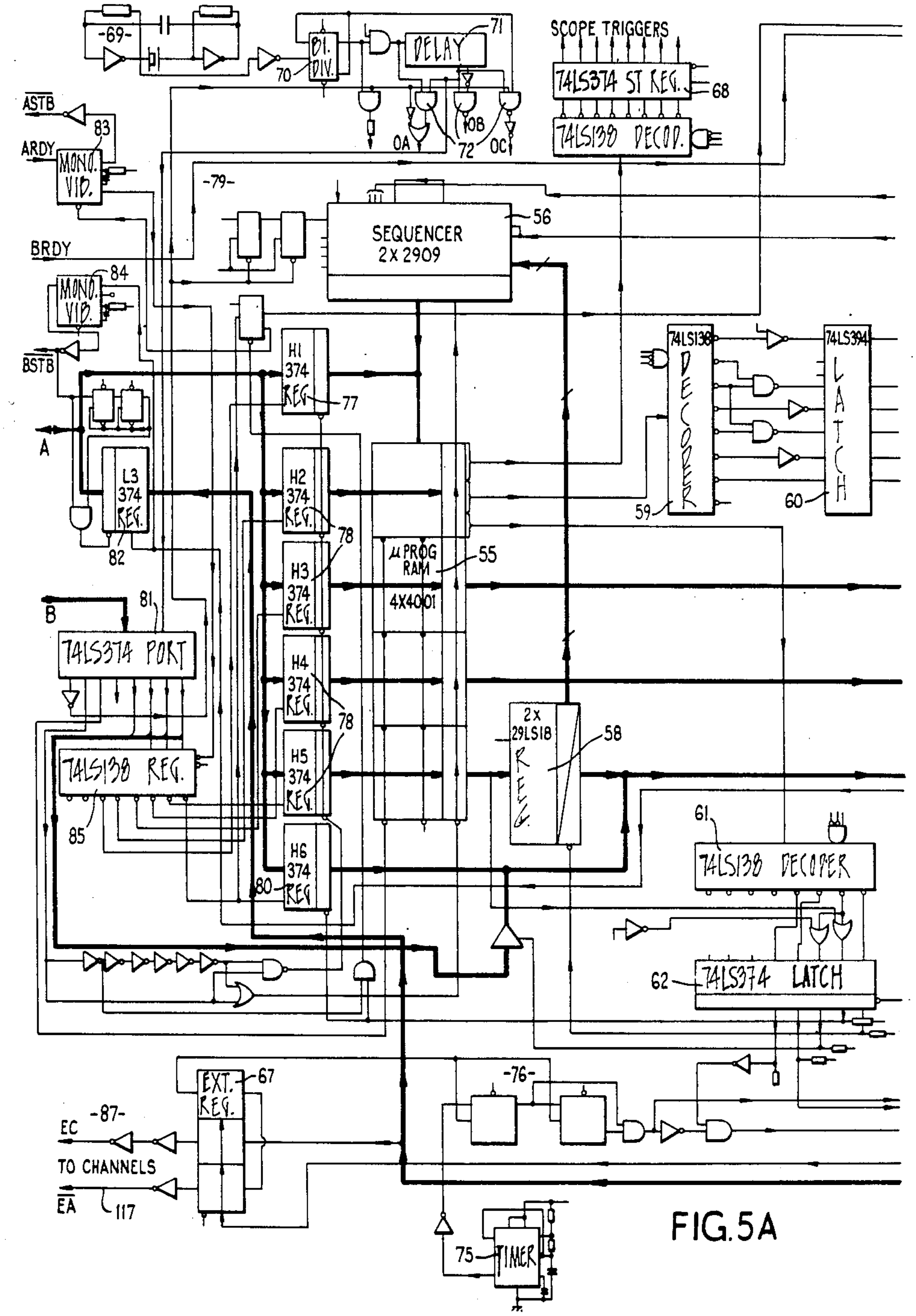
Figure 5B:
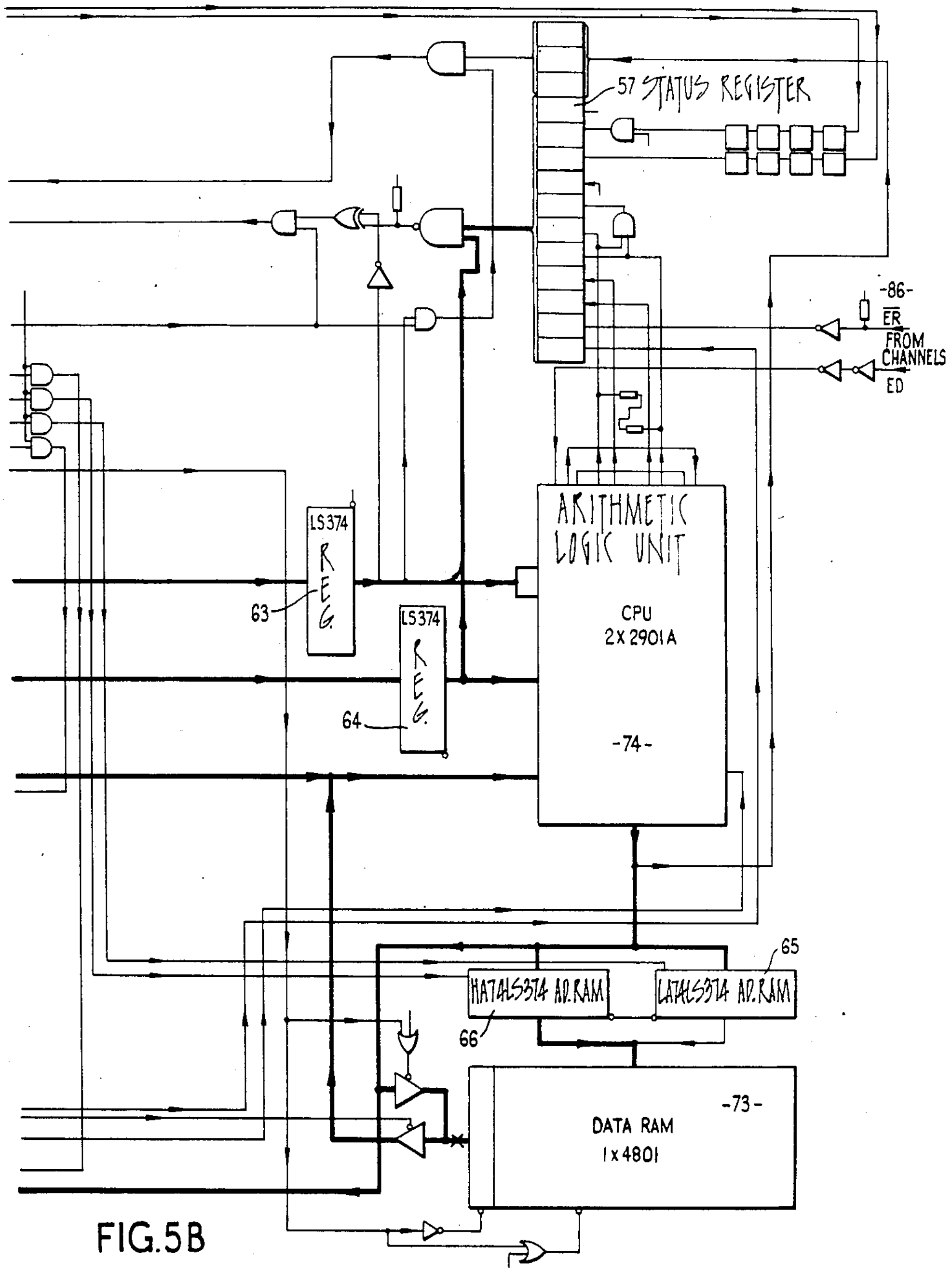
Figure 6:
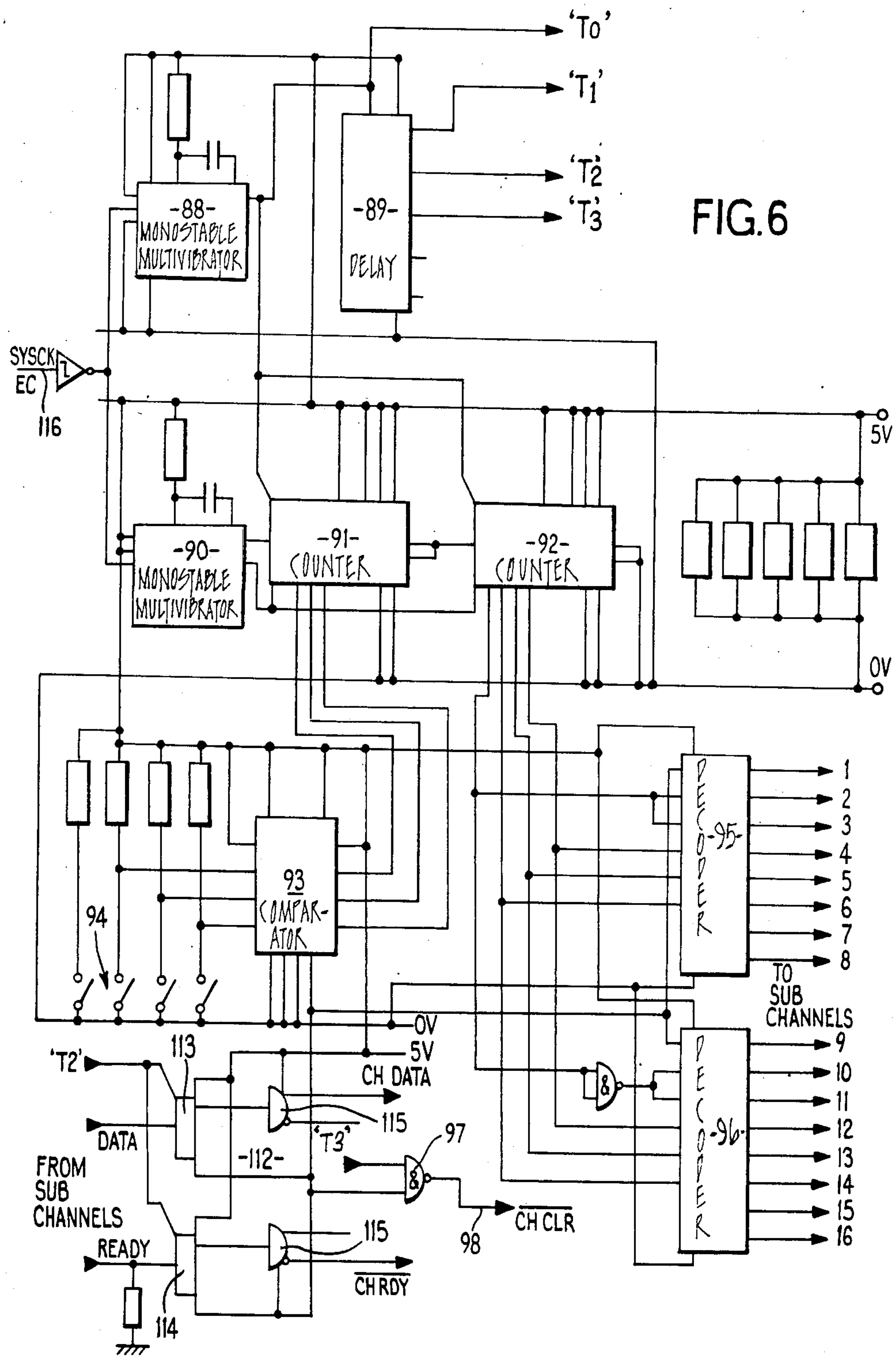
Figure 8B:
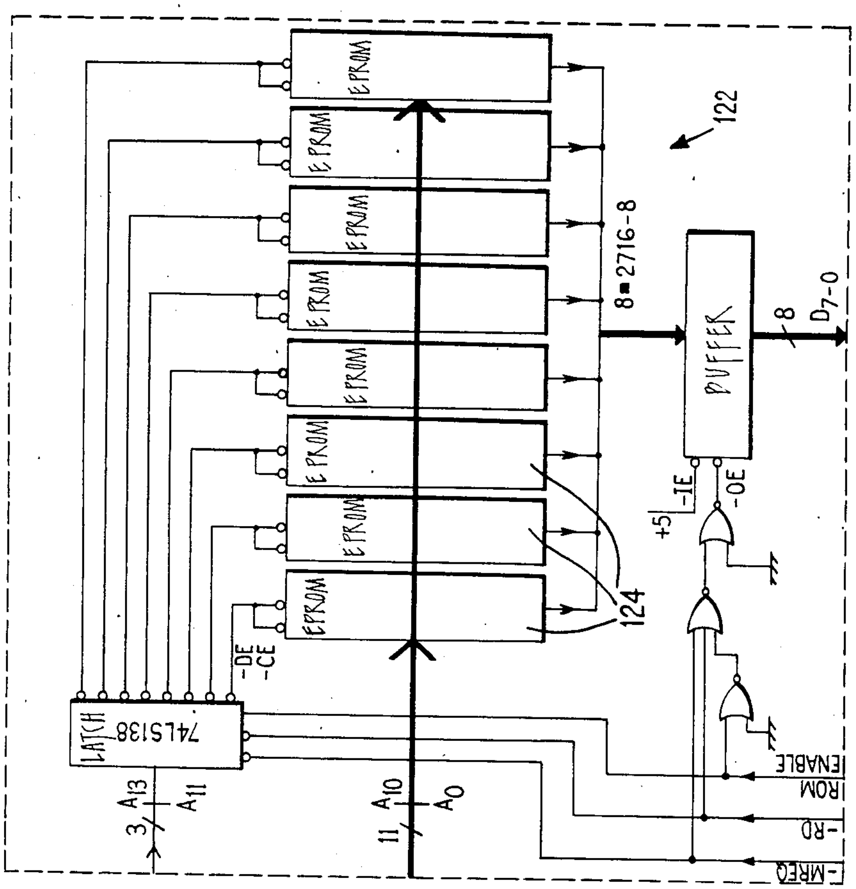
Figure 8A:
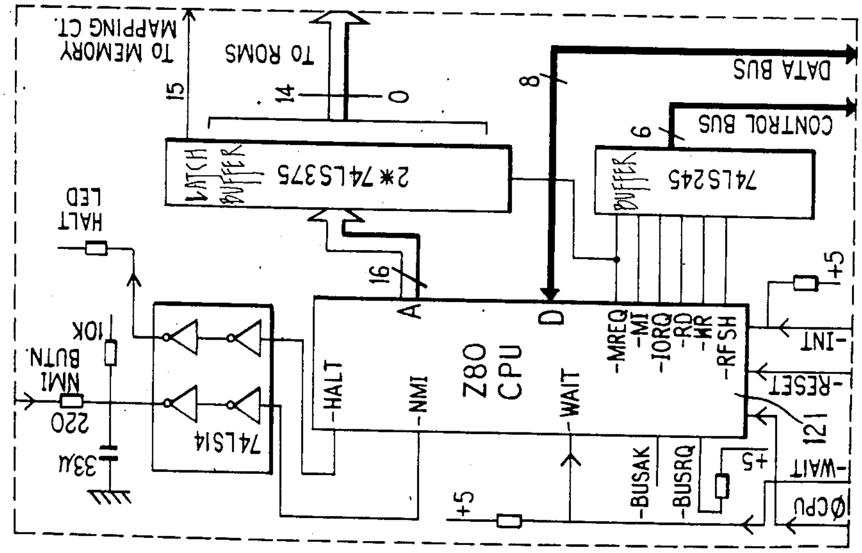
Figure 8F:
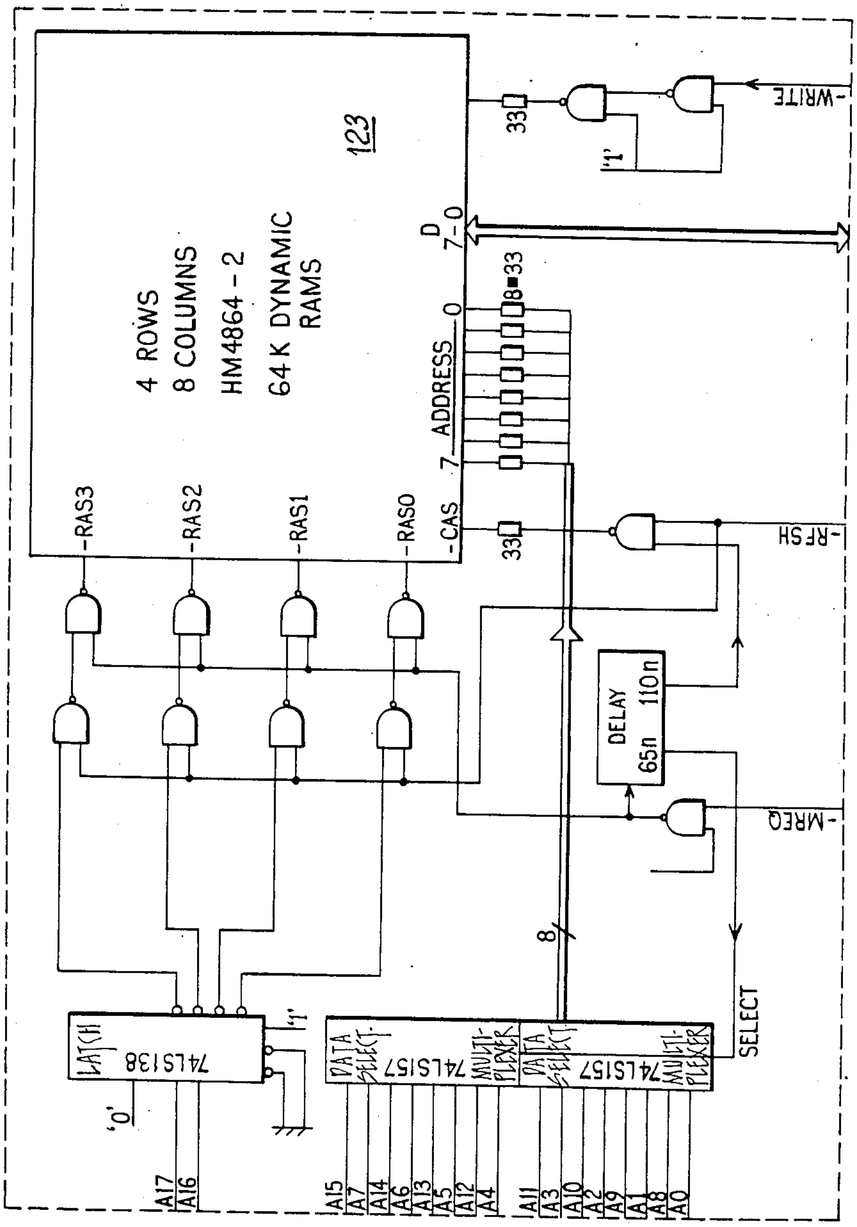
Figure 8I:
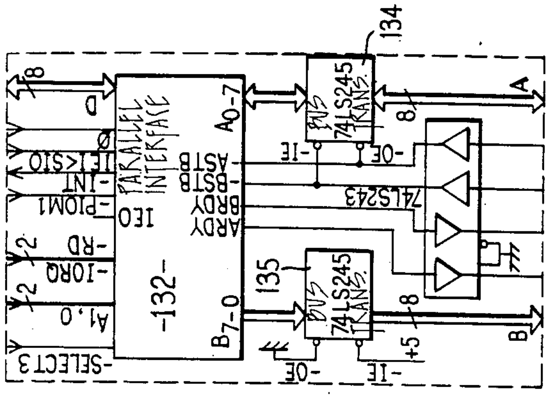
Figure 8H:
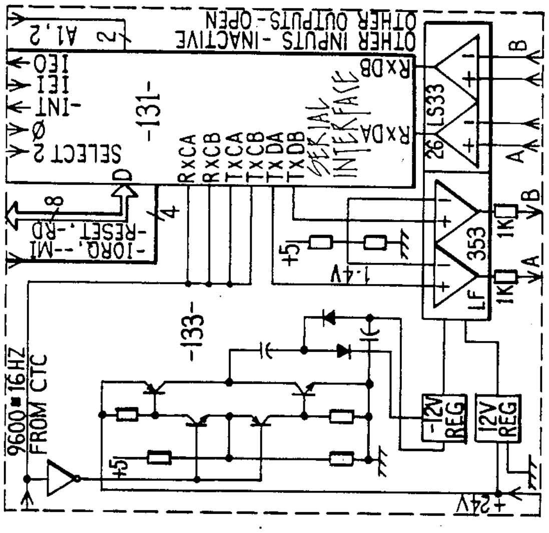
Figure 8G:
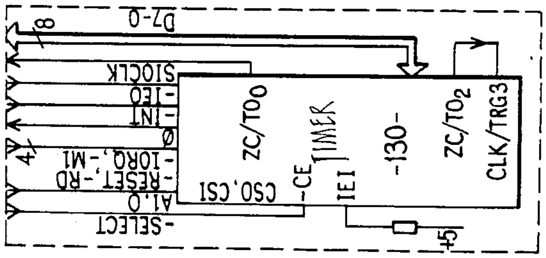
Figure 9:
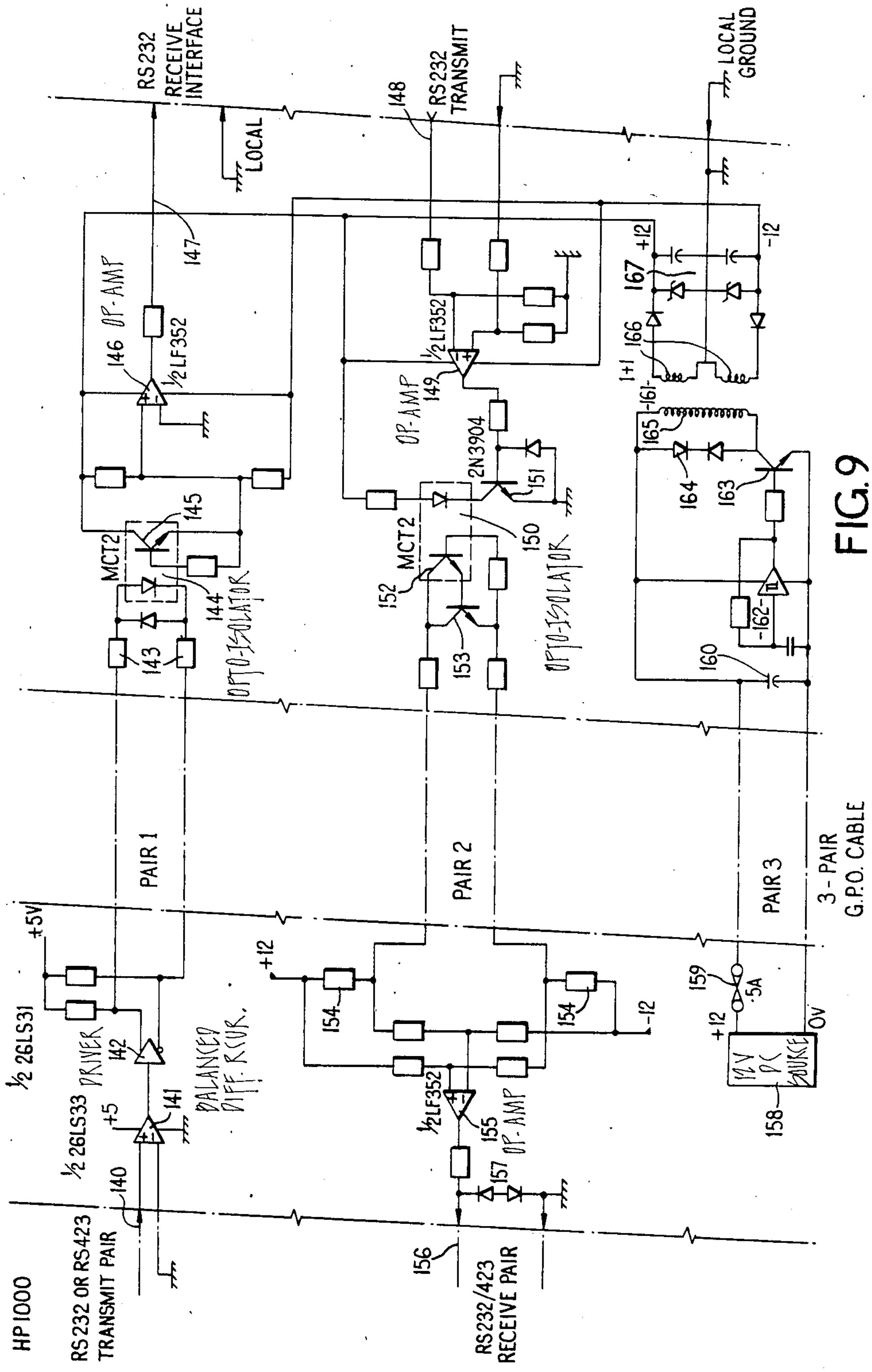
Figure 10A:
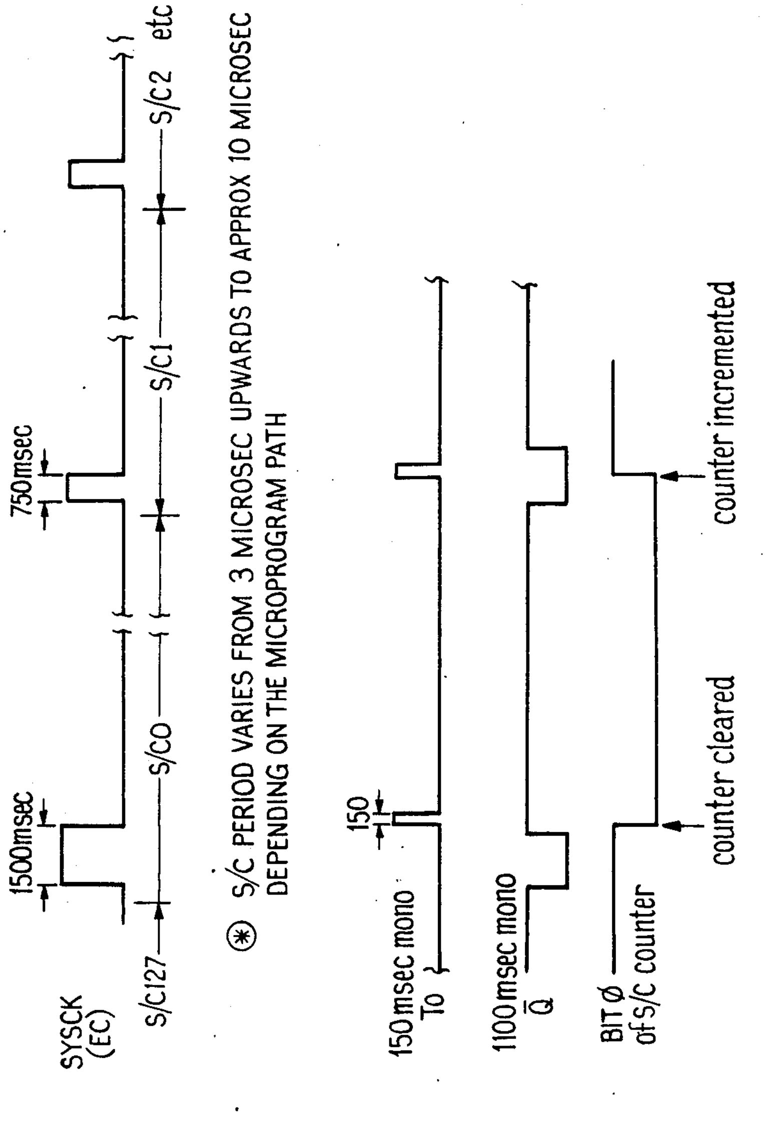
Figure 10B:
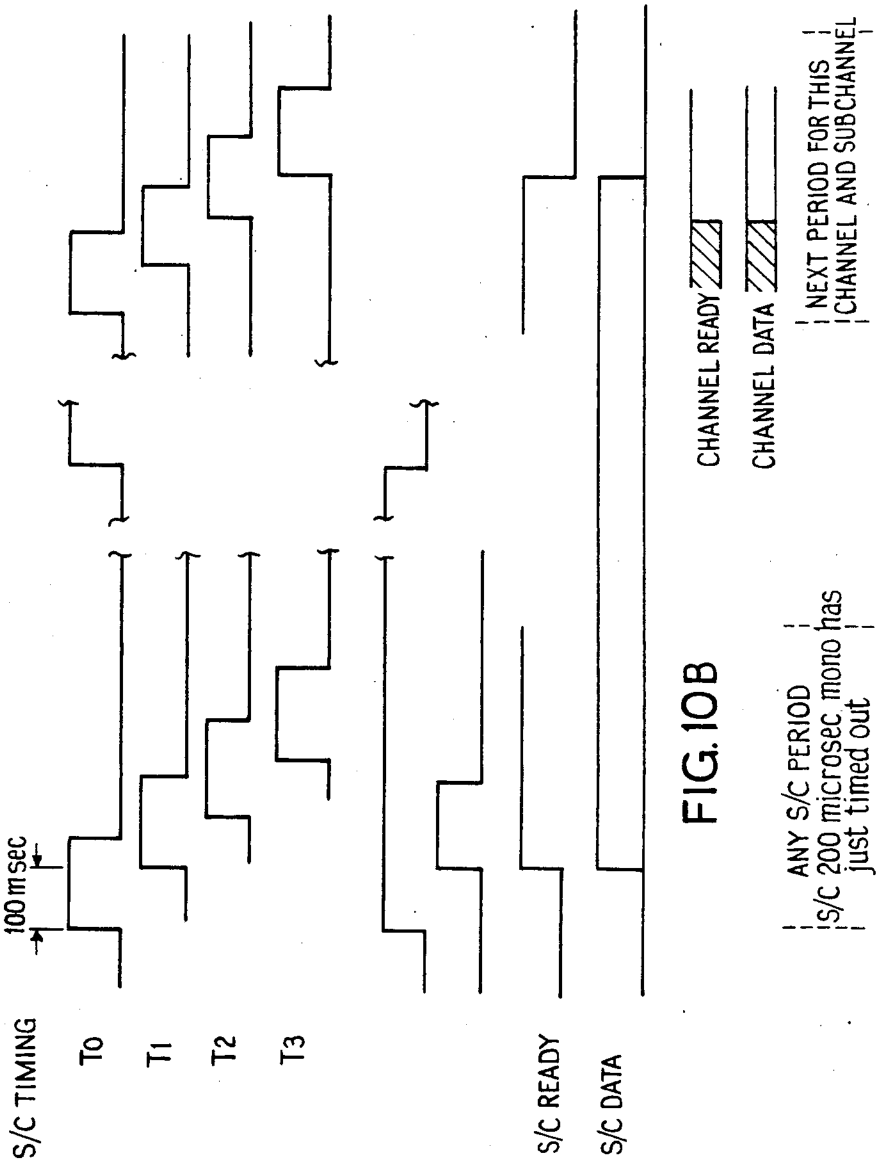

FIG. 3 shows a bar-coded card of the type to be read by the card reader of the Operator Input Device, FIG. 4 is a diagram showing an arrangement of emitters and receivers for scanning a card in the card reader, FIGS. 5A and 5B are a circuit diagram of a microsequencer for scanning Operator Input Devices and receiving and responding to data inputs therefrom, FIG. 6 is a circuit diagram of one of eight channels whereby the microsequencer communicates with the Operator Input Devices, FIG. 7 is a circuit diagram of one of a multiplicity of subchannels whereby each channel as shown in FIG. 6 can communicate with a group of Operator Input Devices, FIGS. 8A to 8I are circuit diagrams of blocks of a Z80 microcomputer board which has overall control of the microsequencer of FIGS. 5A and 5B and interfaces with a host minicomputer, FIG. 9 is a circuit diagram of isolating adapter circuitry whereby the Z80 microcomputer of FIGS. 8A to 8J interfaces with the host minicomputer, and FIGS. 10A and 10B are timing diagrams for the channels and subchannels of FIGS. 6 and 7.

OPERATOR INPUT DEVICE (OID)

The operator input device is driven from a multiplexor concentrator MUXC. The device reads optical bar-code produced elsewhere by software driving a standard HP2631B printer. The OID reads a bar data and clock track and sends the results to a MUXC. The MUXC communicates back the status of the read to the OID which in turn, by an audio/visual response, communicates to the operative.

MULTIPLEXOR/CONCENTRATOR (MUXC)

This device comprises two microprocessors (a microsequencer or bit slicer and a Z80 Computer board). A combination of microcode and firmware allows data from up to 128 OID's to be temporarily stored for up to eight hours in memory as back-up to the data being transferred to an HP1000E central computer where the data is permanently stored and updates a data base. The data base provides information in real-time to terminals on the shop floor.

COMMUNICATION CHANNELS

The data transfer between the MUXC and the central computer is via isolating adapter circuitry allowing RS423 protocol to interface with RS232 protocol.

Data transfer between the MUXC and the OIDs, and power supply from the MUXC to the OIDs, is by a system of channels and sub-channels.

Software for the above hardware includes the following.

MICROSEQUENCER SOFTWARE

Microcode is provided for the microsequencer or bit slicer to enable it to scan the OIDs and respond to the data inputted from the OIDs.

Z80 SOFTWARE

The Z80 software includes a program for loading the microcode into the microsequencer and a main program enabling the Z80 to control the entire operation of the MUXC.

Figure 1:
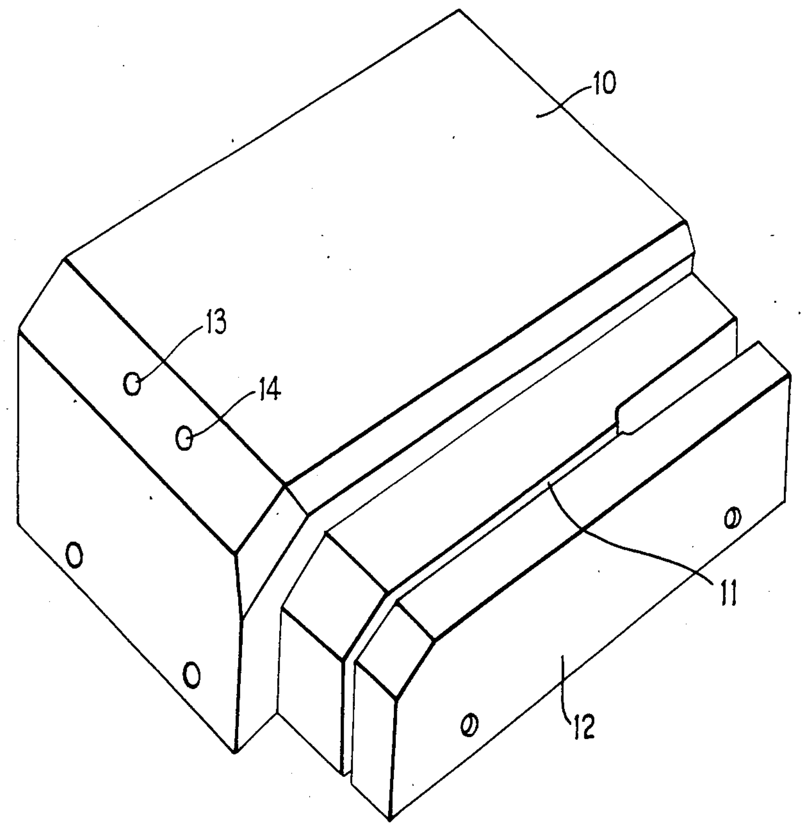
FIG. 1 is a pictorial view of an Operator Input Device with a card reader.
Figure 2A:
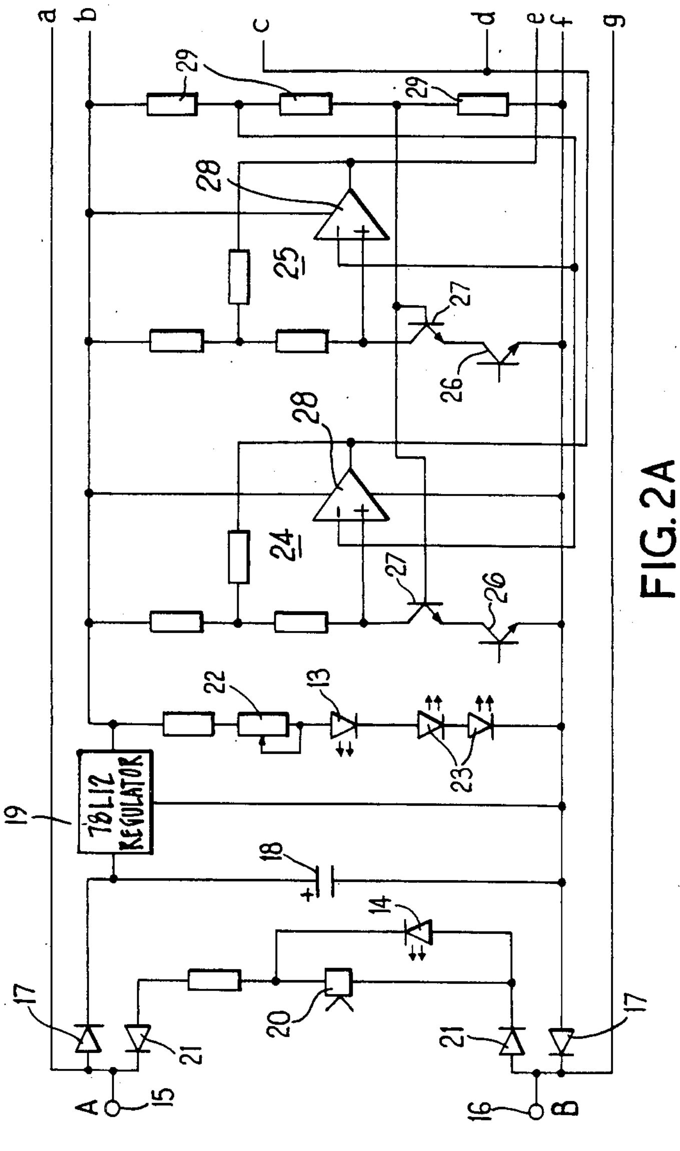
FIGS. 2A and 2B are a circuit diagram of the Operator Input Device.
Figure 2B:
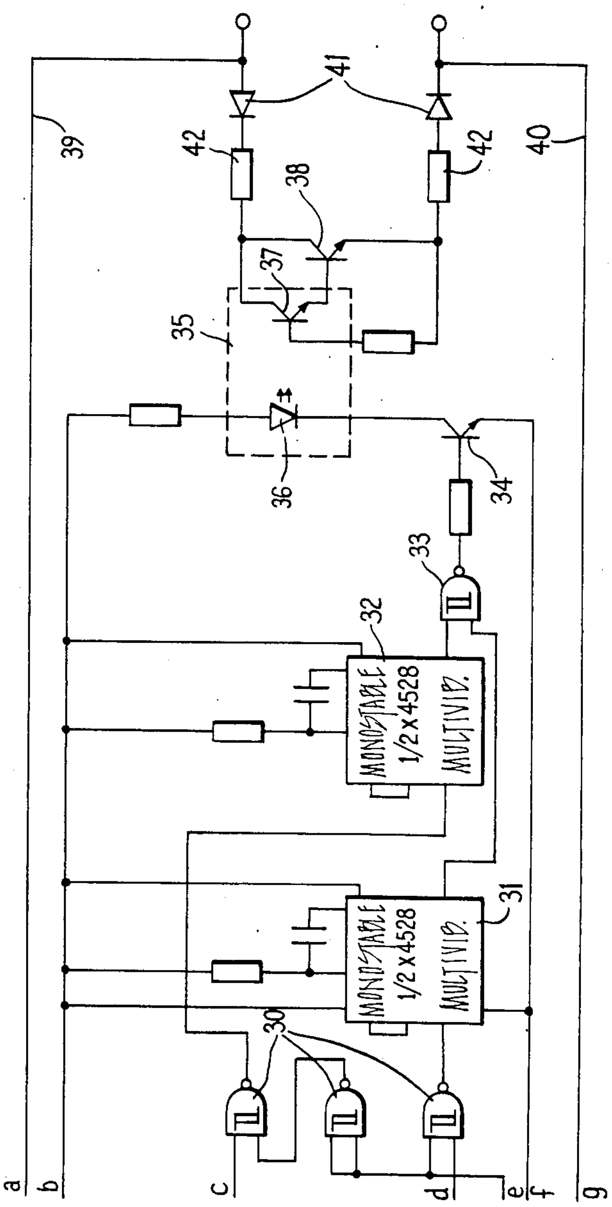

Considering now the operator input device (FIG. 1), this appears externally as a box 10 with a side reader 12 presenting a card-reading slot 11, green and red signal lamps 13, 14 in the form of light-emitting diodes being provided on the box front. A single twisted pair cable provides the link between the OID and the MUXC, carrying both data signals between the OID and the MUXC and a 24 volt power supply from the MUXC to the OID. As already indicated, the MUXC can sustain up to 128 OIDs. The OID box 10 contains a single printed circuit board.

There are three data types entered via the OID, they are:

Employee (Operative) Identification
Operation (Work) Identification
Work Unit (Job Lot) Identification The OID itself has no ability to operate on the different types but merely detects and sends the detected signals to the MUXC.

When the power is on, the green lamp 13 is let and stays on constantly showing the OID is in working status. When a card is passed through the reading slot 11 the data is read and passed to the MUXC where it is checked for three possible states. One of these states is returned to the OID where both an aural signal and a visual signal via the red lamp 14 are emitted.

The three states returnable to the OID are:

1. Good Read

If the read is accepted without physical or logical error then a single aural tone and a single red lamp pulse are caused to be emitted from the OID. The operative can then return to his/her work.

2. Good Read but Logical Error

The system is designed so that an operative (employee) identification and the type of work (operation) must have been input in that order before any work (job lot) ticket can be passed through the reader and be accepted, i.e.

| | SEQUENCE | | | | | | | |
|---|---|---|---|---|---|---|---|---|
| EVENT | A | | B | | C | | D | |
| EMPLOYEE | / | 1 | X | 2 | / | 1 | X | 3 |
| OPERATION | / | 2 | X | 1 | X | 3 | / | 2 |
| WORK TKT | / | 3 | / | 3 | X | 2 | X | 1 |

Any sequence other than 'A' will invalidate work ticket transactions thus preventing the operative from receiving a correct input good read as in (1) above. The red lamp and the aural bleeper will then return a series of six alternate long and short pulses to enable the operative to distinguish between a logical and a physical error.

3. Physical Error

A physical error is caused by a misread of the characteristics on the input card (any type). This may be caused by damage to the card, incorrect method of slotting the card through the reader or malfunction of the OID, though this latter is designed such that should it physically malfunction the green lamp 13 will be extinguished. In case of a physical error, a series of eight short regular pulses will be given by the aural bleeper and the red lamp.

When the OID reads a bar-coded card, the black to white contrast ratio on the bar card is detected by infra red detectors and converted to digital pulses of the correct width. Depending on the bar card read, the MUXC will respond back to the OID by sending a coded tone to identify a good read, or a physical or logical error.

The MUXC channel to which the OID is connected holds one line A at +12 volts through a 120 ohm resistor and the other line B at -12 volts through another 120 ohm resistor. This is the normal state of the circuit; when the MUXC channel wishes to acknowledge some form of read, the polarity is reversed which energises the audible bleeper and lamp in the OID. The standing current is about 20 mA so that a voltage of about 18 volts is available at the OID terminals. The OID itself generates signals by shorting the lines together for very short periods. A zero bit is indicated by a 100 microsecond pulse and a one bit by a 300 microsecond pulse. In fact, the lines are pulled to within about 4 volts of each other rather than a dead short.

Referring to FIGS. 1A and 1B, the OID circuit is as follows. The voltage applied across input terminals 15 (line A) and 16 (line B) is applied via line-isolating diodes 17 to a reservoir capacitor 18 which charges to about 16 volts (line less 2 diode drops). This supplies a 12 volt regulator 19 which powers the rest of the circuit, except for the audio unit 20 and red lamp 14 which during normal voltage on the terminals 15, 16 are isolated by diodes 21. A series chain includes a brightness-adjustment resistor 22 and three LED's, one of which is the green (ready) lamp 13 while the other two are infra-red LED's 23 which illuminate the clock and data tracks on the cards to be read. The data and clock tracks on a card, illuminated by respective LED's 23, are read by respective photo-transistors 26 the outputs of which are fed to respective identical circuits 24, 25. Each of the circuits 24, 25 comprises a cascode 27 and a MOSFET operational amplifier buffer 28. A resistor chain 29 provides bias to the cascodes and operational amplifiers of both circuits 24, 25. The operational amplifier 28 have a high output for black bars on the card being read.

The durations of the output bits of the OID are determined by a 300 microsecond monostable circuit 31 (one bit) and a 100 microsecond monostable circuit 32 (zero bit). By means of a three-gate logic circuit 30 the clock track signal output of the circuit 25 is switched by the data track signal output of the circuit 24 either to the monostable 31 to generate a one bit (data black) or to the monostable 32 to generate a zero bit (data white). White-to-black transitions on the clock track thereby trigger one or other of the monostables 31, 32. The outputs of both monostables are combined into a single pulse train at an OR gate 33, the output of which is applied to the base of a drive transistor 34 which drives an opto-isolator 35. The opto-isolator 35 consists of a photo-diode 36, in series with the transistor 34, and a photo-transistor 37. An output transistor 38 in Darlington connection with the photo-transistor 37 effectively shorts the lines 39, 40 via isolating diodes 41 and damping resistors 42.

Line polarity reversal at the terminals 15, 16 by the MUXC energises the audio bleeper 20, and also the lamp 14 in parallel with it, via the diodes 21, the remainder of the OID circuit then being isolated by the diodes 17.

FIG. 3 shows a typical bar-coded card 43 to be read by the OPI. The clock track 44 and the data track 45 are immediately one belowthe other, the clock track consisting of a horizontal series of evenly spaced thin vertical bars while the data track consists of thick bars irregularly spaced. The clock track contains 60 OR-signs and the data track provides a cursor-sign under a corresponding clock pulse where the data bit is a one. The bottom edge 46 of the card is a zero reference, and the data and clock tracks are printed between 4 mm up from the bottom and 17 mm from the bottom. The bar code tracks are printed by the HP2631B printer on comparatively thin white flexible sheet so that each card is in the form of a ticket that can, if it is a job lot card for example, be readily stapled to the work. The cards can be printed on sheet that is a number of cards wide and separated afterwards by guillotining.

FIG. 4 shows the scanning arrangement of emitters and receivers in the reader 12 of the OID 10. The zero reference edge 46 of the card 43 rests on the horizontal upper edge 47 of a shim plate 48 in the lower part of the card reader slot 11. The card is moved horizontally through the reader slot 11 from back to front of the reader. The two infra-red LEDs 23 illuminate the clock track 44 and the data track 45, respectively, and the two photo-transistors 26 receive, respectively, the reflections from those tracks. The photo-transistors 26 are angled obliquely in order to provide adequate space, and the clock track 44 and the data track 45 are scanned through respective wedge-form transparent blocks 49, 50 separated by an opaque body 51, further opaque bodies 52, 53 being situated above and below the transparent blocks. The portion 54 of the body of the reader 12 that lies on the side of the slot 11 remote from the emitters 23 and receivers 26 is removable, and is both opaque and non-reflecting.

Referring again to FIG. 3, the format for the bar code on each card (starting from the leading end as passed through the reader) is as follows (not each byte is read lowest significant bit first):

1. Four run-in bits: "1010"
2. One sync byte (ASCII 16hex): "01101000"=eight bits
3. Four data bytes sent MSbyte/LSbit first =thirtytwo bits
4. One error correction code (ECC) byte =eight bits
5. One parity byte=eight bits This makes up the total of sixty bits.

The sixteen bits devoted to the parity and ECC bytes for the detection and correction of errors gives good protection of the data having regard to the nature of the cards and the usage to which they are put.

As already stated, the multiplexor/concentrator (MUXC) comprises two microprocessors, a Z80 board and a microsequencer. The Z80 computer board controls the entire operation of the network multiplexer and interfaces with the host HP1000E minicomputer via a serial link. The microsequencer is located physically and functionally between the Z80 microprocessor and the operator input devices and is a bipolar bit-slice microprocessor driven by writeable microcode which scans 128 sub-channels in an endless sequence servicing the OIDs and buffering data bidirectionally between them and the Z80. The 128 sub-channels are grouped in fours, with four such groups of four (16 sub-channels) being serviced by each of eight main channel boards that are in turn serviced by the microsequencer.

The microsequencer (FIGS. 5A and 5B) is based on Advanced Micro Devices 2900-series integrated circuits. In essence it is a standard AMD 2901 single-level-pipelined microprocessor. The microprogram is organised as a 256 word by 32 bit array and is stored in the first quarter of a 4×MK4801 (Mostek 70 nanosecond 1k×8 bit static RAM) memory array 55. A microprogram sequencer 56 is 8 bits wide and consists of two 2909 chips in cascade. Only two sequencing modes are used: either sequential (S0=S1=0) or direct branch (S0=S1=1). The direct branch can be modified by three S-bits in a status register 57 to give an eight-way branch dependent on the state of a sub-channel as received at 86.

The microprogram word is decoded and is latched at the beginning of each clock cycle in various chips 58-64. Wherever a microword field is encoded (e.g. four 'data-in' paths encoded into bits 25/24) the decoder chip (e.g. 61) is upstream of the latch (e.g. 62) to increase speed. The microwords designate either a Branch or an ALU (Arithmetic Logic Unit 74) instruction cycle according to the value in a 'data-out' (D-out) field (bits 28-26). If these bits are all ones (indicating a Branch instruction) the microprogram either branches or continues depending on:

a. whether or not there is at least one status register bit under a 'one' in a mask field (bits 18-8) having the value 'one'. The 11-bit status register is logically AND-ed with the 11-bit mask field and the resulting eleven bits are OR-ed together.

b. The condition of an R-bit (21). If zero the branch is taken for any 'one' under the mask, otherwise the sense of the branch is reversed.

c. The condition of an S-bit (20). If 'one' the contents of the S-bits in the status register are OR-ed into the branch address to give an eight-way branch.

The branch address is taken from a D-field (7-0) in the microinstruction. The I-field (ALU instruction) is always zero (NOP) for Branches so that the ALU does not alter any registers etc. The D-in field is immaterial for Branch instructions.

If the D-out field is not all ones an ALU instruction is indicated; however, in this case bit 16 is always 'one'. The corresponding reduction of the I field from nine to eight bits results in a much more convenient arrangement for assigning the microword bits. If the I-field designates input from the D-inputs this is obtained from one of four sources as indicated by the D-in field (bits 25, 24). These are:

0—data field in microinstruction (bits 7-0)
1—Z80 Computer Parallel output (i.e. microsequencer input from controlling computer)
2—Data RAM 73 with ALU 74 carry-in zero
3—Data RAM with ALU Carry-in zero for a timer cycle, one otherwise.

Near the end of the microcycle (t=200 nsec) the ALU 74 output is strobed into the destination designated by the D-out field as follows.

0—None
1—Data Ram 73
2—Z80 Parallel input (i.e. microsequencer output to controlling computer)
3—Low-order RAM address register 65
4—High-order RAM address register 66
5—Low-order RAM address AND external (E) register 67 outputting to the channels and sub-channels
6—E register 67 alone
(7)—(Branch instruction)

The high-order three bits (31-29) of the microinstruction are latched in a 'Scope Trigger' register 68. This is for diagnostic trace purposes only.

The clock is a standard 8 MHz oscillator 69 followed by a binary divider 70 producing a 4 MHz square-wave (the basic clock pulse). This feeds a delay line 71 with five 50 nanosecond taps, and decoders 72 produce three subsidiary clock pulses. With reference to the basic clock (CP) rising at t=0 and falling at t=250, these subsidiary clocks are as follows:

OA—rises 0, falls 25. Disables the Data-in paths momentarily to avoid bus contention.
OB—falls 150, rises 200. Activates Data RAM write enable pin.
OC—rises 200, falls 250. Clocks Data-out registers.

All clock signals are disabled when bit 7 of the Z80 output port PIOB is 'one'.

A timer 75 is a free-running LM555 oscillator operating at about 16 Hz. It is synchronised with the microsequencer scan by a circuit 76 and the microprogram so that the T-stat is 'one' for exactly one complete cycle every 1/16th of a second.

During the microcode initialisation cycle a register 77 is connected to the address lines of the microcode array and four registers 78 (32 bits) to the data lines. Z80 software loads each of the five registers for each microword, finally strobing the array write line to write the word into the array. Ports A and B (Z80 computer) are the data and control/address ports for this operation. After microcode load bit 6 of port B is set zero which disconnects the above arrangement and establishes the normal pipelined data flow. Subsequently bit 7 of Port B is set zero which enables the clock pulses. A circuit 79 ensures that the microprogram starts cleanly at address zero.

In normal operation the port 81 addresses register 80 via register 85 for the routing in of Z80 data from port A. Register 82 is used in the routing of data out to Z80. Monostables 83 and 84 provide A and B strobe pulses for the timing of port A handshakes which are bidirectional.

A listing of the microcode for the microsequencer of FIGS. 5A and 5B is appended to this specification as Appendix I.

The program operates in an endless cycle scanning sub-channels 0 to 127 decimal. The board contains an eight byte work area for each sub-channel and this is initially formatted by the reset function. Each work area contains the current state, the current time-out value and the current byte and bit count for the sub-channel. All slots are initialised to State—0
Time-out—15
Byte (cell)—2
Bit—0

The cycle starts at location zero.

If the reset line (from Z80) is true a branch is taken to the reset routine.

The sub-channel counter is incremented and the clock line (to channels) is activated. (If the sub-channel is zero this pulse is extended and the T-stat is set if this is a timer cycle).

The state of the sub-channel is used to give an immediate branch to the entry point in the microcode for the current state.

The sub-channels move individually through the states as follows.

State 0—Idle:
Enter from reset. Leave to state 1 on OID request.

State 1—Reading for SYN character:
Enter from state 0. Leave to State 2 on detecting SYN character. Leave to state 3 on time-out.

State 2—Reading data:
Enter from state 1. Leave to state 3 on receiving last data bit or on time-out.

State 3—Ready for transfer to Z80:
Enter from states 1 or 2. Leave to state 4 when Microsequencer—Z80 path is free.

State 4—Transferring data to Z80:
Enter from state 3. Leave to state 5 when nine bytes (sub-channel address and eight byte work area) have been transferred.

State 5—Waiting for acknowledgement from Z80:
Enter from state 4. Leave to state 6 when Z80 has sent back the acknowledge code and morse code signal has been built in the work area.

State 6—Acknowledging to OID.
Enter from state 5. Every timer cycle the next bit of the morse code is played out to the OID. Leave to state 7 when all the code bits have been sent.

State 7—Enter from state 6. Leave to state 0 after selectively resetting the sub-channel work area.

Note: States 4 and 5 are exclusive to a single sub-channel at a time. All other states are shareable.

FIG. 6 shows the circuit of one of the eight channel boards that serve as interfaces between the microsequencer of FIGS. 5A and 5B and the Operator Input Devices (via the sub-channels). Each channel has its own unique channel address (bits 0–7), set on switches on the board, and can support up to sixteen sub-channels. Each sub-channel in turn supports one OID.

The microsequencer controls the channel timing (FIGS. 10A and 10B) via a backplane line (SYSCK-/EC) inputting to the channel at 116. The microprogram causes this line to carry a stream of pulses each one occurring at the start of a sub-channel period. At the start of sub-channel zero's period this pulse, normally 750 nsec, is extended to 1500 nsec. Each full cycle is 128 sub-channels in length.

At the trailing edge of each clock pulse a monostable 88 is fired producing a pulse of approx 150 nsec which is passed down a delay line 89 with 100 nsec taps. The original pulse and the first three delayed pulses are denoted T0, T1, T2 and T3 respectively. A second monostable 90 (period 1100 nsec) is fired by the leading edge of the clock pulse and a seven-bit counter 91, 92, clocked at T0, is cleared if this monostable has timed-out and incremented if it has not. The effect is that the counters on all channels keep in step with the microsequencer.

The high-order three bits of the seven-bit counter are compared in a comparator 93 with the address set by the address switches 94. An equal condition means that this channel is selected and this activates the sub-channel decoder 95, 96. The same signal is ANDed and 97 with T3 to provide the 'Channel Clear' (CHCLR) signal at 98.

The sub-channel decoder 95, 96 drives one line per sub-channel to select the sub-channel according to the low-order four bits of the counter 91, 92.

The basic sub-channel circuit is shown in FIG. 7. Line driver circuit 99 is simply a bilateral switch which in the normal condition (input low) holds line A to plus twelve volts via a 120 ohm resistor and line B to minus twelve volts via a 120 ohm resistor. Thus normally line A is positive and line B negative and, due to the OID standing current of about 20 mA, the actual voltages are about plus/minus 9 volts.

An operational amplifier 100 senses the line pair using a balanced differential input network 101 and its output, after clamping and filtering at 102, is logic input 103 to a monostable 104, in the normal line state.

The OID signals a '0' bit by a 100 microsec shorting pulse on the lines and a '1' bit by a 300 microsec pulse. At the leading edge of this pulse the monostable 104 is fired for its period of 200 microsec. At time T0 flip-flops 105 and 106 are clocked, and at time T1 they contain 0 and 1, respectively, i.e. at the fall of the monostable 104, whereupon a READY flip-flop 107 is set indicating receipt of a new bit from the OID. The DATA flip-flop 108 is set or cleared depending on the line state at this time which is the same as the data bit value. When the sub-channel is accessed the contents of the flip-flops 107, 108 are applied to the internal buses 109 by gates 110. The DATA and READY flip-flops are cleared at T3 via gate 111 when the sub-channel is selected, i.e. immediately after transfer of their contents to the common DATA/READY circuits 112 of the parent channel board.

At time T2, the READY and DATA flip-flops 107, 108 of the selected sub-channel are clocked into the common DATA and READY flip-flops 113, 114 of the parent channel and these are applied via gates 115 to the backplane line returning to the microsequencer.

The microsequencer can activate the 'line reverse' backplane line at 117 during a sub-channel cycle in order to activate the OID's red lamp and audio signal. The backplane BUS signal (LINE REVERSE/-EA) is received on the channel board and routed to input 118 of each sub-channel circuit to trigger monostable 119 in the selected sub-channel circuit. This monostable stretches the pulse out to approximately 1/16 second and activates the bilateral switch 99 to reverse the line AB polarity. The other input of the monostable 119 is driven by the sub-channel select line 120 so that only the correct sub-channel responds.

The Z80 board which controls the operation of the network multiplexer is shown in FIGS. 8A to 8J. At initialisation it downloads the micro-code into the microsequencer and causes it to perform a total system reset. Thereafter, the Z80 board receives message blocks from the microsequencer, checks them and sends back an appropriate acknowledgement code. Good blocks are stored in its 256K byte memory for transmission to the host computer via the serial link.

The Z80 board is highly modular in design and layout. The board contains the following functional blocks:

1. Central Processor Unit (CPU) 121
2. Read-only memory (ROM) 122
3. Random Access Memory (RAM) 123
4. Clock 125
5. Wait State/Reset Circuit 126,127
6. I/O Decoder 128
7. Memory mapping circuit 219
8. Counter Timer Chip (CTC) 130
9. Serial Interface (SIO) 131 to host computer
10. Parallel Interface (PIO) to Microsequencer 132

1. CPU

This is a standard 4 MHz Z80 processor chip 121. No DMA operation is used so the address lines are latched and buffered in the outward direction only. The data lines are connected directly to the common bus. The control lines are buffered outward.

2. ROM

The ROM array 122 consists of eight sockets for 2716-type EPROMS 124. After reset this array is mapped into the first 16K byte quadrant of the Z80 address range. CPU execution starts at location zero. The board is designed on the assumption that the ROM program will copy all the operational code into the first 16K of RAM and will then transfer to it. The ROM loader does this by simultaneously switching the ROM off-line and the first 16K of RAM on-line using the parallel port controlling the memory map circuit. Thereafter the ROM is not accessible by the CPU and performs no further function. The ROM data output is buffered to reduce capacitive loading.

3. RAM

This array is a standard arrangement of 4×8 64K dynamic RAM chips 123. The address bus to this array is eighteen bits wide and consists of three (high-order) bits from the mapping circuit plus the low-order fifteen bits of the Z80 address bus.

4. Clock

This circuit is a standard 4 MHz clock 125.

5. Wait State/Reset Circuit

These are standard Mostek circuits 126, 127. The Wait State function 126 is to insert one wait state in all memory accesses while the ROM is enabled. This only occurs during initialisation time and is due to the slow access time of the ROM chips.

The Reset circuit 127 is activated by power-on or external button. For this board there is no need to preserve RAM contents on reset so a very simple circuit suffices.

6. I/O Decoder 128

Decodes the four port select codes (1–4) for the CTC, SIO, Microsequencer PIO, Mapping PIO from the address lines. This decoding is not exhaustive since there is no need for any more I/O chips than those mentioned above.

7. Memory Mapping Circuit 129

The low-order four bits of the A port 136 of the Mapping PIO control this function. After reset these bits are all high. In this state the Z80 sees the ROM array in the low-order quadrant of its address space and the RAM is disabled for any access to this or the next quadrant. It is intended that the ROM code will immediately set bits 3–1 to zero (leaving bit 0 high) and in this state the low-order 32K field of the RAM appears in the high-order half of the Z80 address space. Now the ROM loader can copy all the code to the low-order 32K of the RAM where it will remain throughout normal running.

When the ROM loader is finished it will write zero to bit 0 of the port and instantly remove the ROM memory (and the wait states) and map the RAM field into the low-order half of the Z80 address space. The Z80 simply continues executing instructions but they are now coming from the ROM. By storing the 3-bit address of one of the eight 32K RAM fields into bits 3–1 of the port the Z80 can access this field in the upper half of its address space.

8. CTC

Standard Z80 CTC chip 130. Channels 2 to 3 cascaded to form a 1 second clock. Channel 0 provides the SIO bit rate clock at 16 times 9600 baud.

9. SIO

A power circuit 133 using a charge pump produces plus/minus twelve volts for an RS232 interface. The SIO chip 131 provides two independent RS232 full duplex serial channels at 9600 baud.

10. PIO to Microsequencer

Standard buffered PIO 132. Port A 134 bidirectional, Port B 135 control output.

The ROM loader program is given in Appendix II.

The main Z80 program (Appendix III) consists, in essence, of a simple endless background loop, as shown in the flow sheets of Appendix IV, which interacts with five foreground interrupt routines.

After reset the program jumps to the label START and performs various initialisation functions as follows:

1. Set Z80 interrupt mode (mode 2)
2. Set I-register to point to the page containing the interrupt vectors.
3. Set the SP-register to point to the top of the RAM area reserved for the stack.

4. Initialise the values of the variables (zero except for the 'no. of slots left' and 'serial number' fields).
5. Zero the parity/ECC work area.
6. Zero the entire sub-channel status area and transaction storage area.
7. Set the IX-register to point to the parity work area (this register stays constant).
8. Set the CTC vector to point to the one-second interrupt routine. Prepare the CTC channels 2 and 3 (in cascade) to interrupt at 1 second intervals.
9. Set the PIO interrupt vectors to point to the routines for input and output. Prepare the ports for A-bidirectional, B-control out (interrupts masked).
10. Set the SIO interrupt vector to point to the vector block labelled SIOVEC. Initialise the channel A control registers.
11. Copy the microcode from location 5000H (put there by the ROM loader) to the Writeable Control Store in the Microsequencer.
12. E RESET bit set.
13. Enable the microseqencer clock.
14. Wait $\frac{1}{4}$ second or so for the microsequencer to reset itself.
15. Clear the reset flat so the microsequencer enters its normal cycle.
16. Perform a dummy PIO read to set the BRDY line in the Z80-microsequencer interface.
17. Branch to the background loop.

With reference to the background loop (as summarised in Appendix IV) it can be seen that in the absence of a complete input message block from either the microsequencer or the HP1000 (host) the Z80 is idling. The only significant function is the diagnostic display which consists of reading the eight-bit switch array, appending this byte to 41H to address a byte in the variable storage area, and displaying the contents of this address in the LED array.

The Z80 input routine from the host operates as follows:

* There is a message block (labels being HTI) defined for the 16-word host-multiplexer messages.
* This is prefixed by a flag byte (HTIFLG) and a count byte (HTIBCT).
* HTIFLG can take on the values 0-free, 1-busy (foreground), 2-busy (background).
* When the SIO receives the first character the interrupt vectors into the SIARCA foregoing routine. This aborts if HTIFLG is 2 (error) and sets HTIFLG to 1 if it is zero. The received character is stored in the message block at the byte corresponding to HTIBCT and the counter is incremented.
* If the counter is 32 the entire message block has been received and HTIFLG is set to 2.
* At this stage the background routine will accept the input message block for processing instead of bypassing that section of the code.
* At the end of background processing HTIFLG and HTIBCT are set to zero so that the process can repeat when the host sends the next block.

The Z80 input routine from the microsequencer works in exactly the same way with the following exceptions.

1. The message block, flag and counter labels begin MSI.
2. The message block length is 9 bytes consisting of the sub-channel address followed by the eight bytes of that sub-channel's RAM memory slot.
3. The interrupt routine label is PIAIN.

The Z80 output routine to the host is the inverse of the host input routine described above.

* The labels begin with HTO.
* The flag settings 1 and 2 have their meanings interchanged (actually 1 is not used).
* The background routine initiates the operation, sets the byte counter to 1 and the flag to 2 and outputs the first character to the SIO chip.
* When the SIO has set this character it interrupts to location SIATBE. This foreground routine sends the next character and increments the counter.
* If SIATBE is entered with the counter equal to 32 the 'transmit buffer empty' condition is flushed, the counter and flag are set to zero and the operation is complete.

The Z80 output routine to the microsequencer is similar to the host output except:

1. The labels begin MSO
2. Since only one byte (the acknowledge code) is sent, the foreground routine simply flushes the resulting interrupt and clears the flag.
3. For the same reason the byte counter is superfluous.

As already discussed, the system has an HP1000 minicomputer at the center of a network of units with which it commumicates via asynchronous serial links. These units will commonly have RS232 interfaces. RS232 interfaces are not rated for operation at distances greater than fifteen meters although, under favourable circumstances, they will sometimes function adequately up to three of four times that distance. However, in the factory environment for which the system is intended, and particularly in view of the intended operation data rate (9600 baud), these interfaces are considered inadequate.

Certain more modern interfaces, in particular RS422 and its derivatives, operate using a balanced differential technique. Provided the circuit is made using a single twisted pair telephone line, RS423 works well and at high speed. In spite of the enormous improvement which RS423 represents over RS232 it is still limited for factory use because there is a finite limit on the maximum tolerable common-mode noise on the line. For this reason, a fully isolated communication technique has been adopted which uses optical isolators on the data lines and a transformer in the remote-end self-powering circuit. With this technique there is no DC connection whatsoever between the minicomputer ground and the remote terminal ground.

FIG. 9 shows the electrical circuitry for a single channel.

Data circuit—local to remote:

The local (HP 1000) transmitter signal at 140 is received by a 26LS33 balanced differential receiver 141 and the resulting TTL signal drives a 26LS31 driver 142 which drives pair 1 in the cable. At the remote end the line pair is terminated by resistors 143 and a reverse-clamped opto-isolator 144. The photo-transistor 145 activates a JFET high slew-rate operational amplifier 146 which produces an RS232-compatible signal at 147 for the terminal.

Data circuit—remote to local:

The terminal RS232 signal at 148 is buffered by an LF352 (JFET op-amp) circuit 149 which is differential and therefore provides better noise immunity than normal. Thereafter, the circuit is the same as that used by the OID readers and consists of an opto-isolator 150 driven by a transistor 151 and with its photo-transistor 152 connected in a Darlington pair with a further transistor 153 that shorts line pair 2, drawing current symmetrically through two 120 ohm terminating resistors 154. The differential signal is decoded by a JFET op-amp circuit 155 which drives the RS232 receive data line 156. Since it is intended that there should be RS423 compatibility at this point the signal is clamped at 157 to approximately +/− 6 volts. Power circuit.

Power is provided over the third pair of the 3-pair telephone cable to the remote interface box. This line pair is driven by a 12 v DC source 158 grounded at the local end. The positive line is protected by a fuse 159. The supply is decoupled at the remote end by a reservoir capacitor 160 and supplies the primary side 165 of a transformer 161. A CMOS oscillator 162 is set to run at approximately 50 kHz and this signal switches the primary current in the transformer via a transistor 163. The centre-tapped fly-back voltage is clamped by a 20 v Zener diode 164. The centre-tapped secondary coils 166 drive two rectifier/stabiliser circuits 167 which produce the local + and −12 v supply referred to the terminal ground. The total current available is of the order of 20 mA which is more than required by the local circuits.

The isolating adapter circuitry described is one of the factors that makes the system particularly suitable for a works environment. But there are numerous other features that contribute to this. The Operator Input Devices located at each work station are simple and inexpensive yet extremely robust, and the cards or tickets that they read are particularly cheap and easy to print. Yet the cards will withstand considerable abuse—a card that has been screwed up or torn can still normally be reflattened and successfully read. Each OID, being parasitically supplied with power at a completely safe 24 volt level via its data transmission and control link, can be situated anywhere in the works. The MUXC receives data from the OIDs that gives a complete and up-to-date picture of work in hand in the factory, showing the progress of particular orders, detecting break downs and bottle necks, recording employee attendances and work rates, and generally providing all the information necessary to plan the meeting of delivery targets, use the available personnel and facilities in the most efficient manner, oversee the stock position, carry out payroll computations, and anticipate problems and take preventive action.

The microcomputers of the MUXC are provided with electric battery power supply back-up to prevent failure in the event of a mains power interruption.

Various data formats used in the system are shown in Appendix V.

APPENDIX I

```
            1       TITLE MICROCODE FOR PCJ SEQUENCER
            ;::::::                  ::::::::
            3       PSECT ABS
            ; LIST 0
=0000       5  NONE     EQU   0
=0004       6  RD       EQU   04H
=0008       7  PI       EQU   08H
=000C       8  LA       EQU   0CH
=0010       9  HA       EQU   10H
=0014      10  LAE      EQU   14H
=0018      11  E        EQU   18H
=0000      12  D        EQU   0
=0001      13  POD      EQU   1
=0002      14  RI       EQU   2
=0003      15  T        EQU   3
=0000      16  X        EQU   0       ;::::::: FOR UNUSED FIELDS :::::::::::::
=0000      17  NOP      EQU   0
=0040      18  RAMF     EQU   40H
=0080      19  RAMD     EQU   80H
=00C0      20  RAMU     EQU   0C0H
=0020      21  AND      EQU   20H
=0018      22  OR       EQU   18H
=0030      23  XOR      EQU   30H
=0000      24  ADD      EQU   0
=0008      25  SUBR     EQU   8
=0007      26  DZ       EQU   7
=0005      27  DA       EQU   5
=0004      28  ZA       EQU   4
=0001      29  AB       EQU   1
=0020      30  R        EQU   20H
```

```
=0010        31 S       EQU  10H
=0002        32 RDYI    EQU  2
=0001        33 RDYA    EQU  1
=0080        34 RESET   EQU  80H
=0040        35 Z       EQU  40H
=0020        36 HZ      EQU  20H
=0010        37 LZ      EQU  10H
=0008        38 F3H     EQU  8
=0004        39 F3L     EQU  4
=0002        40 ER      EQU  2
=0001        41 TT      EQU  1
             ; ########### START OF MACRO DEFINITIONS
             43 DD      MACRO #DOUT,#DIN,#ID,#IFN,#IS,#B,#A,#D
       1     44        DEFB #DOUT+#DIN,#ID+#IFN+#IS,#B*16+#A,#D
       2     45        MEND
             ; ###########
             47 BRDY    MACRO #R,#S,#RDM,#ADDR
       1     48        DEFB 1CH,#R+#S+#RDM,0,#ADDR/4  ; >>>> #ADDR
       2     49        MEND
             ; ###########
             51 BM      MACRO #R,#S,#M,#ADDR
       1     52        DEFB 1CH,#R+#S,#M,#ADDR/4      ; >>>> #ADDR
       2     53        MEND
             ; ###########
             55 BM7     MACRO #R,#S,#M,#ADDR
       1     56        DEFB 0FCH,#R+#S,#M,#ADDR/4     ; >>>> #ADDR
       2     57        MEND
             ; ###########
             59 BPT     MACRO
       1     60        DEFB 0,0,0,0 ;PATCHABLE B/PT
       2     61        MEND
             ; ########### END OF MACRO DEFININITIONS
             ;
             ; LIST 1
             65        CLIST 0
             ;
             ;  FORMAT FOR MACRO EXPANSIONS:
             ;   NON-BRANCH:
             ;    DD   DOUT,DIN, IDEST,IFUNC,ISOURCE, BREG,AREG, DATA
             ;   BRANCH WITH I/O READY TEST:
             ;    BRDY  REVERSE SENSE,8-WAY BRANCH,FLAG NAME, ADDRESS
             ;                       (NOTE ADDRESSES PUT IN BY HAND)
             ;   BRANCH WITH OTHER TESTS:
             ;    BM    REVERSE SENSE,8-WAY BRANCH,FLAG NAME, ADDRESS
             ;
             ; DATA RAM IS ORGANISED AS 128 SLOTS OF 8 BYTES.
             ; THERE IS ONE SLOT FOR EACH SUB-CHANNEL.
             ; THE BYTES IN EACH SLOT ARE AS FOLLOWS:
             ;   0: STATE/TIME    (FORMAT SSSOTTTT)
             ;   1: CURRENT BIT/CELL  (FORMAT OBBBOCCC)
             ;      COUNTS SHIFTING IN OF DATA,
             ;      STARTS AT 02H AND COUNTS UP.
             ;   2: FIRST DATA BYTE. INITIALLY USED TO
             ;      ACCUMULATE THE SYN CHARACTER WHICH
```

```
;      IS THEN OVERLAYED BY THE FIRTS DATA BYTE.
;  3-7: REMAINING DATA AND CHECK BYTES.
;
;
;  REGISTER USAGE:
;   R0: COUNTER FOR SUB-CHANNEL (KKKKKKK0)
;   R1: STATE/TIME (SSS0TTTT)
;   R2: BIT/CELL (0BBB0CCC)
;   R3: DATA BYTE
;   R4: COUNTER FOR RESET RAM CLEARING ROUTINE
;   R5: LA-REGISTER
;   R6: WORK REGISTER
;
;   R12: ACKNOWLEDGE CODE (0=OK,1=PHYSICAL ERROR,
;                          2=LOGICAL ERROR)
;   R13: CELL NO FOR Z80 TRANSFER
;   R14: SUB-CHANNEL (KKKKKKK0) FOR Z80 TRANSFER
;   R15: X000Y000 WHERE X=1 IF Z80 XFER IS BUSY AND
;             Y=0 BEFORE XFER OF SUB-CHANNEL
;             NUMBER TO THE Z80.
;
;**************************************************
;**************************************************
;
;HARDWARE FORCES START AT THIS POINT AFTER
;Z80 HAS DOWN-LOADED THE MICROCODE AND THEN
;ACTIVATED THE 'SEQUENCER RUN' AND
;'CLOCK ENABLE' LINES ON PORT B.
;
;ALL STATE PROCESSORS RETURN HERE TO SELECT THE NEXT SUB-CHANNEL
                  ;
                 116          LIST 1
                   ;**************************************************
0000             118 START   BM7 R,X,X,STR001 ;NORMALLY SKIP OVER LOG-OUT  **STB 7**
0000 FC200014   1 119         DEFB 0FCH,R+X,X,STR001/4 ; >>>> STR001
0004          119 121         DD NONE,D,NOP,XOR,DA,X,0,0 ;TEST FOR GIVEN S/C ***ENTER TWICE DESIRED
                                                            S/C***
0004 00350000   1 122         DEFB NONE+D,NOP+XOR+DA,X*16+0,0
0008          120 124         BM R,X,Z,STR001  ;SKIP LOG-OUT IF NOT DESIRED S/C
0008 1C204014   1 125         DEFB 1CH,R+X,Z,STR001/4 ; >>>> STR001
000C          121 127         DD LA,D,RAMF,OR,DZ,5,X,0 ;LA,R5<0
000C 0C5F5000   1 128         DEFB LA+D,RAMF+OR+DZ,5*16+X,0
0010          122 130         DD NONE,RI,NOP,OR,DZ,X,X,X
0010 021F0000   1 131         DEFB NONE+RI,NOP+OR+DZ,X*16+X,X
0014          123 133         DD LA,D,RAMF,OR,DZ,5,X,1
0014 0C5F5001   1 134         DEFB LA+D,RAMF+OR+DZ,5*16+X,1
0018          124 136         DD NONE,RI,NOP,OR,DZ,X,X,X
0018 021F0000   1 137         DEFB NONE+RI,NOP+OR+DZ,X*16+X,X
001C          125 139         DD LA,D,RAMF,OR,DZ,5,X,2
001C 0C5F5002   1 140         DEFB LA+D,RAMF+OR+DZ,5*16+X,2
0020          126 142         DD NONE+20H,RI,NOP,OR,DZ,X,X,X  ; **STB 1**
0020 221F0000   1 143         DEFB NONE+20H+RI,NOP+OR+DZ,X*16+X,X
0024          127 145         DD LA,D,RAMF,OR,DZ,5,X,3
0024 0C5F5003   1 146         DEFB LA+D,RAMF+OR+DZ,5*16+X,3
```

```
0028          128 148        DD NONE+40H,RI,NOP,OR,DZ,X,X,X  ; **STB 2**
0028 421F0000   1 149        DEFB NONE+40H+RI,NOP+OR+DZ,X*16+X,X
002C          129 151        DD LA,D,RAMF,OR,DZ,5,X,4
002C 0C5F5004   1 152        DEFB LA+D,RAMF+OR+DZ,5*16+X,4
0030          130 154        DD NONE+60H,RI,NOP,OR,DZ,X,X,X  ; **STB 3**
0030 621F0000   1 155        DEFB NONE+60H+RI,NOP+OR+DZ,X*16+X,X
0034          131 157        DD LA,D,RAMF,OR,DZ,5,X,5
0034 0C5F5005   1 158        DEFB LA+D,RAMF+OR+DZ,5*16+X,5
0038          132 160        DD NONE+80H,RI,NOP,OR,DZ,X,X,X  ; **STB 4**
0038 821F0000   1 161        DEFB NONE+80H+RI,NOP+OR+DZ,X*16+X,X
003C          133 163        DD LA,D,RAMF,OR,DZ,5,X,6
003C 0C5F5006   1 164        DEFB LA+D,RAMF+OR+DZ,5*16+X,6
0040          134 166        DD NONE+0A0H,RI,NOP,OR,DZ,X,X,X ; **STB 5**
0040 A21F0000   1 167        DEFB NONE+0A0H+RI,NOP+OR+DZ,X*16+X,X
0044          135 169        DD LA,D,RAMF,OR,DZ,5,X,7
0044 0C5F5007   1 170        DEFB LA+D,RAMF+OR+DZ,5*16+X,7
0048          136 172        DD NONE+0C0H,RI,NOP,OR,DZ,X,X,X ; **STB 6**
0048 C21F0000   1 173        DEFB NONE+0C0H+RI,NOP+OR+DZ,X*16+X,X
004C          137 175        BM R,X,X,DIAGCN
004C 1C2000BE   1 176        DEFB 1CH,R+X,X,DIAGCN/4 ; >>>> DIAGCN
                     ;
0050          139 179 STR001 BM X,X,RESET,RST000 ;TO RESET IF FLAG ON
0050 1C008069   1 180        DEFB 1CH,X+X,RESET,RST000/4 ; >>>> RST000
0054          140 182        DD LAE,D,RAMF,OR,DZ,5,X,40H ;EA,ET,LA,R5<0 ,EC<1
0054 145F5040   1 183        DEFB LAE+D,RAMF+OR+DZ,5*16+X,40H
0058          141 185        DD HA,D,RAMF,ADD,DA,0,0,2 ;HA,R0<R0+2
0058 10450002   1 186        DEFB HA+D,RAMF+ADD+DA,0*16+0,2
005C          142 188        BM R,X,Z,STR000  ;SKIP 2 IF S/C#0
005C 1C20401B   1 189        DEFB 1CH,R+X,Z,STR000/4 ; >>>> STR000
0060          143 191        DD E,D,NOP,OR,DZ,X,X,60H ;ET<1  PULSE ET WHILE
0060 181F0060   1 192        DEFB E+D,NOP+OR+DZ,X*16+X,60H
0064          144 194        DD E,D,NOP,OR,DZ,X,X,40H ;ET<0  -EC STAYS 1
0064 181F0040   1 195        DEFB E+D,NOP+OR+DZ,X*16+X,40H
0068          145 197        DD NONE,X,NOP,X,X,X,X,X ;NOP TO EXTEND EC
0068 00000000   1 198        DEFB NONE+X,NOP+X+X,X*16+X,X
006C          146 200 STR000 DD LAE,D,RAMF,OR,DZ,5,X,0 ;EA,EC,ET,LA,R5<0
006C 145F5000   1 201        DEFB LAE+D,RAMF+OR+DZ,5*16+X,0
0070          147 203        DD NONE,RI,RAMF,OR,DZ,1,X,X ;R1<STATE/TIME THIS S/C
0070 025F1000   1 204        DEFB NONE+RI,RAMF+OR+DZ,1*16+X,X
0074          148 206        BM R,S,HZ,0      ;8 WAY BRANCH TO SSS00000 IF SSS#0
0074 1C302000   1 207        DEFB 1CH,R+S,HZ,0/4 ; >>>> 0
0078          149 209        BM R,X,ER,START  ;TO START IF ER=0 IE NO REQUEST
0078 1C200200   1 210        DEFB 1CH,R+X,ER,START/4 ; >>>> START
007C          150 212        DD R0,D,RAMF,OR,DZ,1,X,2FH ;RAM0,R1<2VH;SET STATE 1 AND TIME-OUT VALUE
007C 045F102F   1 213        DEFB R0+D,RAMF+OR+DZ,1*16+X,2FH
                     ;;; BM R,X,X,ST1000 ;BRANCH TO THE STATE 1 ENTRY PT   ;;DROP THROUGH
                     ;EITHER THIS BRANCH OR THE 8 WAY BRANCH 3 STMTS BACK
                     ;CAUSES AN ADVANCE TO ADDRESS SSS00000 (S=STATE)
                     ;WITH EA,EC,ET,LA,R5=0; R0,HA=KKKKKKK0 WHERE
                     ;K IS THE SUB-CHANNEL; R1,RAM0(K)=SSS0VVVV WHERE
                     ;SSS IS THE STATE AND VVVV IS THE INITIAL VALUE
                     ;OF THE TIME-OUT.
                     ;***************************************************
0080          159 223        ORG  80H        ;WORD ADDRESS 20H, ENTRY FOR STATE 1
```

```
                                ;STATE 1: READING BUT NOT YET READ SYN CHARACTER
0080                161  225 ST1000  BPT
0080 00000000         1  226          DEFB 0,0,0,0      ;PATCHABLE B/PT
0084                162  228          BM R,X,ER,ST1001 ;TO ST1001 IF ER=0 IE NO REQUEST
0084 1C200228         1  229          DEFB 1CH,R+X,ER,ST1001/4 ; >>>> ST1001
0088                163  231          DD LA,D,RAMF,OR,DZ,5,X,2 ;R5,LA<2
0088 0C5F5002         1  232          DEFB LA+D,RAMF+OR+DZ,5*16+X,2
008C                164  234          DD NONE,RI,RAMD,OR,DZ,3,X,X ;R3<ED,HI 7 BITS OF RAM2(K)
008C 029F3000         1  235          DEFB NONE+RI,RAMD+OR+DZ,3*16+X,X
                                ;SHIFTS CONTENTS OF RAM2(K) DOWN ONE PLACE WITH
                                ;THE DATA BIT ED ENTERING IN BIT 7
0090                167  239          DD RO,X,NOP,OR,ZA,X,3,X ;RAM2(K)<R3 UPDATE RAM
0090 041C0300         1  240          DEFB RO+X,NOP+OR+ZA,X*16+3,X
0094                168  242          DD NONE,D,NOP,SUBR,DA,X,3,15H ;SUBTRACT SYN CHAR
0094 000D0315         1  243          DEFB NONE+D,NOP+SUBR+DA,X*16+3,15H
0098                169  245          BM R,X,Z,ST1001  ;SKIP 1 IF #SYN
0098 1C204028         1  246          DEFB 1CH,R+X,Z,ST1001/4 ; >>>> ST1001
009C                170  248          DD NONE,D,RAMF,ADD,DA,1,1,20H ;R1<STATE 2,TIME SAME
009C 00451120         1  249          DEFB NONE+D,RAMF+ADD+DA,1*16+1,20H
00A0                171  251 ST1001  DD LA,D,RAMF,OR,DZ,5,X,0 ;R5,LA<0
00A0 0C5F5000         1  252          DEFB LA+D,RAMF+OR+DZ,5*16+X,0
00A4                172  254          DD RO,T,RAMF,SUBR,ZA,1,1,X ;DECR R1,RAMO IF T=1
00A4 074C1100         1  255          DEFB RO+T,RAMF+SUBR+ZA,1*16+1,X
                                ;REDUCE TIME OUT VALUE BY ONE IF THIS IS A TIMER CYCLE
00A8                174  258          BM R,X,LZ,START  ;TO START IF NOT TIMED OUT
00A8 1C201000         1  259          DEFB 1CH,R+X,LZ,START/4 ; >>>> START
00AC                175  261 ST1002  DD RO,D,RAMF,OR,DZ,1,X,60H ;STATE 3
00AC 045F1060         1  262          DEFB RO+D,RAMF+OR+DZ,1*16+X,60H
00B0                176  264          BM R,X,X,START   ;TO START
00B0 1C200000         1  265          DEFB 1CH,R+X,X,START/4 ; >>>> START
                                ;
                                ;CONTINUATION OF STATE 5 CODE FOR ACK 2 (LOGICAL ERROR)
00B4                179  269 ST5003  DD LA,D,RAMF,OR,DZ,5,X,7 ;LA,R5<7
00B4 0C5F5007         1  270          DEFB LA+D,RAMF+OR+DZ,5*16+X,7
00B8                180  272          DD RO,X,NOP,OR,DZ,X,X,0C0H
00B8 041F00C0         1  273          DEFB RO+X,NOP+OR+DZ,X*16+X,0C0H
00BC                181  275          DD LA,D,RAMF,OR,DZ,5,X,6
00BC 0C5F5006         1  276          DEFB LA+D,RAMF+OR+DZ,5*16+X,6
00C0                182  278          DD RO,X,NOP,OR,DZ,X,X,0C9H
00C0 041F00C9         1  279          DEFB RO+X,NOP+OR+DZ,X*16+X,0C9H
00C4                183  281          DD LA,D,RAMF,OR,DZ,5,X,5
00C4 0C5F5005         1  282          DEFB LA+D,RAMF+OR+DZ,5*16+X,5
00C8                184  284          DD RO,X,NOP,OR,DZ,X,X,0E1H
00C8 041F00E1         1  285          DEFB RO+X,NOP+OR+DZ,X*16+X,0E1H
00CC                185  287          DD LA,D,RAMF,OR,DZ,5,X,4
00CC 0C5F5004         1  288          DEFB LA+D,RAMF+OR+DZ,5*16+X,4
00D0                186  290          DD RO,X,NOP,OR,DZ,X,X,0E4H ;ABOVE CODE FOR DAH-DI-DAH TONE
00D0 041F00E4         1  291          DEFB RO+X,NOP+OR+DZ,X*16+X,0E4H
00D4                187  293          DD NONE,D,RAMF,OR,DZ,6,X,4 ;R6<4 START CELL
00D4 005F6004         1  294          DEFB NONE+D,RAMF+OR+DZ,6*16+X,4
00D8                188  296          BM R,X,X,ST5002  ;TO EXIT ROUTINE
00D8 1C2000A7         1  297          DEFB 1CH,R+X,X,ST5002/4 ; >>>> ST5002
                                ;
                                ;*************************************************************
```

```
0100             191  301            ORG  100H       ;WORD ADDRESS 40H, ENTRY FOR STATE 2
                           ;STATE 2: READING  AFTER DETECTION OF SYN
0100             193  303 ST2000  BPT
0100 00000000      1  304            DEFB 0,0,0,0     ;PATCHABLE B/PT
0104             194  306            BM R,X,ER,ST1001 ;TO ST1001 IF NO REQUEST
0104 1C200228      1  307            DEFB 1CH,R+X,ER,ST1001/4 ; >>>> ST1001
0108             195  309            DD LA,D,RAMF,OR,DZ,5,X,1 ;R5,LA<1 (BIT/CELL BYTE)
0108 0C5F5001      1  310            DEFB LA+D,RAMF+OR+DZ,5*16+X,1
010C             196  312            DD NONE,RI,RAMF,OR,DZ,2,X,X ;R2<BC
010C 025F2000      1  313            DEFB NONE+RI,RAMF+OR+DZ,2*16+X,X
0110             197  315            DD NONE,X,RAMF,OR,ZA,6,2,X ;R6<R2 WORK REG
0110 005C6200      1  316            DEFB NONE+X,RAMF+OR+ZA,6*16+2,X
0114             198  318            DD NONE,D,RAMF,ADD,DA,2,2,10H ;R2<R2+10H NEXT BIT
0114 00452210      1  319            DEFB NONE+D,RAMF+ADD+DA,2*16+2,10H
0118             199  321            BM R,X,F3H,ST2001 ;SKIP IF R2 STILL <=7
0118 1C200848      1  322            DEFB 1CH,R+X,F3H,ST2001/4 ; >>>> ST2001
011C             200  324            DD NONE,D,RAMF,ADD,DA,2,2,81H ;ELSE TO BITO NEXT CELL
011C 00452281      1  325            DEFB NONE+D,RAMF+ADD+DA,2*16+2,81H
0120             201  327 ST2001  DD RO,X,NOP,OR,ZA,X,2,X ;RAM1<R2 UPDATE RAM
0120 041C0200      1  328            DEFB RO+X,NOP+OR+ZA,X*16+2,X
0124             202  330            DD LA,X,NOP,OR,ZA,X,6,X ;LA<R6 IE LA IS CELL BEFORE UPDATE
0124 0C1C0600      1  331            DEFB LA+X,NOP+OR+ZA,X*16+6,X
0128             203  333            DD NONE,RI,RAMD,OR,DZ,3,X,X ;R3<ED,HI 7 BITS OF BYTE C
0128 029F3000      1  334            DEFB NONE+RI,RAMD+OR+DZ,3*16+X,X
012C             204  336            DD RO,X,NOP,OR,ZA,X,3,X ;RAMC<R3 UPDATE BYTE C
012C 041C0300      1  337            DEFB RO+X,NOP+OR+ZA,X*16+3,X
0130             205  339            DD LA,D,RAMF,OR,DZ,5,X,0 ;R5,LA<0
0130 0C5F5000      1  340            DEFB LA+D,RAMF+OR+DZ,5*16+X,0
0134             206  342            DD RO,T,RAMF,SUBR,ZA,1,1,X ;DECR R1,RAMO IF T=1 (TIMER CYCLE)
0134 074C1100      1  343            DEFB RO+T,RAMF+SUBR+ZA,1*16+1,X
0138             207  345            BM X,X,LZ,ST1002 ;TO ST1002 (SET STATE 3) IF TIMED OUT
0138 1C00102B      1  346            DEFB 1CH,X+X,LZ,ST1002/4 ; >>>> ST1002
013C             208  348            DD NONE,X,NOP,OR,ZA,X,2,X ;SET STATS FOR R2 (UPDATE BC BYTE)
013C 001C0200      1  349            DEFB NONE+X,NOP+OR+ZA,X*16+2,X
0140             209  351            BM R,X,F3L,START ;TO START IF CELL STILL <=7
0140 1C200400      1  352            DEFB 1CH,R+X,F3L,START/4 ; >>>> START
0144             210  354            DD RO,D,RAMF,ADD,DA,1,1,20H ;STATE 3,TIME SAME
0144 04451120      1  355            DEFB RO+D,RAMF+ADD+DA,1*16+1,20H
0148             211  357            BM R,X,X,START   ;TO START
   8 1C200000      1  358            DEFB 1CH,R+X,X,START/4 ; >>>> START
                          ;**************************************************
0180             213  361            ORG  180H        ;WORD ADDRESS 60H, ENTRY FOR STATE 3
                          ;STATE 3: READY FOR Z80 TRANSFER
0180             215  363 ST3000  BPT
0180 00000000      1  364            DEFB 0,0,0,0     ;PATCHABLE B/PT
0184             216  366            DD NONE,X,NOP,OR,ZA,X,15,X ;STATS OF R15
0184 001C0F00      1  367            DEFB NONE+X,NOP+OR+ZA,X*16+15,X
0188             217  369            BM X,X,F3H,START ;TO START IF Z80 IS BUSY
0188 1C000800      1  370            DEFB 1CH,X+X,F3H,START/4 ; >>>> START
018C             218  372            DD NONE,X,RAMF,OR,ZA,14,0,X ;R14<R0 COPY S/C
018C 005CE000      1  373            DEFB NONE+X,RAMF+OR+ZA,14*16+0,X
0190             219  375            DD NONE,D,RAMF,OR,DZ,13,X,0 ;R13<0 ALL 8 CELLS ARE XFERED
0190 005FD000      1  376            DEFB NONE+D,RAMF+OR+DZ,13*16+X,0
0194             220  378            DD LA,D,RAMF,OR,DZ,5,X,0 ;R5,LA<0
```

```
0194 0C5F5000    1  379           DEFB LA+D,RAMF+OR+DZ,5#16+I,0
0198            221 381           DD RO,D,RAMF,ADD,DA,1,1,20H ;STATE 4 INTO RAM0, TIME SAME
0198 04451120    1  382           DEFB R0+D,RAMF+ADD+DA,1#16+1,20H
019C            222 384           DD NONE,D,RAMF,OR,DZ,15,I,80H ;SET R15 BUSY
019C 005FF080    1  385           DEFB NONE+D,RAMF+OR+DZ,15#16+I,80H
01A0            223 387           BM R,I,I,START    ;TO START
01A0 1C200000    1  388           DEFB 1CH,R+I,I,START/4 ; >>>> START
                                  ;
                                  ;THE RESET ROUTINE IS FITTED IN HERE SINCE THE STATE 3
                                  ;PROCESSOR IS THE SHORTEST
                                  ;
                                  ;RESET ROUTINE:
                                  ;
01A4            230 396 RST000    BPT
01A4 00000000    1  397           DEFB 0,0,0,0      ;PATCHABLE B/PT
01A8            231 399           DD E,I,RAMF,AND,ZA,0,I,I ;E,R0<0
01A8 18640000    1  400           DEFB E+I,RAMF+AND+ZA,0#16+I,I
01AC            232 402           DD HA,I,NOP,OR,ZA,I,0,I ;HA<R0 IE 0
01AC 101C0000    1  403           DEFB HA+I,NOP+OR+ZA,I#16+0,I
01B0            233 405 RST001    DD LA,I,NOP,AND,ZA,I,I,I ;LA<0
01B0 0C240000    1  406           DEFB LA+I,NOP+AND+ZA,I#16+I,I
01B4            234 408           DD R0,D,NOP,OR,DZ,I,I,0FH ;RAM0<STATE 0,T/0=15
01B4 041F000F    1  409           DEFB R0+D,NOP+OR+DZ,I#16+I,0FH
01B8            235 411           DD LA,D,RAMF,OR,DZ,5,I,1 ;LA,R5<1
01B8 0C5F5001    1  412           DEFB LA+D,RAMF+OR+DZ,5#16+I,1
01BC            236 414           DD R0,D,NOP,OR,DZ,I,I,02H ;RAM1<2 SET BIT/CELL BYTE
01BC 041F0002    1  415           DEFB R0+D,NOP+OR+DZ,I#16+I,02H
01C0            237 417           DD NONE,D,RAMF,OR,DZ,4,I,6 ;R4<6 COUNTER FOR REMAINING BYTES
01C0 005F4006    1  418           DEFB NONE+D,RAMF+OR+DZ,4#16+I,6
01C4            238 420           DD LA,D,RAMF,OR,DZ,5,I,2 ;LA,R5<2
01C4 0C5F5002    1  421           DEFB LA+D,RAMF+OR+DZ,5#16+I,2
01C8            239 423 RST002    DD R0,D,NOP,OR,DZ,I,I,0 ;RAM(R4)<0 CLEAR DATA BYTE
01C8 041F0000    1  424           DEFB R0+D,NOP+OR+DZ,I#16+I,0
01CC            240 426           DD LA,D,RAMF,ADD,DA,5,5,1 ;LA,R5<R5+1 INC RAM ADDR
01CC 0C455501    1  427           DEFB LA+D,RAMF+ADD+DA,5#16+5,1
01D0            241 429           DD NONE,D,RAMF,SUBR,DA,4,4,0 ;DECREMENT COUNTER
01D0 004D4400    1  430           DEFB NONE+D,RAMF+SUBR+DA,4#16+4,0
01D4            242 432           BM R,I,Z,RST002   ;LOOP BACK IF COUNT NOT 0
01D4 1C204072    1  433           DEFB 1CH,R+I,Z,RST002/4 ; >>>> RST002
01D8            243 435           DD HA,D,RAMF,ADD,DA,0,0,2 ;HA,R0<R0+2 NEXT S/CHAN
01D8 10450002    1  436           DEFB HA+D,RAMF+ADD+DA,0#16+0,2
01DC            244 438           BM R,I,Z,RST001   ;OUTER LOOP BACK IF S/C NOT 0
01DC 1C20406C    1  439           DEFB 1CH,R+I,Z,RST001/4 ; >>>> RST001
01E0            245 441           DD HA,D,RAMF,SUBR,DA,0,0,1 ;HA,R0 BACK TO 254 SO
01E0 104D0001    1  442           DEFB HA+D,RAMF+SUBR+DA,0#16+0,1
                                  ;                         NEXT INCR WILL MAKE 0
01E4            247 445           DD NONE,D,RAMF,OR,DZ,15,I,0 ;R15<0 Z80 BUSY FLAG CLEAR
01E4 005FF000    1  446           DEFB NONE+D,RAMF+OR+DZ,15#16+I,0
01E8            248 448           BM R,I,I,RST003   ;TO CONTINUATION OF RESET ROUTINE
01E8 1C2000E8    1  449           DEFB 1CH,R+I,I,RST003/4 ; >>>> RST003
                                  ;
                                  ;################################################
0200            251 453           ORG 200H         ;WORD ADDRESS 80H, ENTRY FOR STATE 4
                                  ;STATE 4: Z80 TRANSFER
```

```
0200              253  455 ST4000  BPT
0200 00000000       1  456         DEFB 0,0,0,0     ;PATCHABLE B/PT
0204              254  458         BRDY R,X,RDYI,START ;TO START IF NOT READY FOR INPUT
0204 1C220000       1  459         DEFB 1CH,R+X+RDYI,0,START/4 ; >>>> START
0208              255  461         DD NONE,X,NOP,OR,ZA,X,15,X ;STATS OF R15
0208 001C0F00       1  462         DEFB NONE+X,NOP+OR+ZA,X*16+15,X
020C              256  464         BM X,X,F3L,ST4001 ;BR TO ST4001 IF Y=1 IE S/C BYTE HAS BEEN SENT
020C 1C0004B7       1  465         DEFB 1CH,X+X,F3L,ST4001/4 ; >>>> ST4001
0210              257  467         DD PI,X,NOP,OR,ZA,X,14,X ;SEND R14 TO PIO A INPUT TO Z80
0210 081C0E00       1  468         DEFB PI+X,NOP+OR+ZA,X*16+14,X
0214              258  470         DD NONE,D,RAMF,OR,DA,15,15,8 ;SET Y=1 TO INDICATE S/C SENT
0214 005DFF08       1  471         DEFB NONE+D,RAMF+OR+DA,15*16+15,8
0218              259  473         BM R,X,X,START   ;TO START
0218 1C200000       1  474         DEFB 1CH,R+X,X,START/4 ; >>>> START
021C              260  476 ST4001  DD LA,X,RAMF,OR,ZA,5,13,X ;R5,LA<R13 CELL FOR XFER
021C 0C5C5D00       1  477         DEFB LA+X,RAMF+OR+ZA,5*16+13,X
0220              261  479         DD PI,RI,NOP,OR,DZ,X,X,X ;SEND CONTENTS OF CELL TO PIO A
0220 0A1F0000       1  480         DEFB PI+RI,NOP+OR+DZ,X*16+X,X
0224              262  482         DD NONE,D,RAMF,ADD,DA,13,13,1 ;INCR R13 TO NEXT CELL
0224 0045DD01       1  483         DEFB NONE+D,RAMF+ADD+DA,13*16+13,1
0228              263  485         BM R,X,F3L,START ;TO START IF CELL STILL <=7
0228 1C200400       1  486         DEFB 1CH,R+X,F3L,START/4 ; >>>> START
022C              264  488         DD LA,D,RAMF,OR,DZ,5,X,0 ;R5,LA<0 ADDRESS S/T BYTE
022C 0C5F5000       1  489         DEFB LA+D,RAMF+OR+DZ,5*16+X,0
0230              265  491         DD RO,D,RAMF,OR,DZ,1,X,0A0H ;R1,RAMO<A0 IE STATE 5
0230 045F10A0       1  492         DEFB RO+D,RAMF+OR+DZ,1*16+X,0A0H
0234              266  494         BM R,X,X,START   ;TO START
0234 1C200000       1  495         DEFB 1CH,R+X,X,START/4 ; >>>> START
                               ; REGISTER LOG-OUT PART OF DIAGNOSTICS
0238              268  498 DIAGCN  BPT
0238 00000000       1  499         DEFB 0,0,0,0     ;PATCHABLE B/PT
023C              269  501         DD NONE,X,NOP,OR,ZA,X,0,X ;R0
023C 001C0000       1  502         DEFB NONE+X,NOP+OR+ZA,X*16+0,X
0240              270  504         DD NONE,X,NOP,OR,ZA,X,1,X ;R1
0240 001C0100       1  505         DEFB NONE+X,NOP+OR+ZA,X*16+1,X
0244              271  507         DD NONE,X,NOP,OR,ZA,X,2,X ;R2
0244 001C0200       1  508         DEFB NONE+X,NOP+OR+ZA,X*16+2,X
0248              272  510         DD NONE,X,NOP,OR,ZA,X,3,X ;R3
0248 001C0300       1  511         DEFB NONE+X,NOP+OR+ZA,X*16+3,X
024C              273  513         DD NONE,X,NOP,OR,ZA,X,4,X ;R4
024C 001C0400       1  514         DEFB NONE+X,NOP+OR+ZA,X*16+4,X
0250              274  516         DD NONE,X,NOP,OR,ZA,X,5,X ;R5
0250 001C0500       1  517         DEFB NONE+X,NOP+OR+ZA,X*16+5,X

0254 001C0C00       1  521         DEFB NONE+X,NOP+OR+ZA,X*16+12,X
0258              277  523         DD NONE,X,NOP,OR,ZA,X,13,X ;R13
0258 001C0D00       1  524         DEFB NONE+X,NOP+OR+ZA,X*16+13,X
025C              278  526         DD NONE,X,NOP,OR,ZA,X,14,X ;R14
025C 001C0E00       1  527         DEFB NONE+X,NOP+OR+ZA,X*16+14,X
0260              279  529         DD NONE,X,NOP,OR,ZA,X,15,X ;R15
0260 001C0F00       1  530         DEFB NONE+X,NOP+OR+ZA,X*16+15,X
0264              280  532         BM R,X,X,STR001
0264 1C200014       1  533         DEFB 1CH,R+X,X,STR001/4 ; >>>> STR001
                               ;*************************************************************
```

```
0280              282  536          ORG  280H        ;WORD ADDRESS A0H, ENTRY FOR STATE 5
                            ;STATE 5: WAITING FOR ACKNOWLEDGMENT FROM Z80
0280              284  538 ST5000   BPT
0280 00000000       1  539          DEFB 0,0,0,0      ;PATCHABLE B/PT
0284              285  541          BRDY R,X,RDYA,START ;TO START IF PIO OUTPUT NOT READY
0284 1C210000       1  542          DEFB 1CH,R+X+RDYA,0,START/4 ; >>>> START
0288              286  544          DD NONE,POD,RAMF,OR,DZ,12,X,0 ;R12<ACK CODE
0288 015FC000       1  545          DEFB NONE+POD,RAMF+OR+DZ,12*16+X,0
028C              287  547          BM R,X,Z,ST5001  ;TO ST5001 IF NOT 0 (OK)
028C 1C2040AD       1  548          DEFB 1CH,R+X,Z,ST5001/4 ; >>>> ST5001
0290              288  550          DD LA,D,RAMF,OR,DZ,5,X,7 ;LA,R5<7 START CELL FOR ACK TONE
0290 0C5F5007       1  551          DEFB LA+D,RAMF+OR+DZ,5*16+X,7
0294              289  553          DD RO,X,NOP,OR,DZ,X,X,0E0H ;OK TONE CODE
0294 041F00E0       1  554          DEFB RO+X,NOP+OR+DZ,X*16+X,0E0H
0298              290  556          DD NONE,D,RAMF,OR,DZ,6,X,7 ;R6<7
0298 005F6007       1  557          DEFB NONE+D,RAMF+OR+DZ,6*16+X,7
                            ; EXIT ROUTINE FROM THIS SECTION
029C              292  560 ST5002   DD LA,D,RAMF,OR,DZ,5,X,1 ;LA,R5<1
029C 0C5F5001       1  561          DEFB LA+D,RAMF+OR+DZ,5*16+X,1
02A0              293  563          DD RO,X,NOP,OR,ZA,X,6,X ;BIT/CELL FOR ACK TONE<R6
02A0 041C0600       1  564          DEFB RO+X,NOP+OR+ZA,X*16+6,X
02A4              294  566          DD LA,D RAMF,OR,DZ,5,X,0 ;LA,R5<0
02A4 0C5F5000       1  567          DEFB LA+D,RAMF+OR+DZ,5*16+X,0
02A8              295  569          DD NONE,D,RAMF,OR,DZ,15,X,0 ;R15<0 Z80 FLAG UNBUSY
02A8 005FF000       1  570          DEFB NONE+D,RAMF+OR+DZ,15*16+X,0
02AC              296  572          DD RO,X,NOP,OR,DZ,X,X,0C0H ;SET STATE 6
02AC 041F00C0       1  573          DEFB RO+X,NOP+OR+DZ,X*16+X,0C0H
02B0              297  575          BM R,X,X,START   ;TO START
02B0 1C200000       1  576          DEFB 1CH,R+X,X,START/4 ; >>>> START
                            ;IF ACK CODE NOT OK (0)
02B4              299  579 ST5001   DD NONE,D,NOP,SUBR,DA,X,12,0 ;STATS OF R12-1
02B4 000D0C00       1  580          DEFB NONE+D,NOP+SUBR+DA,X*16+12,0
02B8              300  582          BM R,X,Z,ST5003  ;TO ST5003 IF #0 IE ACK 2
02B8 1C20402D       1  583          DEFB 1CH,R+X,Z,ST5003/4 ; >>>> ST5003
02BC              301  585          DD LA,D,RAMF,OR,DZ,5,X,7
02BC 0C5F5007       1  586          DEFB LA+D,RAMF+OR+DZ,5*16+X,7
02C0              302  588          DD RO,X,NOP,OR,DZ,X,X,88H
02C0 041F0088       1  589          DEFB RO+X,NOP+OR+DZ,X*16+X,88H
02C4              303  591          DD LA,D,RAMF,OR,DZ,5,X,6
02C4 0C5F5006       1  592          DEFB LA+D,RAMF+OR+DZ,5*16+X,6
02C8              304  594          DD RO,X,NOP,OR,DZ,X,X,88H
02C8 041F0088       1  595          DEFB RO+X,NOP+OR+DZ,X*16+X,88H
02CC              305  597          DD LA,D,RAMF,OR,DZ,5,X,5
02CC 0C5F5005       1  598          DEFB LA+D,RAMF+OR+DZ,5*16+X,5
02D0              306  600          DD RO,X,NOP,OR,DZ,X,X,88H
02D0 041F0088       1  601          DEFB RO+X,NOP+OR+DZ,X*16+X,88H
02D4              307  603          DD LA,D,RAMF,OR,DZ,5,X,4
02D4 0C5F5004       1  604          DEFB LA+D,RAMF+OR+DZ,5*16+X,4
02D8              308  606          DD RO,X,NOP,OR,DZ,X,X,88H ;ABOVE LOADS RAPID BURST CODE
02D8 041F0088       1  607          DEFB RO+X,NOP+OR+DZ,X*16+X,88H
                            ;                             FOR PHYSICAL ERROR
02DC              310  610          DD NONE,D,RAMF,OR,DZ,6,X,4 ;R6<4 START CELL OF BURST
02DC 005F6004       1  611          DEFB NONE+D,RAMF+OR+DZ,6*16+X,4
02E0              311  613          BM R,X,X,ST5002  ;TO EXIT RTN
```

```
02E0 1C2000A7       1  614           DEFB 1CH,R+X,X,ST5002/4 ; >>>> ST5002
                            ; REMAINDER OF THIS ROUTINE FOLLOWS STATE 1 CODE
                            ;
                            ;****************************************************
0300              315  619           ORG  300H        ;WORD ADDRESS COH, ENTRY FOR STATE 6
                            ;STATE 6: ACKNOWLEDGING TO DEVICE
0300              317  621 ST6000    BPT
0300 00000000       1  622           DEFB 0,0,0,0     ;PATCHABLE B/PT
0304              318  624           BM R,X,TT,START  ;TO START IF T=0 IE NOT TIMER CYCLE
0304 1C200100       1  625           DEFB 1CH,R+X,TT,START/4 ; >>>> START
0308              319  627           DD LA,D,RAMF,OR,DZ,5,X,1 ;R5,LA<1
0308 0C5F5001       1  628           DEFB LA+D,RAMF+OR+DZ,5*16+X,1
030C              320  630           DD NONE,RI,RAMF,OR,DZ,2,X,X ;R2<RAM1 IE BIT/CELL
030C 025F2000       1  631           DEFB NONE+RI,RAMF+OR+DZ,2*16+X,X
0310              321  633           DD NONE,X,RAMF,OR,ZA,6,2,X ;R6<R2
0310 005C6200       1  634           DEFB NONE+X,RAMF+OR+ZA,6*16+2,X
0314              322  636           DD NONE,D,RAMF,ADD,DA,2,2,10H ;R2<R2+10H  NEXT BIT
0314 00452210       1  637           DEFB NONE+D,RAMF+ADD+DA,2*16+2,10H
0318              323  639           BM R,X,F3H,ST6001 ;SKIP IF BIT<=7
0318 1C200BC8       1  640           DEFB 1CH,R+X,F3H,ST6001/4 ; >>>> ST6001
031C              324  642           DD NONE,D,RAMF,ADD,DA,2,2,81H ;BITO NEXT CELL
031C 00452281       1  643           DEFB NONE+D,RAMF+ADD+DA,2*16+2,81H
0320              325  645 ST6001    DD RO,X,NOP,OR,ZA,X,2,X ;RAM1<R2 UPDATE BC
0320 041C0200       1  646           DEFB RO+X,NOP+OR+ZA,X*16+2,X
0324              326  648           DD LA,X,NOP,OR,ZA,X,6,X ;LA<R6 IE LA<CELL BEFORE UPDATE
0324 0C1C0600       1  649           DEFB LA+X,NOP+OR+ZA,X*16+6,X
0328              327  651           DD NONE,RI,RAMF,OR,DZ,3,X,X ;R3<BYTE C
0328 025F3000       1  652           DEFB NONE+RI,RAMF+OR+DZ,3*16+X,X
032C              328  654           DD E,D,NOP,AND,DA,X,3,80H ;EA<BIT7 OF R3
032C 18250380       1  655           DEFB E+D,NOP+AND+DA,X*16+3,80H
0330              329  657           DD NONE,X,RAMU,OR,ZA,3,3,X ;R3<SHIFT LEFT(R3)
0330 00DC3300       1  658           DEFB NONE+X,RAMU+OR+ZA,3*16+3,X
0334              330  660           DD RO,X,NOP,OR,ZA,X,3,X ;RAM(C)<R3 UPDATE WITH SHIFTED VALUE
0334 041C0300       1  661           DEFB RO+X,NOP+OR+ZA,X*16+3,X
0338              331  663           DD LA,D,RAMF,OR,DZ,5,X,0 ;R5,LA<0
0338 0C5F5000       1  664           DEFB LA+D,RAMF+OR+DZ,5*16+X,0
033C              332  666           DD NONE,X,NOP,OR,ZA,X,2,X ;STATS OF R2 (UPDATED BC)
033C 001C0200       1  667           DEFB NONE+X,NOP+OR+ZA,X*16+2,X
0340              333  669           BM R,X,F3L,START ;TO START IF CELL<=7
0340 1C200400       1  670           DEFB 1CH,R+X,F3L,START/4 ; >>>> START
0344              334  672           DD RO,D,RAMF,OR,DZ,1,X,0E0H ;SET STATE 7
0344 045F10E0       1  673           DEFB RO+D,RAMF+OR+DZ,1*16+X,0E0H
0348              335  675           BM R,X,X,START   ;TO START
0348 1C200000       1  676           DEFB 1CH,R+X,X,START/4 ; >>>> START
                            ;****************************************************
0380              337  679           ORG  380H        ;WORD ADDRESS EOH, ENTRY FOR STATE 7
                            ;STATE 7: CLEARING SUB-CHANNEL FOR NEXT BADGE
0380              339  681 ST7000    BPT
0380 00000000       1  682           DEFB 0,0,0,0     ;PATCHABLE B/PT
0384              340  684           DD RO,D,NOP,OR,DZ,X,X,0FH ;STATE 0 AND FRESH TIME OUT VALUE
0384 ..1F000F       1  685           DEFB RO+D,NOP+OR+DZ,X*16+X,0FH
0388              341  687           DD LA,D,RAMF,OR,DZ,5,X,1 ;LA,R5<1
0388 0C5F5001       1  688           DEFB LA+D,RAMF+OR+DZ,5*16+X,1
038C              342  690           DD RO,D,NOP,OR,DZ,X,X,2 ;BIT/CELL BYTE<02H
```

```
038C 041F0002      1  691         DEFB RO+D,NOP+OR+DZ,X*16+X,2
0390             343  693         DD NONE,D,RAMF,OR,DZ,4,X,6 ;R4<6
0390 005F4006      1  694         DEFB NONE+D,RAMF+OR+DZ,4*16+X,6
0394             344  696         DD LA,D,RAMF,OR,DZ,5,X,2 ;LA,R5<2
0394 0C5F5002      1  697         DEFB LA+D,RAMF+OR+DZ,5*16+X,2
0398             345  699 ST7001  DD RO,D,NOP,OR,DZ,X,X,0 ;RAM(C)<0
0398 041F0000      1  700         DEFB RO+D,NOP+OR+DZ,X*16+X,0
039C             346  702         DD LA,D,RAMF,ADD,DA,5,5,1 ;LA,R5<R5+1
039C 0C455501      1  703         DEFB LA+D,RAMF+ADD+DA,5*16+5,1
03A0             347  705         DD NONE,D,RAMF,SUBR,DA,4,4,0 ;DECR COUNTER
03A0 004D4400      1  706         DEFB NONE+D,RAMF+SUBR+DA,4*16+4,0
03A4             348  708         BM R,X,Z,ST7001  ;LOOP BACK IF NOT DONE
03A4 1C2040E6      1  709         DEFB 1CH,R+X,Z,ST7001/4 ; >>>> ST7001
03A8             349  711         BM R,X,X,START   ;TO START NOW ALL ZERO
03A8 1C200000      1  712         DEFB 1CH,R+X,X,START/4 ; >>>> START
                          ;*******************************************************
                          ;CONTINUATION OF RESET ROUTINE .....
                          ;CAUSES A MASKED SCAN OF ALL S/CHANS TO RESET LATCHES-
                          ;ON THE CHANNEL CARDS AFTER POWER ON.
                          ;CODE IS AS NORMAL BASE SCAN.
03AC             355  719 RST003  DD LAE,D,RAMF,OR,DZ,5,X,40H
03AC 145F5040      1  720         DEFB LAE+D,RAMF+OR+DZ,5*16+X,40H
03B0             356  722         DD HA,D,RAMF,ADD,DA,0,0,2
03B0 10450002      1  723         DEFB HA+D,RAMF+ADD+DA,0*16+0,2
03B4             357  725         BM R,X,Z,RST004  ;SKIP IF S/C IS NOT ZERO
03B4 1C2040F1      1  726         DEFB 1CH,R+X,Z,RST004/4 ; >>>> RST004
03B8             358  728         DD E,D,NOP,OR,DZ,X,X,60H
03B8 181F0060      1  729         DEFB E+D,NOP+OR+DZ,X*16+X,60H
03BC             359  731         DD E,D,NOP,OR,DZ,X,X,40H
03BC 181F0040      1  732         DEFB E+D,NOP+OR+DZ,X*16+X,40H
03C0             360  734         DD NONE,X,NOP,X,X,X,X,X
03C0 00000000      1  735         DEFB NONE+X,NOP+X+X,X*16+X,X
03C4             361  737 RST004  DD LAE,D,RAMF,OR,DZ,5,X,0
03C4 145F5000      1  738         DEFB LAE+D,RAMF+OR+DZ,5*16+X,0
03C8             362  740         BPT
03C8 00000000      1  741         DEFB 0,0,0,0      ;PATCHABLE B/PT
03CC             363  743         BPT
03CC 00000000      1  744         DEFB 0,0,0,0      ;PATCHABLE B/PT
03D0             364  746         BPT
03D0 00000000      1  747         DEFB 0,0,0,0      ;PATCHABLE B/PT
03D4             365  749         BPT
03D4 00000000      1  750         DEFB 0,0,0,0      ;PATCHABLE B/PT
03D8             366  752         BPT
03D8 00000000      1  753         DEFB 0,0,0,0      ;PATCHABLE B/PT
03DC             367  755         BPT
03DC 00000000      1  756         DEFB 0,0,0,0      ;PATCHABLE B/PT
03E0             368  758         BPT
03E0 00000000      1  759         DEFB 0,0,0,0      ;PATCHABLE B/PT
03E4             369  761         BPT
03E4 00000000      1  762         DEFB 0,0,0,0      ;PATCHABLE B/PT
03E8             370  764         BPT
03E8 00000000      1  765         DEFB 0,0,0,0      ;PATCHABLE B/PT
03EC             371  767         BPT
03EC 00000000      1  768         DEFB 0,0,0,0      ;PATCHABLE B/PT
```

```
03F.               372  770          BM X,X,RESET,RST003 ;LOOP UNTIL RESET LINE GOES OFF.
03F0 1C0080EB        1  771          DEFB 1CH,X+X,RESET,RST003/4 ; >>>> RST003
03F4               373  773          BM R,X,X,START    ;THEN TO START
03F4 1C200000        1  774          DEFB 1CH,R+X,X,START/4 ; >>>> START
03FB               374  776          END
```

APPENDIX II

```
                      1          TITLE PCI MOSTEK ROM LOADER
                    ; **** 16.55 25JAN82 ****
                    ;
                    ; MACROS .....
                      5 CDELAY  MACRO            ;DELAY APPR 1 SEC IF SWO ON
                  1   6         IN   A,(PIO1+2)
                  2   7         AND  1
                  3   8         JR   Z,+17
                  4   9         LD   B,4
                  5  10         OR   A
                  6  11         LD   HL,0
                  7  12         LD   DE,1
                  8  13         ADC  HL,DE
                  9  14         JR   NZ,-2
                 10  15         DJNZ -4
                 11  16         MEND
                     17 DISP    MACRO #N
                  1  18         LD   A,#N
                  2  19         OUT  (PIO1),A
                  3  20         MEND
                     21 CSUM    MACRO
                  1  22         XOR  A
                  2  23         LD   HL,2047
                  3  24         LD   DE,1
                  4  25         ADD  A,(IX)
                  5  26         INC  IX
                  6  27         OR   A
                  7  28         SBC  HL,DE
                  8  29         JR   NZ,-8
                  9  30         SUB  (IX)
                 10  31         INC  IX
                 11  32         MEND
                     33 HALTNZ  MACRO
                  1  34         JR   Z,+3
                  2  35         HALT
                  3  36         MEND
                     37 OUTN    MACRO #P,#N
                  1  38         LD   A,#N
                  2  39         OUT  (#P),A
                  3  40         MEND
                    ;
      =0050          42 P.01    EQU  50H
                    ;
0000'F3              44 START   DI
0001                 45         OUTN PIO1,0FFH
0001 3EFF         1  46         LD   A,0FFH
0003 D350         2  47         OUT  (PIO1),A
                  3  48         MEND
```

```
0005 D352         46   49        OUT   (PIO1+2),A
0007              47   50        OUTN  PIO1+1,0CFH
0007 3ECF          1   51        LD    A,0CFH
0009 D351          2   52        OUT   (PIO1+1),A
                   3   53        MEND
000B              48   54        OUTN  PIO1+1,0
000B 3E00          1   55        LD    A,0
000D D351          2   56        OUT   (PIO1+1),A
                   3   57        MEND
000F              49   58        OUTN  PIO1+3,0CFH
000F 3ECF          1   59        LD    A,0CFH
0011 D353          2   60        OUT   (PIO1+3),A
                   3   61        MEND
0013              50   62        OUTN  PIO1+3,-1
0013 3EFF          1   63        LD    A,-1
0015 D353          2   64        OUT   (PIO1+3),A
                   3   65        MEND
0017 DD210000     51   66        LD    IX,0
001B              52   67        DISP  0
001B 3E00          1   68        LD    A,0
001D D350          2   69        OUT   (PIO1),A
                   3   70        MEND
001F              53   71        CSUM  ROM 0 -- LOADER ITSELF
001F AF            1   72        XOR   A
0020 21FF07        2   73        LD    HL,2047
0023 110100        3   74        LD    DE,1
0026 DDB600        4   75        ADD   A,(IX)
0029 DD23          5   76        INC   IX
002B B7            6   77        OR    A
002C ED52          7   78        SBC   HL,DE
002E 20F6          8   79        JR    NZ,-8
0030 DD9600        9   80        SUB   (IX)
0033 DD23         10   81        INC   IX
                  11   82        MEND
0035              54   83        HALTNZ
0035 2801          1   84        JR    Z,+3
0037 76            2   85        HALT
                   3   86        MEND
003B              55   87        DISP  1
003B 3E01          1   88        LD    A,1
003A D350          2   89        OUT   (PIO1),A
                   3   90        MEND
003C              56   91        CSUM  ROM 1 -- F/G Z80 CODE
003C AF            1   92        XOR   A
003D 21FF07        2   93        LD    HL,2047
0040 110100        3   94        LD    DE,1
0043 DDB600        4   95        ADD   A,(IX)
0046 DD23          5   96        INC   IX
0048 B7            6   97        OR    A
0049 ED52          7   98        SBC   HL,DE
004B 20F6          8   99        JR    NZ,-8
004D DD9600        9  100        SUB   (IX)
0050 DD23         10  101        INC   IX
                  11  102        MEND
```

```
0052            57  103            HALTNZ
0052 2801        1  104            JR    Z,+3
0054 76          2  105            HALT
                 3  106            MEND
0055            58  107            DISP  2
0055 3E02        1  108            LD    A,2
0057 D350        2  109            OUT   (PIO1),A
                 3  110            MEND
0059            59  111            CSUM  ROM 2 -- B/G Z80 CODE
0059 AF          1  112            XOR   A
005A 21FF07      2  113            LD    HL,2047
005D 110100      3  114            LD    DE,1
0060 DDB600      4  115            ADD   A,(IX)
0063 DD23        5  116            INC   IX
0065 B7          6  117            OR    A
0066 ED52        7  118            SBC   HL,DE
0068 20F6        8  119            JR    NZ,-8
006A DD9600      9  120            SUB   (IX)
006D DD23       10  121            INC   IX
                11  122            MEND
006F            60  123            HALTNZ
006F 2801        1  124            JR    Z,+3
0071 76          2  125            HALT
                 3  126            MEND
0072            61  127            DISP  3
0072 3E03        1  128            LD    A,3
0074 D350        2  129            OUT   (PIO1),A
                 3  130            MEND
0076            62  131            CSUM  ROM 3 -- MICRO-CODE
0076 AF          1  132            XOR   A
0077 21FF07      2  133            LD    HL,2047
007A 110100      3  134            LD    DE,1
007D DDB600      4  135            ADD   A,(IX)
0080 DD23        5  136            INC   IX
0082 B7          6  137            OR    A
0083 ED52        7  138            SBC   HL,DE
0085 20F6        8  139            JR    NZ,-8
0087 DD9600      9  140            SUB   (IX)
008A DD23       10  141            INC   IX
                11  142            MEND
008C            63  143            HALTNZ
008C 2801        1  144            JR    Z,+3
008E 76          2  145            HALT
                 3  146            MEND
                           ; END OF ROM CHECKSUM VERIFICATION
008F            65  148            DISP  10H
008F 3E10        1  149            LD    A,10H
0091 D350        2  150            OUT   (PIO1),A
                 3  151            MEND
0093 DD210040   66  152            LD    IX,4000H
0097 210080     67  153            LD    HL,8000H
009A 110100     68  154            LD    DE,1
009D 3E01       69  155            LD    A,1
009F CB27       70  156  L1039     SLA   A
```

```
00A1 FE80        71  157           CP   80H
00A3 2002        72  158           JR   NZ,L1040-$
00A5 3E01        73  159           LD   A,1
00A7'DD7700      74  160 L1040     LD   (IX),A
00AA DD23        75  161           INC  IX
00AC B7          76  162           OR   A
00AD ED52        77  163           SBC  HL,DE
00AF 20EE        78  164           JR   NZ,L1039-$
                         ;
00B1 DD210040    80  166           LD   IX,4000H
00B5 210080      81  167           LD   HL,8000H
00B8 3E01        82  168           LD   A,1
00BA'CB27        83  169 L1041     SLA  A
00BC FE80        84  170           CP   80H
00BE 2002        85  171           JR   NZ,L1042-$
00C0 3E01        86  172           LD   A,1
00C2'DDBE00      87  173 L1042     CP   (IX)
00C5             88  174           HALTNZ
00C5 2801         1  175           JR   Z,+3
00C7 76           2  176           HALT
                  3  177           MEND
00C8 DD23        89  178           INC  IX
00CA B7          90  179           OR   A
00CB ED52        91  180           SBC  HL,DE
00CD 20EB        92  181           JR   NZ,L1041-$
                         ; END OF RAM TEST
00CF             94  183           DISP 21H
00CF 3E21         1  184           LD   A,21H
00D1 D350         2  185           OUT  (PIO1),A
                  3  186           MEND
00D3 110040      95  187           LD   DE,4000H
00D6 210008      96  188           LD   HL,800H
00D9 010008      97  189           LD   BC,800H
00DC EDB0        98  190           LDIR                 ;COPY F/6 ROM TO RAM
00DE DD210040    99  191           LD   IX,4000H
00E2            100  192           CSUM
00E2 AF           1  193           XOR  A
00E3 21FF07       2  194           LD   HL,2047
00E6 110100       3  195           LD   DE,1
00E9 DD8600       4  196           ADD  A,(IX)
00EC DD23         5  197           INC  IX
00EE B7           6  198           OR   A
00EF ED52         7  199           SBC  HL,DE
00F1 20F6         8  200           JR   NZ,-8
00F3 DD9600       9  201           SUB  (IX)
00F6 DD23        10  202           INC  IX
                 11  203           MEND
00F8            101  204           HALTNZ
00F8 2801         1  205           JR   Z,+3
00FA 76           2  206           HALT
                  3  207           MEND
00FB            102  208           DISP 22H
00FB 3E22         1  209           LD   A,22H
00FD D350         2  210           OUT  (PIO1),A
```

```
                  3  211            MEND
00FF 110048     103  212            LD   DE,4800H
0102 210010     104  213            LD   HL,1000H
0105 010008     105  214            LD   BC,800H
0108 EDB0       106  215            LDIR               ;COPY B/6 ROM TO RAM
010A            107  216            CSUM
010A AF           1  217            XOR  A
010B 21FF07       2  218            LD   HL,2047
010E 110100       3  219            LD   DE,1
0111 DD8600       4  220            ADD  A,(IX)
0114 DD23         5  221            INC  IX
0116 B7           6  222            OR   A
0117 ED52         7  223            SBC  HL,DE
0119 20F6         8  224            JR   NZ,-8
011B DD9600       9  225            SUB  (IX)
011E DD23        10  226            INC  IX
                 11  227            MEND
0120            108  228            HALTNZ
0120 2801         1  229            JR   Z,+3
0122 76           2  230            HALT
                  3  231            MEND
0123            109  232            DISP 23H
0123 3E23         1  233            LD   A,23H
0125 D350         2  234            OUT  (PIO1),A
                  3  235            MEND
0127 110050     110  236            LD   DE,5000H
012A 210018     111  237            LD   HL,1800H
012D 010008     112  238            LD   BC,800H
0130 EDB0       113  239            LDIR               ;COPY MICRO-CODE TO RAM
0132            114  240            CSUM
0132 AF           1  241            XOR  A
0133 21FF07       2  242            LD   HL,2047
0136 110100       3  243            LD   DE,1
0139 DD8600       4  244            ADD  A,(IX)
013C DD23         5  245            INC  IX
013E B7           6  246            OR   A
013F ED52         7  247            SBC  HL,DE
0141 20F6         8  248            JR   NZ,-8
0143 DD9600       9  249            SUB  (IX)
0146 DD23        10  250            INC  IX
                 11  251            MEND
0148            115  252            HALTNZ
0148 2801         1  253            JR   Z,+3
014A 76           2  254            HALT
                  3  255            MEND
                         ; END OF ROM-RAM COPIES AND TESTS IN RAM
014B            117  257            DISP 33H
014B 3E33         1  258            LD   A,33H
014D D350         2  259            OUT  (PIO1),A
                  3  260            MEND
014F'DB52       118  261 L1050      IN   A,(PIO1+2)
0151 FEFF       119  262            CP   0FFH
0153 CA00E0     120  263            JP   Z,0E000H      ; TO DDT IF SWITCHES ALL ON >
                                                       >>>>>>>>
```

```
                                ;
0156 C30040      122  265        JP    4000H      ;ENTER RAM >>>>>>>>>>>>>>>>>
                                                  >>>>>>
0159             123  266        END
```

APPENDIX III

```
         1         TITLE PCI MOSTEK Z80 NMUX PROGRAM
           ; $$$$ 18.33 25JAN82 $$$$$
           ;$$$ LIST 0
           ; MACROS ........
         5 WAIT    MACRO #LED,#SW
           ; DISPLAY #LED AND LOOP IF (SWTCH&#SW)=NZ !!
    2    7         LD    A,#LED
    3    8         OUT   (PIO1),A
    4    9         IN    A,(PIO1+2)
    5   10         AND   #SW
    6   11         JR    NZ,-4
    7   12         MEND
        13 LOOP    MACRO #AD,#LED,#SW
           ; DISPLAY #LED, GOTO #AD IF (SWTCH&#SW)=NZ !
    2   15         LD    A,#LED
    3   16         OUT   (PIO1),A
    4   17         IN    A,(PIO1+2)
    5   18         AND   #SW
    6   19         JP    NZ,#AD
    7   20         MEND
        21 BPT     MACRO
    1   22         JP    $+23 ;PATCHABLE BREAKPOINT
    2   23         DEFB 0,0,0,0,0,0,0,0,0,0
    3   24         DEFB 0,0,0,0,0,0,0,0,0,0
    4   25         MEND
        26 INCW    MACRO #ADDR       ;INCREMENT L-H WORD AT ADDRES
                                     S
    1   27         PUSH HL
    2   28         LD    HL,(#ADDR)
    3   29         INC   HL
    4   30         LD    (#ADDR),HL
    5   31         POP   HL
    6   32         MEND
        33 DECW    MACRO #ADDR       ;DECREMENT L-H WORD AT ADDRES
                                     S
    1   34         PUSH HL
    2   35         LD    HL,(#ADDR)
    3   36         DEC   HL
    4   37         LD    (#ADDR),HL
    5   38         POP   HL
    6   39         MEND
        40 TERM    MACRO #A          ;HALT WITH CODE IN LEDS
    1   41         LD    A,#A
    2   42         OUT   (PIO),A
    3   43         HALT
    4   44         JR    -1
    5   45         MEND
```

```
              46 OUTN    MACRO  #P,#N
    1   47            LD    A,#N
    2   48            OUT   (#P),A
    3   49            MEND
        50 FILL    MACRO  #FROM,#TO,#WITH
           ;FILL FROM #FROM TO #TO WITH #WITH
    2   52            MLOCAL L1
    3   53            MIF   (.RES.#TO-#FROM)<2 THEN L1
    4   54            LD    A,#WITH
    5   55            LD    DE,#FROM
    6   56            LD    (DE),A
    7   57            LD    H,D
    8   58            LD    L,E
    9   59            INC   DE
   10   60            LD    BC,.RES.#TO-#FROM
   11   61            LDIR
   12   62            MEXIT
   13   63 L1         MERROR FILL STRING TOO SHORT
   14   64            MEND
              ;
              66       LIST  1
              67       CLIST 0
              ;
=007C         69 CTC     EQU   7CH        ;PORT ADDRESSES
=0060         70 SIO     EQU   60H
=0050         71 PIO     EQU   50H
=0050         72 PIO1    EQU   50H
=0054         73 PIO2    EQU   54H
=0054         74 PIO2A   EQU   54H
=0056         75 PIO2B   EQU   56H
              ;
=F2A4         77 MINLIS  EQU   0F2A4H     ;MDX DEVSYS ENTRY PT.
              ;
=6000         79 TRANST  EQU   6000H      ;START OF TRANS AREA
=BFFF         80 TRANEN  EQU   0BFFFH     ;END
=0C00         81 SLOTS   EQU   0C00H      ;3K FOR MOSTEK
                ;FOLLOWING MUST RETAIN TRAILING ZEROS
=5800         83 SUBCHS  EQU   5800H      ;START OF S/C TABLE
=0008         84 PARWKL  EQU   8          ;LENGTH OF PARITY WORK AREA
=4100         85 VARST   EQU   4100H      ;START OF VARIABLES AND ORIGI
                                          N-
              ;-OF DIAGNOSTIC PAGE.
              ;
4000          88         ORG   04000H
4000'C3A742'  89 ORIGIN  JP    START      ;SKIP OVER VECTORS ETC.
4003 434F5059 90         DEFM  'COPYRIGHT P.C.I. LIMITED 1982'
     52494748
     5420502E
     432E492E
     204C494D
     49544544
     20313938
     32
=4020'        91 CONT    EQU   $          ;MUST BE MOD 16 BOUNDARY
```

```
                       ;
4020'3C40'     CTCVEC  DEFW TRAP       ;TO TRAPCELL
4022 A4F2              DEFW MINLIS     ;MINIMUM LISTENER MDX DEVSY6
4024 3C40'             DEFW TRAP
4026 4D44'             DEFW ONESEC     ;ONE SECOND TIMER
                       ;
4028'3C40'     SIOVEC  DEFW TRAP       ;SIO CH B XMIT BUF EMPTY
402A 3C40'             DEFW TRAP       ;EXT STATUS CHANGE
402C 3C40'             DEFW TRAP       ;RECV CHAR AVAILABLE
402E 3C40'             DEFW TRAP       ;SPEC RECV COND
                       ; ABOVE TRAPS SINCE PORT B UNUSED
4030 DF44'             DEFW SIATBE     ;CH A
4032 3C40'             DEFW TRAP       ;EXT STATUS, NOT USED
4034 6544'             DEFW SIARCA
4036 D544'             DEFW SIASRC
                       ; PORT A OF PIO 2
4038'7845'     PIAVEC  DEFW PIAOUT     ;PIO BIDIREC OUT
403A 3845'             DEFW PIAIN      ;IN
                       ;
403C'          TRAP    TERM OEEH       ;TERMINAL ERROR ****
403C 3EEE              LD   A,OEEH
403E D350              OUT  (PIO),A
4040 76                HALT
4041 18FD              JR   -1
                       ;
                       ;CONSTANTS .....
4043'000C      NSLOTS  DEFW SLOTS      ;3K SLOTS IN MOSTEK
                       ; COLUMNS IN FOLL ARRAY ARE 0123=CURRENT STATE
                       ; ROWS ARE LOG,OP,BUND,RESVD,LOG(BIT29)
                       ; CELLS ARE CURR-STATE (7,6), LOGERR (5), NEXTSTATE (1
                                                  ,0)
     =4045'    STABLE  EQU  $
4045 014080C0          DEFB 00000001B,01000000B,10000000B,11000000B
4049 204282E3          DEFB 00100000B,01000010B,10000010B,11100011B
404D 206183C3          DEFB 00100000B,01100001B,10000011B,11000011B
4051 2061A2E3          DEFB 00100000B,01100001B,10100010B,11100011B
4055 004080C0          DEFB 00000000B,01000000B,10000000B,11000000B
                       ;    ECC BIT MASKS
4059'55555555  MASK0   DEFB 01010101B,01010101B,01010101B,01010101B
405D'66666666  MASK1   DEFB 01100110B,01100110B,01100110B,01100110B
4061'78787878  MASK2   DEFB 01111000B,01111000B,01111000B,01111000B
4065'7F807F80  MASK3   DEFB 01111111B,10000000B,01111111B,10000000B
4069'7FFF8000  MASK4   DEFB 01111111B,11111111B,10000000B,00000000B
                       ;BITS        33222222  22221111  11111100  00000000
                       ;            10987654  32109876  54321098  76543210
                       ;
     =406D'    BOTSTK  EQU  $
                       ;
                       ;VARIABLES ......
4100                   ORG  VARST
4100                   DEFS 64          ;TOP 32 WORDS OF STACK
     =4140'    TOPSTK  EQU  $
4140'00        TYPE    DEFB 0           ;WORK AREAS FOR LOGICAL ERR R
                                        TN (BADGE TYPE)
```

Swap & ensure low-order address digit of SIOVEC is zero.

| | | | | |
|---|---|---|---|---|
| 4141'00 | 140 | 145 CSTATE | DEFB 0 | ;CURRENT STATE OF OID |
| 4142'00 | 141 | 146 CELL | DEFB 0 | ;CONTENTS OF TRANSITION TABLE CELL |
| 4143'00 | 142 | 147 SUBCHA | DEFB 0 | ;ACTIVE SUB-CHANNEL |
| 4144'00 | 143 | 148 ACKCD | DEFB 0 | ;ACKNOWLEDGE CODE |
| 4145'00000000 | 144 | 149 CLOCK | DEFB 0,0,0,0 | ;32-BIT RELATIVE SECS |
| 4149'0000 | 145 | 150 NMXSTA | DEFW 0 | ;NMUX STATUS ?? |
| 414B'0000 | 146 | 151 LSTRNO | DEFW 0 | ;LAST TRAN# IN MEM |
| | | ;** NOTE TRANS NOS START AT 1 ** | | |
| 414D'000C | 148 | 153 NLEFT | DEFW SLOTS | ;NO OF SLOTS LEFT |
| 414F'0000 | 149 | 154 HITRAN | DEFW 0 | ;HIGHEST TRN# SENT |
| 4151'0000 | 150 | 155 NREADS | DEFW 0 | ;NO OF READS |
| 4153'0000 | 151 | 156 NPERTO | DEFW 0 | ;#PHYERS DUE TO TIMEOUT |
| 4155'0000 | 152 | 157 NPEINI | DEFW 0 | ;# OF INITIAL PARITY/ECC ERRS |
| 4157'0000 | 153 | 158 NPERCO | DEFW 0 | ;#ERRORS CORR BY ECC |
| 4159'0000 | 154 | 159 NGOOD | DEFW 0 | ;# OF GOOD BLOCKS |
| 415B'0000 | 155 | 160 NPHYER | DEFW 0 | ;# OF PHYS ERRS |
| 415D'0000 | 156 | 161 NLOGER | DEFW 0 | ;#LOGICAL ERRORS |
| | | ; | | |
| 415F'0000 | 158 | 163 NGHIN | DEFW 0 | ;#GOOD HOST INBLOCKS |
| 4161'0000 | 159 | 164 NBHIN | DEFW 0 | ;#BAD HOST INBLOCKS |
| 4163'0000 | 160 | 165 NHOUT | DEFW 0 | ;#HOST OUTBLOCKS |
| | | ; | | |
| | | ;MICRO-SEQUENCER INBLOCK AND FLAG .. | | |
| 4165'00 | 163 | 168 MSIFLG | DEFB 0 | ;0-FREE,1-BUSY.F/G,2-BUSY.B/G |
| 4166'00 | 164 | 169 MSIBCT | DEFB 0 | ;BYTE COUNTER |
| 4167'00 | 165 | 170 MSISCH | DEFB 0 | ;SUB-CHANNEL |
| 4168'00000000 00000000 | 166 | 171 MSDATA | DEFB 0,0,0,0,0,0,0,0 | ;DATA AS IN MSEQ BUFFER |
| | | ; | | |
| | | ;MICRO-SEQUENCER OUTBLOCK AND FLAG .. | | |
| 4170'00 | 169 | 174 MSOFLG | DEFB 0 | ;0-FREE,1-BUSY.B/G,2-BUSY.F/G |
| 4171'00 | 170 | 175 MSOACK | DEFB 0 | ; ACK CODE: 0-GOOD,1-PHYS,2-LOG |
| | | ; | | |
| | | ;HOST INBLOCK AND FLAG .. | | |
| 4172'00 | 173 | 178 HTIFLG | DEFB 0 | ;0-FREE,1-BUSY.F/G,2-BUSY.B/G |
| 4173'00 | 174 | 179 HTIBCT | DEFB 0 | ;BYTE COUNTER |
| 4174'0000 | 175 | 180 HTITYP | DEFW 0 | ;TRANS TYPE:-1=FULL RESET,1=OID RESET,0=TRANS REQUEST |
| 4176'0000 | 176 | 181 HTIPRT | DEFW 0 | ;PORT FOR T1,30564 FOR T-1,0 FOR T0 |
| 4178'00000000 | 177 | 182 HTITIM | DEFB 0,0,0,0 | ;TIME IN ABSOLUTE SECONDS |
| 417C'0000 | 178 | 183 HTI5 | DEFW 0 | |
| 417E'0000 | 179 | 184 HTITNO | DEFW 0 | ;TRANSNO REQUESTED |
| 4180'0000 | 180 | 185 HTI7 | DEFW 0 | |
| 4182'0000 | 181 | 186 HTI8 | DEFW 0 | |
| 4184'0000 | 182 | 187 HTI9 | DEFW 0 | |
| 4186'0000 | 183 | 188 HTIHD | DEFW 0 | ;HI WORD OF SIMULATED DATA |
| 4188'0000 | 184 | 189 HTILD | DEFW 0 | ;LO WORD **** |
| 418A'0000 | 185 | 190 HTI12 | DEFW 0 | |
| 418C'0000 | 186 | 191 HTI13 | DEFW 0 | |
| 418E'0000 | 187 | 192 HTI14 | DEFW 0 | |
| 4190'0000 | 188 | 193 HTICK1 | DEFW 0 | ;CHECKSUM 1 |

| | | | | | |
|---|---|---|---|---|---|
| 4192'0000 | 189 | 194 | HTICK2 | DEFW 0 | ;CHECKSUM 2 |

;HOST OUTBLOCK AND FLAG ..

| | | | | | |
|---|---|---|---|---|---|
| 4194'00 | 192 | 197 | HTOFLG | DEFB 0 | ;0-FREE,1-BUSY.B/G,2-BUSY.F/G |
| 4195'00 | 193 | 198 | HTOBCT | DEFB 0 | ;BYTE COUNTER |
| 4196'0101 | 194 | 199 | HTOSER | DEFB 1,1 | ;NMUX SERIAL NO,MK1 UNIT1 |
| 4198'0000 | 195 | 200 | HTOOID | DEFW 0 | ;OID PORT NO OR -1 IF NOT A TRANS |
| 419A'00000000 | 196 | 201 | HTOTIM | DEFB 0,0,0,0 | ;TIME THIS |
| 419E'0000 | 197 | 202 | HTOHTS | DEFW 0 | ;HIGHEST TRANS SENT |
| 41A0'0000 | 198 | 203 | HTOLTM | DEFW 0 | ;LAST IN MEMORY |
| 41A2'0000 | 199 | 204 | HTONFS | DEFW 0 | ;NO OF FREE SLOTS |
| 41A4'0000 | 200 | 205 | HTOMS1 | DEFW 0 | ;NMUX STATUS 1 |
| 41A6'0000 | 201 | 206 | HTOMS2 | DEFW 0 | ;NMUX STATUS 2 |
| 41A8'0000 | 202 | 207 | HTOHD | DEFW 0 | ;HI WORD OF DATA |
| 41AA'0000 | 203 | 208 | HTOLD | DEFW 0 | ;LO DATA |
| 41AC'0000 | 204 | 209 | HTOERC | DEFW 0 | ;ERROR CODE |
| 41AE'0000 | 205 | 210 | HTORS1 | DEFW 0 | ;RESERVED 1 |
| 41B0'0000 | 206 | 211 | HTORS2 | DEFW 0 | ;RESERVED 2 |
| 41B2'0000 | 207 | 212 | HTOCK1 | DEFW 0 | ;CHECKSUM 1 |
| 41B4'0000 | 208 | 213 | HTOCK2 | DEFW 0 | ;CHECKSUM 2 |
| 41B6'0000 | 210 | 215 | SIAIST | DEFB 0,0 | ;SIO IN-STATUS R0/1 |
| 41B8'0000 | 211 | 216 | SIAOST | DEFB 0,0 | ;SIO OUT-STATUS |
| 41BA'0000 | 212 | 217 | INCK1 | DEFW 0 | ;CALCULATED IN-CHECKSUM |
| 41BC'0000 | 213 | 218 | INCK2 | DEFW 0 | ; DITTO |
| 41BE'0000 | 214 | 219 | SIARCT | DEFW 0 | ;#ENTRIES TO SIO RECV RTN |
| 41C0'0000 | 215 | 220 | SIATCT | DEFW 0 | ;#ENTRIES TO SIO TRAN RTN |
| 41C2'0000 | 216 | 221 | PIAICT | DEFW 0 | ;#ENTRIES TO PIO IN RTN |
| 41C4'0000 | 217 | 222 | PIAOCT | DEFW 0 | ;#ENTRIES TO PIO OUT RTN |
| 41C6' | 218 | 223 | PARWK | DEFS PARWKL | ;DETAILS OF PARITY CHECKS |
| 41CE' | 219 | 224 | CLKWK | DEFS 4 | ;CLOCK WORK AREA FOR TIME OF HTO |
| 41D2' | 220 | 225 | TRANWK | DEFS 8 | ;WORK AREA FOR COPY OF TRANS |
| 41DA' | 221 | 226 | TRNTWK | DEFS 4 | ;WORK AREA FOR TIME PART OF TRANS |
| =41DE' | 223 | 228 | ENDVAR | EQU $ | |

;SUBROUTINES ......

| | | | | | |
|---|---|---|---|---|---|
| 41DE'3EF5 | 227 | 232 | SQLD | LD A,0F5H | ;PART OF MICRO-CODE LOADER |
| 41E0 D356 | 228 | 233 | | OUT (PIO2B),A | |
| 41E2 79 | 229 | 234 | | LD A,C | |
| 41E3 0C | 230 | 235 | | INC C | |
| 41E4 D354 | 231 | 236 | | OUT (PIO2A),A | |
| 41E6 C5 | 232 | 237 | | PUSH BC | |
| 41E7 0604 | 233 | 238 | | LD B,4 | |
| 41E9'3EF0 | 234 | 239 | SQ2 | LD A,0F0H | |
| 41EB B0 | 235 | 240 | | OR B | |
| 41EC D356 | 236 | 241 | | OUT (PIO2B),A | |
| 41EE 7E | 237 | 242 | | LD A,(HL) | |
| 41EF 23 | 238 | 243 | | INC HL | |
| 41F0 D354 | 239 | 244 | | OUT (PIO2A),A | |

```
41F2 10F5       240  245           DJNZ SQ2-$
41F4 C1         241  246           POP  BC
41F5 DB56       242  247           IN   A,(PIO2B)
41F7 E6D0       243  248           AND  0D0H
41F9 D356       244  249           OUT  (PIO2B),A
41FB F620       245  250           OR   20H
41FD D356       246  251           OUT  (PIO2B),A
41FF C9         247  252           RET
                                   ;
     =4200'     249  254  CHKSUM   EQU  $           ;CALCULATE CHECKSUM FOR
                                   ; -HOST MESSAGE BLOCK. HL->START OF BLOCK
                                   ;- DESTROYS F,B,D,E,H,L.
4200 DDE5       252  257           PUSH IX
4202 FDE5       253  258           PUSH IY
4204 060E       254  259           LD   B,14
4206 DD210000   255  260           LD   IX,0
420A FD210000   256  261           LD   IY,0
420E 56         257  262  CHKSM2   LD   D,(HL)
420F 23         258  263           INC  HL
4210 5E         259  264           LD   E,(HL)
4211 23         260  265           INC  HL
4212 DD19       261  266           ADD  IX,DE     ;ADD TO IX
4214 FD19       262  267           ADD  IY,DE     ;ADD TO IY
4216 FD29       263  268           ADD  IY,IY     ;SHIFT IY LEFT INTO CARRY
4218 3002       264  269           JR   NC,CHKSM1-$
421A FD23       265  270           INC  IY        ;ROTATE CARRY INTO LSB
421C DDE5       266  271  CHKSM1   PUSH IX        and DJNZ CHKSM2-$
421E D1         267  272           POP  DE
421F 218A41'    268  273           LD   HL,INCK1
4222 72         269  274           LD   (HL),D
4223 23         270  275           INC  HL
4224 73         271  276           LD   (HL),E
4225 23         272  277           INC  HL
4226 FDE5       273  278           PUSH IY
4228 D1         274  279           POP  DE
4229 72         275  280           LD   (HL),D
422A 23         276  281           INC  HL
422B 73         277  282           LD   (HL),E
422C FDE1       278  283           POP  IY
422E DDE1       279  284           POP  IX
4230 C9         280  285           RET
                                   ;
     =4231'     282  287  ECC      EQU  $         ;CHECK ONE ECC BIT UNDER MASK
                                   ; -POINTED TO BY HL.
                                   ; RETURN A=1 IF 32-BIT PARITY UNDER MASK IS EVEN,
                                   ; ELSE A=0.
4231 C5         286  291           PUSH BC
4232 D5         287  292           PUSH DE
4233 0E00       288  293           LD   C,0
4235 0604       289  294           LD   B,4
4237 116A41'    290  295           LD   DE,MSDATA+2
423A 1A         291  296  ECC1     LD   A,(DE)
423B A6         292  297           AND  (HL)
423C 23         293  298           INC  HL
```

```
423D 13          294 299         INC   DE
423E EA4242'     295 300         JP    PE,ECC2
4241 0C          296 301         INC   C           ;C COUNTS BYTES WITH ODD PARITY

4242 10F6        297 302  ECC2   DJNZ  ECC1-$
4244 79          298 303         LD    A,C
4245 E601        299 304         AND   1
4247 EE01        300 305         XOR   1
4249 D1          301 306         POP   DE
424A C1          302 307         POP   BC
424B C9          303 308         RET

=424C'           305 310  HTOCSM EQU   $           ;CALC AND INSERT HOST OUT-BLOCK CHECKSUM

424C 219641'     306 311         LD    HL,HTOSER
424F CD0042'     307 312         CALL  CHKSUM
4252 21BA41'     308 313         LD    HL,INCK1
4255 11B241'     309 314         LD    DE,HTOCK1
4258 010400      310 315         LD    BC,4
425B EDB0        311 316         LDIR
425D C9          312 317         RET

=425E'           314 319  HTOF   EQU   $           ;FORMAT BASIC HTO BLOCK
425E FDE5        315 320         PUSH  IY
4260 21FFFF      316 321         LD    HL,-1
4263 229841'     317 322         LD    (HTOOID),HL
4266 FD219641'   318 323         LD    IY,HTOSER
426A 2A4F41'     319 324         LD    HL,(HITRAN)
426D FD7408      320 325         LD    (IY+8),H
4270 FD7509      321 326         LD    (IY+9),L
4273 119A41'     322 327         LD    DE,HTDTIM
4276 217841'     323 328         LD    HL,HTITIM
4279 010400      324 329         LD    BC,4
427C F3          325 330         DI
427D EDB0        326 331         LDIR
427F 2A4B41'     327 332         LD    HL,(LSTRNO)   [replaced: LD HL,(HTITNO) / LD (HTOHTS),HL / LD HL,(LSTRNO) / LD (HTOLTM),HL / LD A,L / LD L,H / LD H,A]
4282 FD740A      328 333         LD    (IY+10),H
4285 FD750B      329 334         LD    (IY+11),L
4288 2A4D41'     330 335         LD    HL,(NLEFT)
428B FD740C      331 336         LD    (IY+12),H
428E FD750D      332 337         LD    (IY+13),L
4291 3AAD41'     333 338         LD    A,(HTOERC+1) ;SAVE ERROR CODE
4294 4F          334 339         LD    C,A
4295 21A441'     335 340         LD    HL,HTOMS1
4298 AF          336 341         XOR   A
4299 0612        337 342         LD    B,18
429B 77          338 343  HTOF1  LD    (HL),A
429C 23          339 344         INC   HL
429D 10FC        340 345         DJNZ  HTOF1-$      ;ZERO REST
429F 79          341 346         LD    A,C
42A0 32AD41'     342 347         LD    (HTOERC+1),A
42A3 FDE1        343 348         POP   IY
42A5 FB          344 349         EI
42A6 C9          345 350         RET
```

```
                    ;
                    ;
        =42A7'   348  353 START   EQU  $
42A7 F3          349  354         DI
42A8 ED5E        350  355         IM   2            ;Z80 INTERRUPT MODE
42AA 210040'     351  356         LD   HL,ORIGIN
42AD 7C          352  357         LD   A,H
42AE ED47        353  358         LD   I,A          ;SET VECTOR PAGE TO 40H
42B0 314041'     354  359         LD   SP,TOPSTK    ;INIT SP
42B3             355  360         FILL BOTSTK,ENDVAR-1,0
42B3 3E00          4  364         LD   A,0
42B5 116D40'       5  365         LD   DE,BOTSTK
42B8 12            6  366         LD   (DE),A
42B9 62            7  367         LD   H,D
42BA 6B            8  368         LD   L,E
42BB 13            9  369         INC  DE
42BC 017001       10  370         LD   BC,.RES.ENDVAR-1-BOTSTK
42BF EDB0         11  371         LDIR
42C1             356  373         FILL PARWK,PARWK+PARWKL-1,0
42C1 3E00          4  377         LD   A,0
42C3 11C641'       5  378         LD   DE,PARWK
42C6 12            6  379         LD   (DE),A
42C7 62            7  380         LD   H,D
42C8 6B            8  381         LD   L,E
42C9 13            9  382         INC  DE
42CA 010700       10  383         LD   BC,.RES.PARWK+PARWKL-1-PARWK
42CD EDB0         11  384         LDIR
42CF             357  386         FILL SUBCHS,TRANEN,0
42CF 3E00          4  390         LD   A,0
42D1 110058        5  391         LD   DE,SUBCHS
42D4 12            6  392         LD   (DE),A
42D5 62            7  393         LD   H,D
42D6 6B            8  394         LD   L,E
42D7 13            9  395         INC  DE
42D8 01FF67       10  396         LD   BC,.RES.TRANEN-SUBCHS
42DB EDB0         11  397         LDIR
42DD DD21C641'   358  399         LD   IX,PARWK     ;STAYS CONSTANT ALWAYS
                    ;
42E1 212040'     360  401         LD   HL,CTCVEC
42E4 7D          361  402         LD   A,L
42E5 D37C        362  403         OUT  (CTC),A      ;INT VECTOR
42E7             363  404         OUTN CTC+3,0D7H   ;CTC3 COUNT & ENBL
42E7 3ED7          1  405         LD   A,0D7H
42E9 D37F          2  406         OUT  (CTC+3),A
42EB             364  408         OUTN CTC+3,5DH    ;CTC3 T/C 93
42EB 3E5D          1  409         LD   A,5DH
42ED D37F          2  410         OUT  (CTC+3),A
42EF             365  412         OUTN CTC+2,37H    ;CTC2 TIMER P/S 256
42EF 3E37          1  413         LD   A,37H
42F1 D37E          2  414         OUT  (CTC+2),A
42F3             366  416         OUTN CTC+2,69H    ;CTC2 T/C 105
42F3 3E69          1  417         LD   A,69H
42F5 D37E          2  418         OUT  (CTC+2),A
42F7             367  420         BPT
```

LD HL, #SLOTS
LD (NLEFT), HL
LD HL, SERNO
LD (SERNO), HL

```
42F7 C30E43        1  421       JP   $+23        ;PATCHABLE BREAKPOINT
42FA 00000000      2  422       DEFB 0,0,0,0,0,0,0,0,0,0
     00000000
     0000
4304 00000000      3  423       DEFB 0,0,0,0,0,0,0,0,0,0
     00000000
     0000
                      ;
430E             369  426       OUTN PIO1,0FFH   ;SET ALL OUTPUTS HI
430E 3EFF          1  427       LD   A,0FFH
4310 D350          2  428       OUT  (PIO1),A
4312 D352        370  430       OUT  (PIO1+2),A
4314 D354        371  431       OUT  (PIO2),A
4316 D356        372  432       OUT  (PIO2+2),A
4318             373  433       OUTN PIO1+1,0CFH ;CONTROL
4318 3ECF          1  434       LD   A,0CFH
431A D351          2  435       OUT  (PIO1+1),A
431C             374  437       OUTN PIO1+1,0    ;OUTPUT (1A)
431C 3E00          1  438       LD   A,0
431E D351          2  439       OUT  (PIO1+1),A
4320             375  441       OUTN PIO1+3,0CFH ;CONTROL
4320 3ECF          1  442       LD   A,0CFH
4322 D353          2  443       OUT  (PIO1+3),A
4324             376  445       OUTN PIO1+3,0FFH ;INPUT (1B)
4324 3EFF          1  446       LD   A,0FFH
4326 D353          2  447       OUT  (PIO1+3),A
4328             377  449       OUTN PIO2+1,8FH  ;BIDIRECTIONAL (2A)
4328 3E8F          1  450       LD   A,8FH
432A D355          2  451       OUT  (PIO2+1),A
432C             378  453       OUTN PIO2+3,0CFH ;CONTROL
432C 3ECF          1  454       LD   A,0CFH
432E D357          2  455       OUT  (PIO2+3),A
4330             379  457       OUTN PIO2+3,0    ;OUTPUT (2B)
4330 3E00          1  458       LD   A,0
4332 D357          2  459       OUT  (PIO2+3),A
4334 213840'     380  461       LD   HL,PIAVEC
4337 7D          381  462       LD   A,L
4338 D355        382  463       OUT  (PIO2+1),A  ;OUT VECTOR PORT A
433A 3C          383  464       INC  A
433B 3C          384  465       INC  A
433C D357        385  466       OUT  (PIO2+3),A  ;IN VECTOR PORT B
433E             386  467       OUTN PIO2+1,87H  ;ENBL INT PORT A
433E 3E87          1  468       LD   A,87H
4340 D355          2  469       OUT  (PIO2+1),A
4342             387  471       OUTN PIO2+3,97H  ;ENBL B & MASK FOLLOWS
4342 3E97          1  472       LD   A,97H
4344 D357          2  473       OUT  (PIO2+3),A
4346             388  475       OUTN PIO2+3,0FFH ;ALL MASKED OFF
4346 3EFF          1  476       LD   A,0FFH
4348 D357          2  477       OUT  (PIO2+3),A
434A             389  479       BPT
434A C36143        1  480       JP   $+23        ;PATCHABLE BREAKPOINT
434D 00000000      2  481       DEFB 0,0,0,0,0,0,0,0,0,0
     00000000
```

```
     0000
4357 00000000     3  482        DEFB 0,0,0,0,0,0,0,0,0,0
     00000000
     0000
                       ;
4361            391  485        OUTN SIO+1,030Q  ;CH-A RESET
4361 3E18         1  486        LD   A,030Q
4363 D361         2  487        OUT  (SIO+1),A
4365            392  489        OUTN SIO+3,030Q  ;CH-B RESET
4365 3E18         1  490        LD   A,030Q
4367 D363         2  491        OUT  (SIO+3),A
4369            393  493        OUTN SIO+3,002Q  ;PTR2 *CH-B*
4369 3E02         1  494        LD   A,002Q
436B D363         2  495        OUT  (SIO+3),A
436D 212810'    394  497        LD   HL,SIOVEC
4370 7D         395  498        LD   A,L
4371 D363       396  499        OUT  (SIO+3),A   ;VECTOR TO WR2,PORT B
4373            397  500        OUTN SIO+1,024Q  ;RESET EXT,PTR4
4373 3E14         1  501        LD   A,024Q
4375 D361         2  502        OUT  (SIO+1),A
4377            398  504        OUTN SIO+1,01000100B ;X16,1STOP,NO PARITY
4377 3E44         1  505        LD   A,01000100B
4379 D361         2  506        OUT  (SIO+1),A
437B            399  508        OUTN SIO+1,003Q  ;PTR3
437B 3E03         1  509        LD   A,003Q
437D D361         2  510        OUT  (SIO+1),A
437F            400  512        OUTN SIO+1,11000001B ;8BIT/CH,RX-ENBL
437F 3EC1         1  513        LD   A,11000001B
4381 D361         2  514        OUT  (SIO+1),A
4383            401  516        OUTN SIO+1,005Q  ;PTR5
4383 3E05         1  517        LD   A,005Q
4385 D361         2  518        OUT  (SIO+1),A
4387            402  520        OUTN SIO+1,11101010B ;DTR,RTS,8BIT/CH,TXENBL
4387 3EEA         1  521        LD   A,11101010B
4389 D361         2  522        OUT  (SIO+1),A
438B            403  524        OUTN SIO+1,021Q  ;RESET EXT,PTR1
438B 3E11         1  525        LD   A,021Q
438D D361         2  526        OUT  (SIO+1),A
438F            404  528        OUTN SIO+1,00011010B ;INT ON ALL RX CHARS,--
438F 3E1A         1  529        LD   A,00011010B
4391 D361         2  530        OUT  (SIO+1),A
                       ; --PARITY DOES NOT AFFECT VECTOR --
                       ; --TX INTERRUPT ENABLE,EXT DISABLE.
4393            407  534        OUTN SIO+3,001Q  ;PTR1 CH-B
4393 3E01         1  535        LD   A,001Q
4395 D363         2  536        OUT  (SIO+3),A
4397            408  538        OUTN SIO+3,00000100B ;STATUS AFFECTS VECTOR CH
                                                    -B
4397 3E04         1  539        LD   A,00000100B
4399 D363         2  540        OUT  (SIO+3),A
439B            409  542        BPT
439B C3B243       1  543        JP   $+23        ;PATCHABLE BREAKPOINT
439E 00000000     2  544        DEFB 0,0,0,0,0,0,0,0,0,0
     00000000
```

```
     0000
43A8 00000000       3  545          DEFB 0,0,0,0,0,0,0,0,0,0
     00000000
     000
                           , NOW LOAD MICRO-CODE FROM RAM 5000H TO SEQUENCER
43B2              411  548          BPT
43B2 C3C943         1  549          JP   $+23        ;PATCHABLE BREAKPOINT
43B5 00000000       2  550          DEFB 0,0,0,0,0,0,0,0,0,0
     00000000
     0000
43BF 00000000       3  551          DEFB 0,0,0,0,0,0,0,0,0,0
     00000000
     0000
43C9'210050       412  553 SQLOD    LD   HL,5000H
43CC 010000       413  554          LD   BC,0
43CF'CDDE41'      414  555 X908     CALL SQLD
43D2 10FB         415  556          DJNZ X908-$
43D4              416  557          BPT
43D4 C3EB43         1  558          JP   $+23        ;PATCHABLE BREAKPOINT
43D7 00000000       2  559          DEFB 0,0,0,0,0,0,0,0,0,0
     00000000
     0000
43E1 00000000       3  560          DEFB 0,0,0,0,0,0,0,0,0,0
     00000000
     0000
43EB 3EB0         417  562          LD   A,0B0H
43ED D356         418  563          OUT  (PIO2B),A   ;ENBL SEQ & RESET
43EF              419  564          BPT
43EF C30644         1  565          JP   $+23        ;PATCHABLE BREAKPOINT
43F2 00000000       2  566          DEFB 0,0,0,0,0,0,0,0,0,0
     00000000
     0000
43FC 00000000       3  567          DEFB 0,0,0,0,0,0,0,0,0,0
     00000000
     0000
4406 3E30         420  569          LD   A,30H
4408 D356         421  570          OUT  (PIO2B),A   ;ENBL CLOCK
440A B7           422  571          OR   A
440B 210000       423  572          LD   HL,0
440E 110100       424  573          LD   DE,1
4411'ED5A         425  574 X1004    ADC  HL,DE
4413 20FC         426  575          JR   NZ,X1004-$  ;SHORT DELAY FOR USEQ RESET
4415 3E20         427  576          LD   A,20H
4417 D356         428  577          OUT  (PIO2B),A   ;CLEAR RESET FLAG
                           ;
4419              430  579          BPT
4419 C33044         1  580          JP   $+23        ;PATCHABLE BREAKPOINT
441C 00000000       2  581          DEFB 0,0,0,0,0,0,0,0,0,0
     00000000
     0000
4426 00000000       3  582          DEFB 0,0,0,0,0,0,0,0,0,0
     00000000
     0000
4430 FB           431  584          EI
```

```
4431 DB54         432  585          IN   A,(PIO2)    ;DUMMY READ TO SET RDY LINE
4433              433  586          BPT
4433 C34A44         1  587          JP   $+23        ;PATCHABLE BREAKPOINT
4436 00000000       2  588          DEFB 0,0,0,0,0,0,0,0,0,0
     00000000
     0000
4440 00000000       3  589          DEFB 0,0,0,0,0,0,0,0,0,0
     00000000
     0000
444A C3004B'      434  591          JP   BCKGND      ;  >>>>>>>>>>>>>>>>>>>>>
                           ;;;;;;;;;;;;;;;;;;;;;;;;
                           ; INTERRUPT ROUTINES
                           ;
444D'E5           438  595 ONESEC   PUSH HL
444E F5           439  596          PUSH AF
444F 214B41'      440  597          LD   HL,CLOCK+3
4452 3E01         441  598          LD   A,1
4454 86           442  599          ADD  A,(HL)
4455 77           443  600          LD   (HL),A
4456 3E00         444  601          LD   A,0
4458 2B           445  602          DEC  HL
4459 8E           446  603          ADC  A,(HL)
445A 77           447  604          LD   (HL),A
445B 3E00         448  605          LD   A,0
445D 2B           449  606          DEC  HL
445E 8E           450  607          ADC  A,(HL)
445F 77           451  608          LD   (HL),A
4460 F1           452  609          POP  AF
4461 E1           453  610          POP  HL
4462 FB           454  611          EI
4463 ED4D         455  612          RETI             ;INCREMENT RELATIVE SECONDS C
                                                     OUNTER
                           ;
4465'F5           457  614 SIARCA   PUSH AF
4466 C5           458  615          PUSH BC
4467 E5           459  616          PUSH HL
4468              460  617          INCW SIARCT
4468 E5             1  618          PUSH HL
4469 2ABE41'        2  619          LD   HL,(SIARCT)
446C 23             3  620          INC  HL
44[illegible] 2BE41'  4  621          LD   (SIARCT),HL
4470 E1             5  622          POP  HL
4471 CDC644'      461  624          CALL SIASTS      ;STATUS
4474 3A7241'      462  625          LD   A,(HTIFLG)  ;LOAD FLAG
4477 FE02         463  626          CP   2           ;IS IT 2? IE BUSY-B/G
4479 2007         464  627          JR   NZ,SIARC1-$ ;IF IT IS--
447B              465  628          TERM 0E1H        ;-- THEN ABORT. !!E1!!
447B 3EE1           1  629          LD   A,0E1H
447D D350           2  630          OUT  (PIO),A
447F 76             3  631          HALT
4480 18FD           4  632          JR   -1
4482'3E01         466  634 SIARC1   LD   A,1
4484 327241'      467  635          LD   (HTIFLG),A  ;SET BUSY-F/G
4487 3A7341'      468  636          LD   A,(HTIBCT)  ;LOAD BYTE COUNT
```

```
448A 47          469  637          LD   B,A          ;SAVE
448B 217441'     470  638          LD   HL,HTITYP    ;ADDR OF DATA START
448E 85          471  639          ADD  A,L
448F 6F          472  640          LD   L,A
4490 3E00        473  641          LD   A,0
4492 8C          474  642          ADC  A,H
4493 67          475  643          LD   H,A          ;HL NOW HAS NEW BYTE ADDRESS
4494 3AB641'     476  644          LD   A,(SIAIST)
4497 E601        477  645          AND  1
4499 2007        478  646          JR   NZ,SIARC3-$ ;OK IF CHAR AVAIL.
449B             479  647          TERM 0E2H         ; ABORT **E2**
449B 3EE2          1  648          LD   A,0E2H
449D D350          2  649          OUT  (PIO),A
449F 76            3  650          HALT
44A0 18FD          4  651          JR   -1
     =44A2'      480  653 SIARC3   EQU  $
44A2 DB60        481  654          IN   A,(SIO)      ;GET BYTE
44A4 77          482  655          LD   (HL),A       ;--AND STORE IT
44A5 DB61        483  656          IN   A,(SIO+1)    ;RRO
44A7 E601        484  657          AND  1
44A9 2807        485  658          JR   Z,SIARC4-$  ;OK IF NO MORE
44AB             486  659          TERM 0E3H         ;ABORT **E3**
44AB 3EE3          1  660          LD   A,0E3H
44AD D350          2  661          OUT  (PIO),A
44AF 76            3  662          HALT
44B0 18FD          4  663          JR   -1
     =44B2'      487  665 SIARC4   EQU  $
44B2 78          488  666          LD   A,B          ;RECOVER COUNT
44B3 3C          489  667          INC  A
44B4 327341'     490  668          LD   (HTIBCT),A  ;INCR & RESTORE
44B7 FE20        491  669          CP   32           ;IS IT 32
44B9 2005        492  670          JR   NZ,SIARC2-$ ;QUIT IF NOT --
44BB 3E02        493  671          LD   A,2          ;--ELSE SET FLAG TO 2
44BD 327241'     494  672          LD   (HTIFLG),A
44C0'E1          495  673 SIARC2   POP  HL
44C1 C1          496  674          POP  BC
44C2 F1          497  675          POP  AF
44C3 FB          498  676          EI
44C4 ED4D        499  677          RETI
                          ;
                          ; FOLLOWING IS A SUBROUTINE TO SIASRC & SIARCA
44C6'21B641'     502  680 SIASTS   LD   HL,SIAIST    ;ADDR OF STATUS SAVE AREA
44C9 DB61        503  681          IN   A,(SIO+1)    ;RRO
44CB 77          504  682          LD   (HL),A       ;SAVE IT
44CC 23          505  683          INC  HL           ;NEXT
44CD             506  684          OUTN SIO+1,001Q  ;PTR1
44CD 3E01          1  685          LD   A,001Q
44CF D361          2  686          OUT  (SIO+1),A
44D1 DB61        507  688          IN   A,(SIO+1)    ;RR1
44D3 77          508  689          LD   (HL),A       ;AND THIS ONE
44D4 C9          509  690          RET
                          ;
44D5'CDC644'     511  692 SIASRC   CALL SIASTS       ;GET & SAVE STATUS
44D8             512  693          TERM 0E0H         ;ABORT SINCE THIS IS A SERIOU
```

```
                                            S ERROR  **E0**
44D8 3EE0          1  694          LD   A,0E0H
44DA D350          2  695          OUT  (PIO),A
44DC 76            3  696          HALT
44DD 18FD          4  697          JR   -1
                          ;
44DF'F5          514  700 STATBE   PUSH AF
44E0 C5          515  701          PUSH BC
44E1 E5          516  702          PUSH HL
44E2             517  703          INCW SIATCT
44E2 E5            1  704          PUSH HL
44E3 2AC041'       2  705          LD   HL,(SIATCT)
44E6 23            3  706          INC  HL
44E7 22C041'       4  707          LD   (SIATCT),HL
44EA E1            5  708          POP  HL
44EB 21B841'     518  710          LD   HL,SIAOST   ;OUT-STATUS AREA
44EE DB61        519  711          IN   A,(SIO+1)
44F0 77          520  712          LD   (HL),A
44F1 23          521  713          INC  HL
44F2             522  714          OUTN SIO+1,001Q
44F2 3E01          1  715          LD   A,001Q
44F4 D361          2  716          OUT  (SIO+1),A
44F6 DB61        523  718          IN   A,(SIO+1)
44F8 77          524  719          LD   (HL),A      ;ABOVE SIMILAR TO SIOSTS
44F9 3AB841'     525  720          LD   A,(SIAOST)
44FC E604        526  721          AND  4
44FE 2007        527  722          JR   NZ,SIOTB3-$ ;OK IF TBE
4500             528  723          TERM 0D2H        ;ABORT **D2**
4500 3ED2          1  724          LD   A,0D2H
4502 D350          2  725          OUT  (PIO),A
4504 76            3  726          HALT
4505 18FD          4  727          JR   -1
        =4507'   529  729 SIOTB3   EQU  $
4507 3A9441'     530  730          LD   A,(HTOFLG)
450A FE02        531  731          CP   2           ;COMP FLAG WITH 2
450C 2807        532  732          JR   Z,SIOTB1-$  ;OK IF 2
450E             533  733          TERM 0D1H        ;ELSE ABORT   *D1**
450E 3ED1          1  734          LD   A,0D1H
4510 D350          2  735          OUT  (PIO),A
4512 76            3  736          HALT
4513 18FD          4  737          JR   -1
4515'3A9541'     534  739 SIOTB1   LD   A,(HTOBCT)  <-- CP 32
                                                        JR Z,SIOTB4-$  ; FLUSH LAST INTERRU
4518 47          535  740          LD   B,A
4519 219641'     536  741          LD   HL,HTOSER
451C 85          537  742          ADD  A,L
451D 6F          538  743          LD   L,A
451E 3E00        539  744          LD   A,0
4520 8C          540  745          ADC  A,H
4521 67          541  746          LD   H,A
4522 7E          542  747          LD   A,(HL)      ;ABOVE SAME AS RECEIVE CODE
4523 D360        543  748          OUT  (SIO),A     ;OUTPUT NEXT CHAR
4525 78          544  749          LD   A,B
4526 3C          545  750          INC  A
4527 FE20        546  751          CP   32          ;IS NEW COUNT 32
```

```
4529 2004      547  752          JR   SIOTB2-$  ;IF NOT--NORMAL RETURN
452B AF        548  753 SIOTB4   XOR  A         ;OTHERWISE ZERO COUNT AND FLA
                                                G
452C 329441'   549  754          LD   (HTOFLG),A      insert at label.  LD A,28H
452F'329541'   550  755 SIOTB2   LD   (HTOBCT),A                        OUT (SIO),A
4532 E1        551  756          POP  HL
4533 C1        552  757          POP  BC
4534 F1        553  758          POP  AF
4535 FB        554  759          EI
4536 ED4D      555  760          RETI

4538'F5        557  762 PIAIN    PUSH AF
4539 C5        558  763          PUSH BC
453A E5        559  764          PUSH HL
453B           560  765          INCM PIAICT
453B E5          1  766          PUSH HL
453C 2AC241'     2  767          LD   HL,(PIAICT)
453F 23          3  768          INC  HL
4540 22C241'     4  769          LD   (PIAICT),HL
4543 E1          5  770          POP  HL
4544 3A6541'   561  772          LD   A,(MSIFLG)  ;AS FOR SIARCA
4547 FE02      562  773          CP   2
4549 2007      563  774          JR   NZ,PIAIN1-$
454B           564  775          TERM 0C1H        ;ABORT   **C1**
454B 3EC1        1  776          LD   A,0C1H
454D D350        2  777          OUT  (PIO),A
454F 76          3  778          HALT
4550 18FD        4  779          JR   -1
4552'3E01      565  781 PIAIN1   LD   A,1
4554 326541'   566  782          LD   (MSIFLG),A  ;SET BUSY F/G
4557 3A6641'   567  783          LD   A,(MSIBCT)
455A 47        568  784          LD   B,A
455B 216741'   569  785          LD   HL,MSISCH
455E 85        570  786          ADD  A,L
455F 6F        571  787          LD   L,A
4560 3E00      572  788          LD   A,0
4562 8C        573  789          ADC  A,H
4563 67        574  790          LD   H,A
4564 DB54      575  791          IN   A,(PIO2)
4566 77        576  792          LD   (HL),A
4567 78        577  793          LD   A,B
4568 3C        578  794          INC  A
4569 326641'   579  795          LD   (MSIBCT),A
456C FE09      580  796          CP   9           ;ONLY 9 BYTES IN BLOCK
456E 2005      581  797          JR   NZ,PIAIN2-$
4570 3E02      582  798          LD   A,2
4572 326541'   583  799          LD   (MSIFLG),A
4575'E1        584  800 PIAIN2   POP  HL
4576 C1        585  801          POP  BC
4577 F1        586  802          POP  AF
4578 FB        587  803          EI
4579 ED4D      588  804          RETI

457B'F5        590  806 PIAOUT   PUSH AF
```

```
457C 3AC441'.   591  807          LD   A,(PIAOCT)
457F B7         592  808          OR   A
4580 200D       593  809          JR   NZ,PIAOU2-$
4582 3AC541'    594  810          LD   A,(PIAOCT+1)
4585 B7         595  811          OR   A
4586 2007       596  812          JR   NZ,PIAOU2-$
4588 3E01       597  813          LD   A,1
458A 32C441'    598  814          LD   (PIAOCT),A
458D 1817       599  815          JR   PIAOU1-$
458F'           600  816 PIAOU2   INCW PIAOCT
458F E5           1  817          PUSH HL
4590 2AC441'      2  818          LD   HL,(PIAOCT)
4593 23           3  819          INC  HL
4594 22C441'      4  820          LD   (PIAOCT),HL
4597 E1           5  821          POP  HL
4598 3A7041'    601  823          LD   A,(MSOFLG)
459B FE02       602  824          CP   2
459D 2807       603  825          JR   Z,PIAOU1-$  ;OK IF 2
459F            604  826          TERM 0B1H        ;ABORT  **B1**
459F 3EB1         1  827          LD   A,0B1H
45A1 D350         2  828          OUT  (PIO),A
45A3 76           3  829          HALT
45A4 18FD         4  830          JR   -1
45A6'AF         605  832 PIAOU1   XOR  A
45A7 327041'    606  833          LD   (MSOFLG),A  ;SET FREE
45AA F1         607  834          POP  AF
45AB FB         608  835          EI
45AC ED4D       609  836          RETI
                         ;
                         ;;;;;;;;;;;;;;;;;;;;;;;;;;;;;;;;;;;;;;  <- EJECT
4800            612  839          ORG  4800H       ;NEXT ROM
        =4800'  613  840 BCKGND   EQU  $           ;BACKGROUND LOOP
4800            614  841          BPT
4800 C31748       1  842          JP   $+23        ;PATCHABLE BREAKPOINT
4803 00000000     2  843          DEFB 0,0,0,0,0,0,0,0,0,0
     00000000
     0000
480D 00000000     3  844          DEFB 0,0,0,0,0,0,0,0,0,0
     00000000
     0000
4817 3A6541'    615  846          LD   A,(MSIFLG)
481A FE02       616  847          CP   2
481C C2314B'    617  848          JP   NZ,BCK046   ;BYPASS MSIO IF NOT 2
481F            618  849          INCW NREADS
481F E5           1  850          PUSH HL
4820 2A5141'      2  851          LD   HL,(NREADS)
4823 23           3  852          INC  HL
4824 225141'      4  853          LD   (NREADS),HL
4827 E1           5  854          POP  HL
4828            619  856          FILL PARWK,PARWK+PARWKL-1,0 ;CLEAR WORKAREA
4828 3E00         4  860          LD   A,0
482A 11C641'      5  861          LD   DE,PARWK
482[illegible] [illegible]2       6  862          LD   (DE),A
482[illegible] [illegible]2       7  863          LD   H,D
```

```
482F 6B          8 864          LD   L,E
4830 13          9 865          INC  DE
4831 010700     10 866          LD   BC,.RES.PARWK+PARWKL-1-PARWK
4834 EDB0       11 867          LDIR
4836 3A6F41'   620 869          LD   A,(MSDATA+7) ;PARITY BYTE
4839 DD7703    621 870          LD   (IX+3),A    ;SAVE
483C 4F        622 871          LD   C,A         ;AND IN C
483D E603      623 872          AND  3
483F EA4648'   624 873          JP   PE,BCK002
4842 DDCB00C6  625 874          SET  0,(IX)
4846'79        626 875 BCK002   LD   A,C
4847 E60C      627 876          AND  0CH
4849 EA5048'   628 877          JP   PE,BCK003
484C DDCB00CE  629 878          SET  1,(IX)
4850'79        630 879 BCK003   LD   A,C
4851 E630      631 880          AND  30H
4853 EA5A48'   632 881          JP   PE,BCK004
4856 DDCB00D6  633 882          SET  2,(IX)
485A'79        634 883 BCK004   LD   A,C
485B E6C0      635 884          AND  0C0H
485D EA6448'   636 885          JP   PE,BCK005
4860 DDCB00DE  637 886          SET  3,(IX)
     =4864'    638 887 BCK005   EQU  $           ;FIRST WORD SET TO INDICATE A
                                                 GREEMENT
                                                 ; BETWEEN PARITY BIT PAIRS.
4864 3A6E41'   640 889          LD   A,(MSDATA+6) ;ECC BYTE
4867 F5        641 890          PUSH AF
4868 E63F      642 891          AND  3FH         ;LEAVE 5-0 ONLY
486A DD7704    643 892          LD   (IX+4),A    ;SAVE IN WORKAREA
486D F1        644 893          POP  AF
486E 07        645 894          RLCA
486F 07        646 895          RLCA
4870 57        647 896          LD   D,A         ;ECC 6 BITS LEFT ADJ.
4871 E603      648 897          AND  3
4873 6F        649 898          LD   L,A         ;SAVE MOD 4
4874 7A        650 899          LD   A,D
4875 1600      651 900          LD   D,0
4877 0606      652 901          LD   B,6
4879'B7        653 902 BCK006   OR   A
487A F27E48'   654 903          JP   P,BCK007
487D 14        655 904          INC  D
487E'07        656 905 BCK007   RLCA
487F 10F8      657 906          DJNZ BCK006-$
4881 7A        658 907          LD   A,D         ;D HAS NO OF 1'S IN ECC 5-0
4882 E603      659 908          AND  3
4884 95        660 909          SUB  L
4885 2804      661 910          JR   Z,BCK008-$
4887 DDCB00FE  662 911          SET  7,(IX)      ;SET IF ERROR IN MOD 4
488B'3A6D41'   663 912 BCK008   LD   A,(MSDATA+5) ;LSBYTE
488E 0E00      664 913          LD   C,0
4890 B7        665 914          OR   A
4891 E29848'   666 915          JP   PO,BCK009
4894 3E03      667 916          LD   A,3
4896 B1        668 917          OR   C
4897 4F        669 918          LD   C,A
```

```
4898 3A6C41'    670  919 BCK009  LD   A,(MSDATA+4)
489B B7         671  920         OR   A
489C E2A348'    672  921         JP   PO,BCK010
489F 3E0C       673  922         LD   A,0CH
48A1 B1         674  923         OR   C
48A2 4F         675  924         LD   C,A
48A3 3A6B41'    676  925 BCK010  LD   A,(MSDATA+3)
48A6 B7         677  926         OR   A
48A7 E2AE48'    678  927         JP   PO,BCK011
48AA 3E30       679  928         LD   A,30H
48AC B1         680  929         OR   C
48AD 4F         681  930         LD   C,A
48AE 3A6A41'    682  931 BCK011  LD   A,(MSDATA+2)
48B1 B7         683  932         OR   A
48B2 E2B948'    684  933         JP   PO,BCK012
48B5 3EC0       685  934         LD   A,0C0H
48B7 B1         686  935         OR   C
48B8 4F         687  936         LD   C,A
48B9 79         688  937 BCK012  LD   A,C
48BA DDAE03     689  938         XOR  (IX+3)     ;ACTUAL PARITY BYTE
48BD DD7701     690  939         LD   (IX+1),A   ;1'S FOR PARITY FAILURE
                          ;
48C0 216A41'    692  941         LD   HL,MSDATA+2 ;MSBYTE
48C3 CB7E       693  942         BIT  7,(HL)     ;BIT 31 OF DATA
48C5 2004       694  943         JR   NZ,BCK013-$
48C7 DDCB02EE   695  944         SET  5,(IX+2)   ;ECC BIT 5
48CB 0605       696  945 BCK013  LD   B,5
48CD 0E00       697  946         LD   C,0
48CF 215940'    698  947         LD   HL,MASK0
48D2 CD3142'    699  948 BCK015  CALL ECC        ;CHECKS ONE BIT RETURNED IN A
                                                 CC
                                                 ; HL INCR BY 4
48D5 B7         701  950         OR   A
48D6 2810       702  951         JR   Z,BCK014-$
48D8 79         703  952         LD   A,C
48D9 CB27       704  953         SLA  A
48DB CB27       705  954         SLA  A
48DD CB27       706  955         SLA  A
48DF F6C6       707  956         OR   0C6H
48E1 32E748'    708  957         LD   (SETB+3),A ;OVERLAY INSTR WITH BIT NO
48E4 DDCB02C6   709  958 SETB    SET  0,(IX+2)
48E8 0C         710  959 BCK014  INC  C          ;NEXT BIT
48E9 10E7       711  960         DJNZ BCK015-$   ;DO IT AGAIN
                          ; ECC 5-0 NOW CALCULATED IN (IX+2)
48EB DD7E02     713  962         LD   A,(IX+2)
48EE DDAE04     714  963         XOR  (IX+4)     ;ACTUAL ECC 5-0
48F1 DD7702     715  964         LD   (IX+2),A   ;STORE 1'S FOR ECC FAILURE
48F4 DDB601     716  965         OR   (IX+1)     ;OR IN PARITY FAILURES
48F7 DDB600     717  966         OR   (IX)       ;OR IN PARITY PAIR FAILS AND
                                                 MOD 4
48FA CA7A49'    718  967         JP   Z,BCK016   ;JUMP ON TOTALLY GOOD BLOCK
48FD            719  968         INCW NPEINI     ;INITIAL PHYSER COUNTER
48FD E5           1  969         PUSH HL
48FE 2A5541'     2  970         LD   HL,(NPEINI)
```

```
4901 23           3  971          INC  HL
4902 225541'      4  972          LD   (NPEINI),HL
4905 E1           5  973          POP  HL
4906 DD7E00     720  975          LD   A,(IX)
4909 B7         721  976          OR   A
490A C28A49'    722  977          JP   NZ,BCK017    ;UNCORRECTABLE ERROR
                                                    ; -DUE TO MOD4 ON ECC OR PARI
                                                    TY PAIR ERROR
490D DD7E01     724  979          LD   A,(IX+1)     ;PARITY FAILS
4910 0E00       725  980          LD   C,0
4912 0608       726  981          LD   B,8
4914'CB07       727  982 BCK019   RLC  A
4916 F21A49'    728  983          JP   P,BCK018
4919 0C         729  984          INC  C
491A'10F8       730  985 BCK018   DJNZ BCK019-$
491C 79         731  986          LD   A,C
491D CB3F       732  987          SRL  A            ;NO OF PARITY FAILS
491F DD7707     733  988          LD   (IX+7),A
4922 FE01       734  989          CP   1
4924 C28A49'    735  990          JP   NZ,BCK017    ;UNCORR IF #PARERRS NOT 1
4927 DD7E02     736  991          LD   A,(IX+2)
492A B7         737  992          OR   A
492B CA8A49'    738  993          JP   Z,BCK017     ;UNCORR UNLESS ECC FAIL
492E 3D         739  994          DEC  A
492F DD7705     740  995          LD   (IX+5),A     ;FAILED BIT NO
4932 4F         741  996          LD   C,A
4933 CB3F       742  997          SRL  A
4935 CB3F       743  998          SRL  A
4937 CB3F       744  999          SRL  A            ;A HAS FAILED BYTE 0-LSBYT,3-
                                                    MSBYT
4939 DD7706     745 1000          LD   (IX+6),A
493C 79         746 1001          LD   A,C
493D CB27       747 1002          SLA  A
493F E630       748 1003          AND  30H
4941 4F         749 1004          LD   C,A
4942 3E46       750 1005          LD   A,46H
4944 B1         751 1006          OR   C
4945 324B49'    752 1007          LD   (FBIT+3),A   ;OVERLAY BIT INSTR
4948'DDCB0146   753 1008 FBIT     BIT  0,(IX+1)     ;THIS SHOULD BE 1
494C CA8A49'    754 1009          JP   Z,BCK017     ;IF 0 ECC AND PARITY DONT AGR
                                                    EE
494F DD5E06     755 1010          LD   E,(IX+6)     ;BYTE NO
4952 1600       756 1011          LD   D,0
4954 216D41'    757 1012          LD   HL,MSDATA+5
4957 B7         758 1013          OR   A
4958 ED52       759 1014          SBC  HL,DE        ;HL<-ACTUAL DUD BYTE ADDRESS
495A DD7E05     760 1015          LD   A,(IX+5)
495D E607       761 1016          AND  7
495F CB27       762 1017          SLA  A
4961 CB27       763 1018          SLA  A
4963 CB27       764 1019          SLA  A
4965 F6C0       765 1020          OR   0C0H
4967 0600       766 1021          LD   B,0
4969 326D49'    767 1022          LD   (SETIN+1),A ;OVERLAY INST
```

```
496C'CBC0        768 1023 SETIN  SET  0,B
496E 7E          769 1024        LD   A,(HL)
496F A8          770 1025        XOR  B
4970 77          771 1026        LD   (HL),A       ;INVERT DUD BIT
4971             772 1027        INCW NPERCO       ;CORRECTION COUNTER
4971 E5            1 1028        PUSH HL
4972 2A5741'       2 1029        LD   HL,(NPERCO)
4975 23            3 1030        INC  HL
4976 225741'       4 1031        LD   (NPERCO),HL
4979 E1            5 1032        POP  HL
                           ;
     =497A'      774 1035 BCK016 EQU  $            ;TO HERE IF GOOD OR CORRECTED
497A 3A6841'     775 1036        LD   A,(MSDATA)
497D E60F        776 1037        AND  15           ;RESIDUAL TIME
497F 2032        777 1038        JR   NZ,BCK020    ;TO LOGICAL TESTS IF NOT TIME
                                                   -OUT
4981             778 1039        INCW NPERTO       ;INC #PHYSERRS DUE TO TIME-OU
                                                   T
4981 E5            1 1040        PUSH HL
4982 2A5341'       2 1041        LD   HL,(NPERTO)
4985 23            3 1042        INC  HL
4986 225341'       4 1043        LD   (NPERTO),HL
4989 E1            5 1044        POP  HL
                           ;
     =498A'      780 1047 BCK017 EQU  $            ;TO HERE IF ULTIMATELY A PHYS
                                                    ERR.
498A             781 1048        BPT
498A C3A149        1 1049        JP   $+23         ;PATCHABLE BREAKPOINT
498D 00000000      2 1050        DEFB 0,0,0,0,0,0,0,0,0,0
     00000000
     0000
4997 00000000      3 1051        DEFB 0,0,0,0,0,0,0,0,0,0
     00000000
     0000
49A1             782 1053        INCW NPHYER
49A1 E5            1 1054        PUSH HL
49A2 2A5B41'       2 1055        LD   HL,(NPHYER)
49A5 23            3 1056        INC  HL
49A6 225B41'       4 1057        LD   (NPHYER),HL
49A9 E1            5 1058        POP  HL
49AA 3E01        783 1060        LD   A,1
49AC 324441'     784 1061        LD   (ACKCD),A
49AF F3          785 1062        DI
49B0 C3F94A'     786 1063        JP   BCK047       ;TO MSOUTPUT SECTION
                           ;
     =49B3'      788 1065 BCK020 EQU  $            ;LOGICAL TESTS
49B3             789 1066        BPT
49B3 C3CA49        1 1067        JP   $+23         ;PATCHABLE BREAKPOINT
49B6 00000000      2 1068        DEFB 0,0,0,0,0,0,0,0,0,0
     00000000
     0000
49C0 00000000      3 1069        DEFB 0,0,0,0,0,0,0,0,0,0
     00000000
     0000
```

```
49CA 3A6A41'    790 1071          LD   A,(MSDATA+2) ;MSBYTE
49CD 4F         791 1072          LD   C,A
49CE 07         792 1073          RLCA
49CF 07         793 1074          RLCA
49D0 E603       794 1075          AND  3           ;TYPE IN ACC
49D2 2006       795 1076          JR   NZ,BCK021-$ ;SKIP IF NOT LOG
49D4 CB69       796 1077          BIT  5,C
49D6 2802       797 1078          JR   Z,BCK021-$  ;SKIP IF BIT 29=0
49D8 3E04       798 1079          LD   A,4
49DA'324041'    799 1080 BCK021   LD   (TYPE),A
49DD 3A6741'    800 1081          LD   A,(MSISCH)
49E0 1F         801 1082          RRA
49E1 E67F       802 1083          AND  7FH         ;S/C NO
49E3 324341'    803 1084          LD   (SUBCHA),A
49E6 5F         804 1085          LD   E,A
49E7 1600       805 1086          LD   D,0
49E9 210058     806 1087          LD   HL,SUBCHS   ;SUB-CHAN STATUS AREA
49EC EB         807 1088          EX   DE,HL
49ED 29         808 1089          ADD  HL,HL
49EE 29         809 1090          ADD  HL,HL
49EF 29         810 1091          ADD  HL,HL
49F0 29         811 1092          ADD  HL,HL       ;MULT S/C BY 16
49F1 B7         812 1093          OR   A
49F2 ED5A       813 1094          ADC  HL,DE       ;HL<-ADDRESS OF S/C SLOT
49F4 E5         814 1095          PUSH HL
49F5 FDE1       815 1096          POP  IY
49F7 7E         816 1097          LD   A,(HL)      ;STATE
49F8 324141'    817 1098          LD   (CSTATE),A
49FB 4F         818 1099          LD   C,A
49FC 3A4041'    819 1100          LD   A,(TYPE)
49FF CB27       820 1101          SLA  A
4A01 CB27       821 1102          SLA  A
4A03 81         822 1103          ADD  A,C
4A04 5F         823 1104          LD   E,A
4A05 1600       824 1105          LD   D,0
4A07 B7         825 1106          OR   A
4A08 214540'    826 1107          LD   HL,STABLE
4A0B ED5A       827 1108          ADC  HL,DE
4A0D 7E         828 1109          LD   A,(HL)      ;TRANSITION TABLE CELL
4A0E 324241'    829 1110          LD   (CELL),A

4A11 3A4141'    831 1112          LD   A,(CSTATE)
4A14 B7         832 1113          OR   A
4A15 2834       833 1114          JR   Z,BCK022-$
4A17 3A4041'    834 1115          LD   A,(TYPE)
4A1A B7         835 1116          OR   A
4A1B 202E       836 1117          JR   NZ,BCK022-$
4A1D 3A6D41'    837 1118          LD   A,(MSDATA+5)
4A20 FDBE05     838 1119          CP   (IY+5)
4A23 201E       839 1120          JR   NZ,BCK023-$
4A25 3A6C41'    840 1121          LD   A,(MSDATA+4)
4A28 FDBE04     841 1122          CP   (IY+4)
4A2B 2016       842 1123          JR   NZ,BCK023-$
4A2D 3A6B41'    843 1124          LD   A,(MSDATA+3)
```

```
4A30 FDBE03      844 1125          CP    (IY+3)
4A33 200E        845 1126          JR    NZ,BCK023-$
4A35 3A6A41'     846 1127          LD    A,(MSDATA+2)
4A38 E61F        847 1128          AND   1FH
4A3A 4F          848 1129          LD    C,A
4A3B FD7E02      849 1130          LD    A,(IY+2)
4A3E E61F        850 1131          AND   1FH
4A40 B9          851 1132          CP    C
4A41 2808        852 1133          JR    Z,BCK022-$
4A43'3A4241'     853 1134 BCK023   LD    A,(CELL)
4A46 F630        854 1135          OR    30H        ;ON BITS 5,4 IE LOG ERROR
                          ;--DUE TO LOG CARD OF DIFF OPERATOR TRYING --
                          ; --TO LOGON WHEN SOMEONE ELSE IS ON.
4A48 324241'     857 1138          LD    (CELL),A
                          ;
     =4A4B'      859 1140 BCK022   EQU   $          ;NOW BUILD TRANSACTION ENTRY
                                                    IN TABLE
4A4B             860 1141          BPT
4A4B C3624A        1 1142          JP    $+23       ;PATCHABLE BREAKPOINT
4A4E 00000000      2 1143          DEFB 0,0,0,0,0,0,0,0,0,0
     00000000
     0000
4A58 00000000      3 1144          DEFB 0,0,0,0,0,0,0,0,0,0
     00000000
     0000
4A62 3A4341'     861 1146          LD    A,(SUBCHA)
4A65 110060      862 1147          LD    DE,TRANST
4A68 2A4B41'     863 1148          LD    HL,(LSTRNO)
4A6B 29          864 1149          ADD   HL,HL
4A6C 29          865 1150          ADD   HL,HL
4A6D 29          866 1151          ADD   HL,HL      ;MULT BY 8
4A6E B7          867 1152          OR    A
4A6F ED5A        868 1153          ADC   HL,DE
                          ; HL NOW HAS ADDRESS OF TRANS SLOT
4A71 77          870 1155          LD    (HL),A
4A72 23          871 1156          INC   HL
4A73 E5          872 1157          PUSH  HL
4A74 F3          873 1158          DI
4A75 3A4641'     874 1159          LD    A,(CLOCK+1)
4A78 E603        875 1160          AND   3
4A7A 77          876 1161          LD    (HL),A
4A7B 23          877 1162          INC   HL
4A7C 3A4741'     878 1163          LD    A,(CLOCK+2)
4A7F 77          879 1164          LD    (HL),A
4A80 23          880 1165          INC   HL
4A81 3A4841'     881 1166          LD    A,(CLOCK+3)
4A84 77          882 1167          LD    (HL),A
4A85 FB          883 1168          EI
4A86 23          884 1169          INC   HL
4A87 EB          885 1170          EX    DE,HL
4A88 216A41'     886 1171          LD    HL,MSDATA+2
4A8B 010400      887 1172          LD    BC,4
4A8E EDB0        888 1173          LDIR
4A90 E1          889 1174          POP   HL         ;BYTE 2 ADDR OF SLOT
```

```
4A91 3A4241'      890 1175          LD    A,(CELL)
4A94 E6F0         891 1176          AND   0F0H
4A96 B6           892 1177          OR    (HL)
4A97 77           893 1178          LD    (HL),A       ;PREV STATE & ERR BITS
                            ;
4A98 3A4241'      895 1180          LD    A,(CELL)
4A9B 07           896 1181          RLCA
4A9C 07           897 1182          RLCA
4A9D 07           898 1183          RLCA
4A9E 07           899 1184          RLCA
4A9F E602         900 1185          AND   2            ;BIT 5 OF CELL TO A(1)
                            ;
4AA1 324441'      902 1187          LD    (ACKCD),A
4AA4 F3           903 1188          DI
4AA5 B7           904 1189          OR    A
4AA6 2036         905 1190          JR    NZ,BCK024    ;IF LOG ERR
4AA8              906 1191          INCW  NGOOD
4AA8 E5             1 1192          PUSH  HL
4AA9 2A5941'        2 1193          LD    HL,(NGOOD)
4AAC 23             3 1194          INC   HL
4AAD 225941'        4 1195          LD    (NGOOD),HL
4AB0 E1             5 1196          POP   HL
4AB1 3A4241'      907 1198          LD    A,(CELL)
4AB4 E603         908 1199          AND   3            ;NEW STATE
4AB6 FD7700       909 1200          LD    (IY),A       ;TO SLOT IN S/C TABLE
4AB9 FE00         910 1201          CP    0
4ABB 200E         911 1202          JR    NZ,ON448-$
4ABD FD7702       912 1203          LD    (IY+2),A
4AC0 FD7703       913 1204          LD    (IY+3),A
4AC3 FD7704       914 1205          LD    (IY+4),A
4AC6 FD7705       915 1206          LD    (IY+5),A     ;ZERO OPERATOR ID IF NEW STAT
                                                       E 0
4AC9 181C         916 1207          JR    BCK025-$
4ACB'FE01         917 1208 ON448    CP    1
4ACD 2018         918 1209          JR    NZ,BCK025-$
                            ;HERE IF NEWSTATE 1 AND GOOD TRANS
4ACF 216A41'      920 1211          LD    HL,MSDATA+2
4AD2 FDE5         921 1212          PUSH  IY
4AD4 D1           922 1213          POP   DE
4AD5 13           923 1214          INC   DE
4AD6 13           924 1215          INC   DE
4AD7 010400       925 1216          LD    BC,4
4ADA EDB0         926 1217          LDIR               ;COPY NEW OPERATOR CODE TO S/
                                                       C SLOT
4ADC 1809         927 1218          JR    BCK025-$
4ADE'             928 1219 BCK024   INCW  NLOGER
4ADE E5             1 1220          PUSH  HL
4ADF 2A5D41'        2 1221          LD    HL,(NLOGER)
4AE2 23             3 1222          INC   HL
4AE3 225D41'        4 1223          LD    (NLOGER),HL
4AE6 E1             5 1224          POP   HL
4AE7'             929 1226 BCK025   INCW  LSTRNO
4AE7 E5             1 1227          PUSH  HL
4AE8 2A4B41'        2 1228          LD    HL,(LSTRNO)
```

```
4AEB 23            3 1229        INC  HL
4AEC 224B41'       4 1230        LD   (LSTRNO),HL
4AEF E1            5 1231        POP  HL
4AF0             930 1233        DECW NLEFT
4AF0 E5            1 1234        PUSH HL
4AF1 2A4D41'       2 1235        LD   HL,(NLEFT)
4AF4 2B            3 1236        DEC  HL
4AF5 224D41'       4 1237        LD   (NLEFT),HL
4AF8 E1            5 1238        POP  HL
4AF9'            931 1240 BCK047 BPT
4AF9 C3104B        1 1241        JP   $+23        ;PATCHABLE BREAKPOINT
4AFC 00000000      2 1242        DEFB 0,0,0,0,0,0,0,0,0,0
     00000000
     0000
4B06 00000000      3 1243        DEFB 0,0,0,0,0,0,0,0,0,0
     00000000
     0000
4B10 3A7041'     932 1245        LD   A,(MSOFLG)
4B13 B7          933 1246        OR   A
4B14 2802        934 1247        JR   Z,BCK026-$
4B16 181B        935 1248        JR   V645-$
4B18'3E02        936 1249 BCK026 LD   A,2
4B1A 327041'     937 1250        LD   (MSOFLG),A  ;SET F/G BUSY.
4B1D 3A4441'     938 1251        LD   A,(ACKCD)
4B20 D354        939 1252        OUT  (PJ02),A    ;ACK CODE
4B22             940 1253        FILL MSIFLG,MSDATA+7,0
4B22 3E00          4 1257        LD   A,0
4B24 116541'       5 1258        LD   DE,MSIFLG
4B27 12            6 1259        LD   (DE),A
4B28 62            7 1260        LD   H,D
4B29 6B            8 1261        LD   L,E
4B2A 13            9 1262        INC  DE
4B2B 010A00       10 1263        LD   BC,.RES.MSDATA+7-MSIFLG
4B2E EDB0         11 1264        LDIR
4B30'FB          941 1266 V645   EI
                          ;
4B31'            943 1268 BCK046 BPT
4B31 C3484B        1 1269        JP   $+23        ;PATCHABLE BREAKPOINT
4B34 00000000      2 1270        DEFB 0,0,0,0,0,0,0,0,0,0
     00000000
     0000
4B3E 00000000      3 1271        DEFB 0,0,0,0,0,0,0,0,0,0
     00000000
     0000
4B48 3A7241'     944 1273        LD   A,(HTIFLG)
4B4B FE02        945 1274        CP   2
4B4D C2644D'     946 1275        JP   NZ,BCK027   ;BYPASS HOST INPUT
4B50 217441'     947 1276        LD   HL,HTITYP
4B53 CD0042'     948 1277        CALL CHKSUM
4B56 21BA41'     949 1278        LD   HL,INCK1
4B59 119041'     950 1279        LD   DE,HTICK1
4B5C 0604        951 1280        LD   B,4
4B5E'1A          952 1281 BCK028 LD   A,(DE)
4B5F BE          953 1282        CP   (HL)
```

```
4B60 2006         954 1283         JR   NZ,BCK029-$
4B62 23           955 1284         INC  HL
4B63 13           956 1285         INC  DE
4B64 10FB         957 1286         DJNZ BCK028-$
4B66 1872         958 1287         JR   BCK030-$     ;CHECKSUMS ARE EQUAL
                                ;
      =4B68'      960 1289 BCK029  EQU  $            ;NOT EQUAL
4B68 3E22         961 1290         LD   A,34         ;ERROR CODE = DUD CHKSUM AND
                                                      RETRANSMIT
                                ;
4B6A'             963 1292 HTOFMT  BPT
4B6A C3814B         1 1293         JP   $+23         ;PATCHABLE BREAKPOINT
4B6D 00000000       2 1294         DEFB 0,0,0,0,0,0,0,0,0,0
     00000000
     0000
4B77 00000000       3 1295         DEFB 0,0,0,0,0,0,0,0,0,0
     00000000
     0000
4B81 32A041'      964 1297         LD   (HTOERC+1),A
4B84 CD5E42'      965 1298         CALL HTOF         ;BUILD DEFAULT MESSAGE
4B87 CD4C42'      966 1299         CALL HTOCSM
4[illegible]      967 1300         INCW NBHIN
4B8A E5             1 1301         PUSH HL
4B8B 2A6141'        2 1302         LD   HL,(NBHIN)
4B8E 23             3 1303         INC  HL
4B8F 226141'        4 1304         LD   (NBHIN),HL
4B92 E1             5 1305         POP  HL
4B93'             968 1307 SEND    BPT
4B93 C3AA4B         1 1308         JP   $+23         ;PATCHABLE BREAKPOINT
4B96 00000000       2 1309         DEFB 0,0,0,0,0,0,0,0,0,0
     00000000
     0000
4BA0 00000000       3 1310         DEFB 0,0,0,0,0,0,0,0,0,0
     00000000
     0000
4BAA 3A9441'      969 1312         LD   A,(HTOFLG)
4BAD B7           970 1313         OR   A
4BAE 2807         971 1314         JR   Z,BCK031-$
4BB0              972 1315         TERM 21H          ;ABORT  **21**
4BB0 3E21           1 1316         LD   A,21H
4BB2 D350           2 1317         OUT  (PIO),A
4BB4 76             3 1318         HALT
4BB5 18FD           4 1319         JR   -1
4BB7'F3           973 1321 BCK031  DI
4BB8 3E01         974 1322         LD   A,1
4BBA 329541'      975 1323         LD   (HTOBCT),A
4BBD 3C           976 1324         INC  A
4BBE 329441'      977 1325         LD   (HTOFLG),A
4BC1 3A9641'      978 1326         LD   A,(HTOSER)
4BC4 D360         979 1327         OUT  (SIO),A      ;FIRST CHARACTER
4BC6 AF           980 1328         XOR  A
4BC7 327341'      981 1329         LD   (HTIBCT),A
4BCA 327241'      982 1330         LD   (HTIFLG),A
4BCD FB           983 1331         EI
```

```
4BCE              984 1332          INCW NHOUT
4BCE E5             1 1333          PUSH HL
4BCF 2A6341'        2 1334          LD   HL,(NHOUT)
4BD2 23             3 1335          INC  HL
4BD3 226341'        4 1336          LD   (NHOUT),HL
4BD6 E1             5 1337          POP  HL
4BD7 C3644D'      985 1339          JP   BCK027
                                ;
     =4BDA'       987 1341 BCK030   EQU  $           ;BUILD REAL OUT MESSAGE
4BDA 3A7441'      988 1342          LD   A,(HTITYP)                          HTITYP + 1
4BDD FEFF         989 1343          CP   -1
4BDF 2027         990 1344          JR   NZ,BCK032-$ ;JP IF NOT FULL RESET
4BE1 2A8041'      991 1345          LD   HL,(HTITYP+12)
4BE4 110803       992 1346          LD   DE,0308H
4BE7 B7           993 1347          OR   A
4BE8 ED52         994 1348          SBC  HL,DE
4BEA 2017         995 1349          JR   NZ,BCK033-$ ;DUD
4BEC 2A8841'      996 1350          LD   HL,(HTITYP+20)
4BEF 110069       997 1351          LD   DE,6900H
4BF2 B7           998 1352          OR   A
4BF3 ED52         999 1353          SBC  HL,DE
4BF5 200C        1000 1354          JR   NZ,BCK033-$ ;DUD
4BF7 2A8C41'     1001 1355          LD   HL,(HTITYP+24)
4BFA 110434      1002 1356          LD   DE,3404H
4BFD B7          1003 1357          OR   A
4BFE ED52        1004 1358          SBC  HL,DE
4C00 CA0000      1005 1359          JP   Z,0         ;OK-COMPLETE RESET !! >>>>>>>
                                                      >>>
                                ;
4C03'3EB2        1007 1361 BCK033   LD   A,130       ;DUD CONST AND RESEND
4C05 C36A4B'     1008 1362          JP   HTOFMT
                                ;
4C08'FE01        1010 1364 BCK032   CP   1
4C0A CA174C'     1011 1365          JP   Z,BCK034    ;OID RESET
4C0D FE00        1012 1366          CP   0
4C0F CA874C'     1013 1367          JP   Z,BCK035    ;TRANS REQUEST
4C12 3E42        1014 1368          LD   A,66        ;INV TRANS TYPE AND RESEND
4C14 C36A4B'     1015 1369          JP   HTOFMT
4C17'3A7741'     1016 1370 BCK034   LD   A,(HTIPRT+1) ;OID S/C TO RESET
4C1A B7          1017 1371          OR   A
4C1B FA0A00      1018 1372          JP   M,BCK037-$  ;ERROR IF >127
4C1E 4F          1019 1373          LD   C,A
4C1F 3A8541'     1020 1374          LD   A,(HTI9+1)  ;REPEAT OD S/C
4C22 91          1021 1375          SUB  C
4C23 2805        1022 1376          JR   Z,BCK036-$  ;OK IF AGREE
4C25'3EB2        1023 1377 BCK037   LD   A,130
4C27 C36A4B'     1024 1378          JP   HTOFMT      ;DUD AND RESEND
4C2A'            1025 1379 BCK036   INCW NGHIN
4C2A E5             1 1380          PUSH HL
4C2B 2A5F41'        2 1381          LD   HL,(NGHIN)
4C2E 23             3 1382          INC  HL
4C2F 225F41'        4 1383          LD   (NGHIN),HL
4C32 E1             5 1384          POP  HL
4C33 79          1026 1386          LD   A,C         ;S/C NO TO RESET
```

```
4C34 F5        1027 1387        PUSH AF          ;NEEDED LATER *****
4C35 110060    1028 1388        LD   DE,TRANST
4C38 2A4B41'   1029 1389        LD   HL,(LSTRNO)
4C3B 29        1030 1390        ADD  HL,HL
4C3C 29        1031 1391        ADD  HL,HL
4C3D 29        1032 1392        ADD  HL,HL
                           ; HL NOW HAS ADDRESS OF TRANS SLOT
4C3E 77        1034 1394        LD   (HL),A
4C3F 23        1035 1395        INC  HL
4C40 F3        1036 1396        DI
4C41 3A4641'   1037 1397        LD   A,(CLOCK+1)
4C44 E603      1038 1398        AND  3
4C46 77        1039 1399        LD   (HL),A
4C47 23        1040 1400        INC  HL
4C48 3A4741'   1041 1401        LD   A,(CLOCK+2)
4C4B 77        1042 1402        LD   (HL),A
4C4C 23        1043 1403        INC  HL
4C4D 3A4841'   1044 1404        LD   A,(CLOCK+3)
4C50 77        1045 1405        LD   (HL),A
4C51 23        1046 1406        INC  HL
4C52 EB        1047 1407        EX   DE,HL
4C53 218641'   1048 1408        LD   HL,HTIHD    ;SIMULATED DATA
4C56 010400    1049 1409        LD   BC,4
4C59 EDB0      1050 1410        LDIR
4C5B           1051 1411        INCW LSTRNO
4C5B E5           1 1412        PUSH HL
4C5C 2A4B41'      2 1413        LD   HL,(LSTRNO)
4C[illegible]23   3 1414        INC  HL
4C60 224B41'      4 1415        LD   (LSTRNO),HL
4C63 E1           5 1416        POP  HL
4C64           1052 1418        DECW NLEFT
4C64 E5           1 1419        PUSH HL
4C65 2A4D41'      2 1420        LD   HL,(NLEFT)
4C68 2B           3 1421        DEC  HL
4C69 224D41'      4 1422        LD   (NLEFT),HL
4C6C E1           5 1423        POP  HL
4C6D F1        1053 1425        POP  AF          ;RECOVER S/C *****
4C6E 21005B    1054 1426        LD   HL,SUBCHS   ;S/C STATUS AREA
4C71 5F        1055 1427        LD   E,A
4C72 1600      1056 1428        LD   D,0
4C74 EB        1057 1429        EX   DE,HL
4C75 29        1058 1430        ADD  HL,HL
4C76 29        1059 1431        ADD  HL,HL
4C77 29        1060 1432        ADD  HL,HL
4C78 29        1061 1433        ADD  HL,HL
4C79 B7        1062 1434        OR   A
4C7A ED5A      1063 1435        ADC  HL,DE       ;ADDR OF S/C SLOT
4C7C AF        1064 1436        XOR  A
4C7D 0610      1065 1437        LD   B,16
4C7F'77        1066 1438 BK521  LD   (HL),A
4C80 23        1067 1439        INC  HL
4C81 10FC      1068 1440        DJNZ BK521-$     ;ZERO S/C SLOT
4C83 FB        1069 1441        EI
4C84 C3644D'   1070 1442        JP   HToFMT [crossed out: illegible]  ;DONE
```

```
                                ;
       =4CB7'   1072 1444 BCK035  EQU  $              ;TRANS REQUEST
  4CB7          1073 1445         BPT
  4CB7 C39E4C      1 1446         JP   $+23           ;PATCHABLE BREAKPOINT
  4CBA 00000000    2 1447         DEFB 0,0,0,0,0,0,0,0,0,0
       00000000
       0000
  4C94 00000000    3 1448         DEFB 0,0,0,0,0,0,0,0,0,0
       00000000
       0000
  4C9E          1074 1450         INCW NGHIN
  4C9E E5          1 1451         PUSH HL
  4C9F 2A5F41'     2 1452         LD   HL,(NGHIN)
  4CA2 23          3 1453         INC  HL
  4CA3 225F41'     4 1454         LD   (NGHIN),HL
  4CA6 E1          5 1455         POP  HL
  4CA7 2A7E41'  1075 1457         LD   HL,(HTITNO) ;REQUESTED TRANS
  4CAA 7C       1076 1458         LD   A,H
  4CAB 65       1077 1459         LD   H,L
  4CAC 6F       1078 1460         LD   L,A            ;GET INTO Z80 FORM
  4CAD E5       1079 1461         PUSH HL
  4CAE B7       1080 1462         OR   A
  4CAF 110000   1081 1463         LD   DE,0
  4CB2 ED52     1082 1464         SBC  HL,DE
  4CB4 E1       1083 1465         POP  HL
  4CB5 FABA4C'  1084 1466         JP   M,BCK040
  4CB8 2005     1085 1467         JR   NZ,BCK041-$
  4CBA'3E04     1086 1468 BCK040  LD   A,4
  4CBC C36A4B'  1087 1469         JP   HTOFMT         ;REQ FOR 0 OR -,MUST BE DUFF
                                ;
  4CBF'ED5B4B41' 1089 1471 BCK041 LD   DE,(LSTRNO)
  4CC3 E5       1090 1472         PUSH HL
  4CC4 B7       1091 1473         OR   A
  4CC5 EB       1092 1474         EX   DE,HL          ;LAST IN HL,REQ IN DE
  4CC6 ED52     1093 1475         SBC  HL,DE          ;0 OR + IS OK
  4CC8 E1       1094 1476         POP  HL
  4CC9 FABA4C'  1095 1477         JP   M,BCK040       ;GO OUT IF DUFF
  4CCC E5       1096 1478         PUSH HL
  4CCD ED5B4F41' 1097 1479        LD   DE,(HITRAN)
  4CD1 EB       1098 1480         EX   DE,HL
  4CD2 B7       1099 1481         OR   A
  4CD3 ED52     1100 1482         SBC  HL,DE          ;HL<- HITRAN-THIS
  4CD5 F2DD4C'  1101 1483         JP   P,ON717
  4CD8 E1       1102 1484         POP  HL
  4CD9 224F41'  1103 1485         LD   (HITRAN),HL ;NEW HIGHEST
  4CDC E5       1104 1486         PUSH HL
       =4CDD'   1105 1487 ON717   EQU  $
  4CDD CD5E42'  1106 1488         CALL HTOF           ;BUILD DEFAULT OUTBLOCK
  4CE0 11CE41'  1107 1489         LD   DE,CLKWK
  4CE3 214541'  1108 1490         LD   HL,CLOCK
  4CE6 010400   1109 1491         LD   BC,4
  4CE9 F3       1110 1492         DI
  4CEA EDB0     1111 1493         LDIR
  4CEC FB       1112 1494         EI                  ;GET CLOCK TO WORK AREA
```

```
4CED 110060      1113 1495          LD   DE,TRANST
4CF0 E1          1114 1496          POP  HL
4CF1 2B          1115 1497          DEC  HL
4CF2 29          1116 1498          ADD  HL,HL
4CF3 29          1117 1499          ADD  HL,HL
4CF4 29          1118 1500          ADD  HL,HL
4CF5 B7          1119 1501          OR   A
4CF6 ED5A        1120 1502          ADC  HL,DE        ;HL<-ADDR OF TRANSACTION SLOT
4CF8 11D241'     1121 1503          LD   DE,TRANWK
4CFB 010800      1122 1504          LD   BC,8
4CFE EDB0        1123 1505          LDIR              ;COPY TRAN TO WORKAREA
4D00 AF          1124 1506          XOR  A
4D01 32DA41'     1125 1507          LD   (TRNTWK),A
4D04 3AD341'     1126 1508          LD   A,(TRANWK+1)
4D07 E603        1127 1509          AND  3
4D09 32DB41'     1128 1510          LD   (TRNTWK+1),A
4D0C 2AD441'     1129 1511          LD   HL,(TRANWK+2)
4D0F 22DC41'     1130 1512          LD   (TRNTWK+2),HL ;COPY TRAN TIME TO TRNTWK
4D12 219D41'     1131 1513          LD   HL,HTOTIM+3
4D15 11D141'     1132 1514          LD   DE,CLKWK+3
4D18 B7          1133 1515          OR   A
4D19 0604        1134 1516          LD   B,4
4D1B 1A          1135 1517 BCK042   LD   A,(DE)
4D1C 4F          1136 1518          LD   C,A
4D1D 7E          1137 1519          LD   A,(HL)
4D1E 99          1138 1520          SBC  A,C
4D1F 77          1139 1521          LD   (HL),A
4D20 1B          1140 1522          DEC  DE
4D21 2B          1141 1523          DEC  HL
4D22 10F7        1142 1524          DJNZ BCK042-$     ;SUBTRACT CLOCK FROM HTO BLOC
                                                       K
4D24 219D41'     1143 1525          LD   HL,HTOTIM+3
4D27 11DD41'     1144 1526          LD   DE,TRNTWK+3
4[illegible] B7  1145 1527          OR   A
4D2B 0604        1146 1528          LD   B,4
4D2[illegible]A  1147 1529 BCK043   LD   A,(DE)
4D2[illegible]F  1148 1530          LD   C,A
4D2F 7E          1149 1531          LD   A,(HL)
4D30 89          1150 1532          ADC  A,C
4D31 77          1151 1533          LD   (HL),A
4D32 1B          1152 1534          DEC  DE
4D33 2B          1153 1535          DEC  HL
4D34 10F7        1154 1536          DJNZ BCK043-$     ;ADD TRANS RELATIVE TIME
                           ;NOW OUTBLOCK HAS ABSOLUTE TIME OF TRANSACTION
4D36 3AD241'     1156 1538          LD   A,(TRANWK)
4D39 329941'     1157 1539          LD   (HTOOID+1),A
4D3C AF          1158 1540          XOR  A
4D3D 329841'     1159 1541          LD   (HTOOID),A   ;COPY OID #
4D40 11A441'     1160 1542          LD   DE,HTOMS1
4D43 21D241'     1161 1543          LD   HL,TRANWK
4D46 010800      1162 1544          LD   BC,8
4D49 EDB0        1163 1545          LDIR              ;COPY ENTIRE SLOT
4D4B 21D341'     1164 1546          LD   HL,TRANWK+1
4D4E AF          1165 1547          XOR  A
```

```
4D4F CB6E       1166 1548         BIT  5,(HL)
4D51 2802       1167 1549         JR   Z,BCK044-$
4D53 CBDF       1168 1550         SET  3,A
4D55'CB66       1169 1551 BCK044  BIT  4,(HL)
4D57 2802       1170 1552         JR   Z,BCK045-$
4D59 CBE7       1171 1553         SET  4,A
4D5B'32AD41'    1172 1554 BCK045  LD   (HTOERC+1),A ;STORE ERROR CODE
4D5E CD4C42'    1173 1555         CALL HTOCSM
4D61 C3934B'    1174 1556         JP   SEND         ;TRANSMIT IT !

                          ;
       =4D64'   1177 1559 BCK027  EQU  $            ;NOW PERFORM DIAGNOSTIC LOGOU
                                                    T
4D64            1178 1560         BPT
4D64 C37B4D        1 1561         JP   $+23         ;PATCHABLE BREAKPOINT
4D67 00000000      2 1562         DEFB 0,0,0,0,0,0,0,0,0,0
     00000000
     0000
4D71 00000000      3 1563         DEFB 0,0,0,0,0,0,0,0,0,0
     00000000
     0000
4D7B DB52       1179 1565         IN   A,(PIO1+2)   ;SWITCHES
4D7D FEFF       1180 1566         CP   0FFH
4D7F 280A       1181 1567         JR   Z,DDT-$
4D81 210041     1182 1568         LD   HL,VARST
4D84 6F         1183 1569         LD   L,A
4D85 7E         1184 1570         LD   A,(HL)
4D86 D350       1185 1571         OUT  (PIO1),A
                          ;
4D88 C30048'    1187 1573         JP   BCKGND       ;ROUND LOOP AGAIN
                          ;
4D8B'F5         1189 1575 DDT     PUSH AF
4D8C C5         1190 1576         PUSH BC
4D8D D5         1191 1577         PUSH DE
4D8E E5         1192 1578         PUSH HL
4D8F DDE5       1193 1579         PUSH IX
4D91 FDE5       1194 1580         PUSH IY
4D93 215A5A     1195 1581         LD   HL,5A5AH
4D96 E5         1196 1582         PUSH HL
4D97 C300E0     1197 1583         JP   0E000H       ;>>>>DDT
4D9A            1198 1584         END
  ACD    '  4144  148    1061#1187#1251
BCK002 '  4846  875    873
BCK003 '  4850  879    877
BCK004 '  485A  883    881
BCK005 '  4864  887    885
BCK006 '  4879  902    906
BCK007 '  487E  905    903
BCK008 '  488B  912    910
BCK009 '  489B  919    915
BCK010 '  48A3  925    921
BCK011 '  48AE  931    927
BCK012 '  48B9  937    933
BCK013 '  48CB  945    943
```

```
BCK014  '  48EB  959    951
BCK015  '  48D2  948    960
BCK016  '  497A  1035   967
BCK017  '  498A  1047   977  990  993 1009
BCK018  '  491A  985    983
BCK019  '  4914  982    985
BCK020  '  49B3  1065   1038
BCK021  '  49DA  1080   1076 1078
BCK022  '  4A4B  1140   1114 1117 1133
BCK023  '  4A43  1134   1120 1123 1126
BCK024  '  4ADE  1219   1190
BCK025  '  4AE7  1226   1207 1209 1218
BCK026  '  4B1B  1249   1247
BCK027  '  4D64  1559   1275 1339 1442
BCK028  '  4B5E  1281   1286
BCK029  '  4B68  1289   1283
BCK030  '  4BDA  1341   1287
BCK031  '  4BB7  1321   1314
BCK032  '  4C08  1364   1344
BCK033  '  4C03  1361   1349 1354
BCK034  '  4C17  1370   1365
BCK035  '  4C87  1444   1367
BCK036  '  4C2A  1379   1376
BCK037  '  4C25  1377   1372
BCK040  '  4CBA  1468   1466 1477
BCK041  '  4CBF  1471   1467
BCK042  '  4D1B  1517   1524
BCK043  '  4D2D  1529   1536
BCK044  '  4D55  1551   1549
BCK045  '  4D5B  1554   1552
BCK046  '  4B31  1268   848
BCK047  '  4AF9  1240   1063
BCKGND  '  4800  840    591 1573
BK521   '  4C7F  1438   1440
BOTSTK  '  406D  138    363  365  370
BPT    M   0113  21     420  479  542  548  557  564  579  586  841 1048 1066
                        1141 1240 1268 1292 1307 1445 1560
CELL    '  4142  146    1110#1134 1138#1175 1180 1198
CHKSM1  '  421C  271    269
CHKSUM  '  4200  254    312 1277
CLKWK   '  41CE  224    1489 1514
CLOCK   '  4145  149    597 1159 1163 1166 1397 1401 1404 1490
CONT    '  4020  91
CSTATE  '  4141  145    1098#1112
CTC        007C  69     403  406  410  414  418
CTCVEC  '  4020  93     401
DDT     '  4D8B  1575   1567
DECW   M   1212  33     1233 1418
ECC     '  4231  287    948
ECC1    '  423A  296    302
ECC2    '  4242  302    300
ENDVAR  '  41DE  228    363  370
FBIT    '  4948  1008   1007#
FILL   M   2810  50     360  373  386  856 1253
```

```
HITRAN ' 414F  154   324 1479 1485*
HTI12  ' 418A  190
HTI13  ' 418C  191
HTI14  ' 418E  192
HTI5   ' 417C  183
HTI7   ' 4180  185
HTI8   ' 4182  186
HTI9   ' 4184  187  1374
HTIBCT ' 4173  179   636  668*1329*
HTICK1 ' 4190  193  1279
HTICK2 ' 4192  194
HTIFLG ' 4172  178   625  635*  672*1273 1330*
HTIHD  ' 4186  188  1408
HTILD  ' 4188  189
HTIPRT ' 4176  181  1370
HTITIM ' 4178  182   328
HTITNO ' 417E  184  1457
HTITYP ' 4174  180   638 1276 1342 1345 1350 1355
HTOBCT ' 4195  198   739  755*1323*
HTOCK1 ' 41B2  212   314
HTOCK2 ' 41B4  213
HTOCSM ' 424C  310  1299 1555
HTOERC ' 41AC  209   338  347*1297*1554*
HTOF   ' 425E  319  1298 1488
HTOF1  ' 429B  343   345
HTOFLG ' 4194  197   730  754*1312 1325*
HTOFMT ' 4B6A 1292  1362 1369 1378 1469
HTOHD  ' 41A8  207
HTOHTS ' 419E  202
HTOLD  ' 41AA  208
HTOLTM ' 41A0  203
HTOMS1 ' 41A4  205   340 1542
HTOMS2 ' 41A6  206
HTONFS ' 41A2  204
HTOOID ' 4198  200   322*1539*1541*
HTORS1 ' 41AE  210
HTORS2 ' 41B0  211
HTOSER ' 4196  199   311  323  741 1326
HTOTIM ' 419A  201   327 1513 1525
INCK1  ' 41BA  217   273  313 1278
INCK2  ' 41BC  218
INCM   M 0117   26   617  703  765  816  849  968 1027 1039 1053 1191 1219
                    1226 1300 1332 1379 1411 1450
LOOP   M 010F   13
LSTRNO ' 414B  151   332 1148 1228 1230*1389 1413 1415*1471
MASK0  ' 4059  130   947
MASK1  ' 405D  131
MASK2  ' 4061  132
M      ' 4065  133
MASK4  ' 4069  134
MINLIS   F2A4   77    94
MSDATA ' 4168  171   295  869  889  912  919  925  931  941 1012 1036 1071
                    1118 1121 1124 1127 1171 1211 1256 1263
MSIBCT ' 4166  169   783  795*
```

| | | | | |
|---|---|---|---|---|
| MSIFLG | ' | 4165 | 168 | 772 782* 799* 846 1256 1258 1263 |
| MSISCH | ' | 4167 | 170 | 785 1081 |
| MSOACK | ' | 4171 | 175 | |
| MSOFLG | ' | 4170 | 174 | 823 833*1245 1250* |
| NBHIN | ' | 4161 | 164 | 1302 1304* |
| NGHIN | ' | 415F | 163 | 1381 1383*1452 1454* |
| NGOOD | ' | 4159 | 159 | 1193 1195* |
| NHOUT | ' | 4163 | 165 | 1334 1336* |
| NLEFT | ' | 414D | 153 | 335 1235 1237*1420 1422* |
| NLOGER | ' | 415D | 161 | 1221 1223* |
| NMISTA | ' | 4149 | 150 | |
| NPEINI | ' | 4155 | 157 | 970 972* |
| NPERCO | ' | 4157 | 158 | 1029 1031* |
| NPERTO | ' | 4153 | 156 | 1041 1043* |
| NPHYER | ' | 415B | 160 | 1055 1057* |
| NREADS | ' | 4151 | 155 | 851 853* |
| NSLOTS | ' | 4043 | 119 | |
| ON448 | ' | 4ACB | 1208 | 1202 |
| ON717 | ' | 4CDD | 1487 | 1483 |
| ONESEC | ' | 444D | 595 | 96 |
| ORIGIN | ' | 4000 | 89 | 356 |
| OUTN | M | 280A | 46 | 404 408 412 416 426 433 437 441 445 449 453 |
| | | | | 457 467 471 475 485 489 493 500 504 508 512 |
| | | | | 516 520 524 528 534 538 684 714 |
| PARWK | ' | 41C6 | 223 | 376 376 378 383 383 399 859 859 861 866 866 |
| PARWKL | | 0008 | 84 | 223 376 383 859 866 |
| PIAICT | ' | 41C2 | 221 | 767 769* |
| PIAIN | ' | 4538 | 762 | 109 |
| PIAIN1 | ' | 4552 | 781 | 774 |
| PIAIN2 | ' | 4575 | 800 | 797 |
| PIAOCT | ' | 41C4 | 222 | 807 810 814* 818 820* |
| PIAOU1 | ' | 45A6 | 832 | 815 825 |
| PIAOU2 | ' | 458F | 816 | 809 812 |
| PIAOUT | ' | 457B | 806 | 108 |
| PIAVEC | ' | 4038 | 108 | 461 |
| PIO | | 0050 | 71 | 113 630 649 661 695 725 735 777 828 1317 |
| PIO1 | | 0050 | 72 | 428 430 435 439 443 447 1565 1571 |
| PIO2 | | 0054 | 73 | 431 432 451 455 459 463 466 469 473 477 585 |
| | | | | 791 1252 |
| PIO2A | | 0054 | 74 | 236 244 |
| PIO2B | | 0056 | 75 | 233 241 247 249 251 563 570 577 |
| SEND | ' | 4B93 | 1307 | 1556 |
| SETB | ' | 48E4 | 958 | 957* |
| SETIN | ' | 496C | 1023 | 1022* |
| SIAIST | ' | 41B6 | 215 | 644 680 |
| SIAOST | ' | 41B8 | 216 | 710 720 |
| SIARC1 | ' | 44B2 | 634 | 627 |
| SIARC2 | ' | 44C0 | 673 | 670 |
| SIARC3 | ' | 44A2 | 653 | 646 |
| SIARC4 | ' | 44B2 | 665 | 658 |
| SIARCA | ' | 4465 | 614 | 105 |
| SIARCT | ' | 41BE | 219 | 619 621* |
| SIASRC | ' | 44D5 | 692 | 106 |
| SIASTS | ' | 44C6 | 680 | 624 692 |

```
SIATBE '  44DF  700   103
SIATCT '  41C0  220   705  707*
SIO       0060   70   487  491  495  499  502  506  510  514  518  522  526
                      530  536  540  654  656  681  686  688  711  716  718
                      748 1327
SIOTB1 '  4515  739   732
SIOTB2 '  452F  755   752
SIOTB3 '  4507  729   722
SIOVEC '  4028   98   497
SLOTS     0C00   81   119  153
SQ2    '  41E9  239   245
SQLD   '  41DE  232   555
SQLOD  '  43C9  553
STABLE '  4045  123  1107
START  '  42A7  353    89
SUBCHA '  4143  147  1084*1146
SUBCHS    5800   83   389  391  396 1087 1426
TERM   M  2806   40   111  628  647  659  693  723  733  775  826 1315
TOPSTK '  4140  143   359
TRANEN    BFFF   80   389  396
TRANST    6000   79  1147 1388 1495
TRANWK '  41D2  225  1503 1508 1511 1538 1543 1546
TRAP   '  403C  111    93   95   98   99  100  101  104
TRNTWK '  41DA  226  1507*1510*1512*1526
TYPE   '  4140  144  1080*1100 1115
V645   '  4B30 1266  1248
VARST     4100   85   141 1568
WAIT   M  0118    5
X1004  '  4411  574   575
X908   '  43CF  555   556
```

We claim:

1. An operator input device (OID) for use in a system of production or work control, comprising a card reader for scanning a card to ticket bearing encoded data when said card is placed in the card reader and generating electrical signals representative of said encoded data, a cable for supply low-voltage external electrical power to the OID over a pair of electrical lines, pulse train-generating-circuitry responsive to the card reader output signals to derive a stream of pulses of at least two different durations representing the encoded data, said pulse train-generating circuitry taking its electrical supply from said pair of lines, and short-circuiting means powered from said pair of lines and responsive to said stream of pulses to substantially reduce the ohmic resistance between said lines for a succession of time periods corresponding to the time durations of said pulses, whereby the data from the card or ticket is transmitted by the OID on the same cable pair as suupplies the OID with its electrical power, each said card or ticket bearing two parallel bar code tracks, the first being a clock track of regularly spaced thin bars, and the second a data track having either a thick bar or a space opposite each thin bar bit of the clock track to indicate ones and zeroes, said scanning means comprising a first emitter/-receiver combination scanning the clock track and a second emitter/receiver combination scanning the data track.

2. An OID according to claim 1, wherein said short-circuiting means is driven by an optical isolator having a radiation emitter to which said stream of pulses is applied, and a receiver responsive to the radiation from said emitter and electrically isolated therefrom.

3. An OID according to claim 2, wherein said emitter is a light-emitting diode fed by a switching transistor to which the pulse stream is applied, said receiver is a photo-transistor, and said short-circuiting means is a switching transistor connected as a Darlington pair with said photo-transistor.

4. An OID according to claim 3, wherein each emitter/receiver combination comprises an infra red emitting diode and a photo-transistor.

5. An OID according to claim 3, further comprising audio response means which is energized by the external power supply cable when the polarity of the voltage on the cable line pair is reversed.

6. An OID according to claim 5, wherein the OID circuits associated with the scanning emitter/receivers, generating the pulse stream and feeding the emitter diode of the optical isolator are powered from lines maintained at a predetermined voltage by a storage capacitor and voltage regulator, the storage capacitor on the one hand and the audio response means on the other hand being supplied from the common line pair of the external supply cable via reversely poled isolating diodes.

7. An OID according to claim 1, comprising two monostable circuits having different time period to generate pulses of different widths, and logic circuity responsive to the signals from the receivers of the scanning emitter/receivers to direct each clock bit to the triggering input of one or other of the monostable circuits according to whether the data track is simultaneously showing a bar or a space.

8. An OID according to claim 7, comprising gating means receiving the outputs of the two monostable circuits and providing the stream of pulses that is applied to the transistor feeding the light-emitting diode of the optical isolator.

9. An OID according to claim 1, further comprising visual response means which is energized by the external power supply cable when the polarity of the voltage on the cable line pair is reversed.

10. An OID according to claim 9, wherein the OID circuits associated with the scanning emitter/receivers, generating the pulse stream and feeding the emitter diode of the optical isolator are powered from lines maintained at a predetermiend voltage by a storage capacitor and voltage regulator, the storage capacitor on the one hand and the visual response means on the other hand being supplied from the common line pair of the external supply cable via reversely poled isolating diodes.

11. A production or work control system for a works environment, comprising a multiplicity of operator input devices (OIDs) situated at the work stations of human operatives and each having a card reader; and a multiplexor/concentrator consisting of the combination of a microcomputer and a microprocessor, the microprocessor comprising a microsequencer repeatedly scanning the OIDs in a continuous operation to acquire data therefrom which is passed to the microcomputer, the microcomputer carrying out validity checking on the data input from the OIDs by the microsequencer, storing good data in short-term store and returning to the microsequencer signals indicative of the validity of each data input consequent upon a card reading at an OID, the microsequencer returning to the individual OIDs the signals indicative of the validity of their data inputs, and the microcomputer having input and output ports for communication with a host computer, such as a minicomputer.

12. A system according to claim 11 wherein the microprocessor/microsequencer is a bipolar bit-slicing microprocessor of the single-level pipelined type.

13. A system according to claim 12, wherein the microcomputer is a Z80 computer board.

14. A system according to claim 11, wherein the microsequencer communicates with the multiplicity of OIDs via a group of channels each of which services a respective group of sub-channels, there being an individual sub-channel for each OID.

15. A system according to claim 11, wherein the card reader of each OID reads bar code tracks printed on cards or tickets passed through the card reader by the operative.

16. A system according to claim 15, wherein there are three types of card or ticket:

(i) operator cards or badges identifying individual operatives (ii) operation cards indicating particular work operations being performed (iii) job lot cards to tickets identifying batches of work.

17. A system according to claim 11, wherein the communication between an OID and a respective sub-channel of the microsequencer is via a single twisted pair cable over which the OID also receives its power supply at a safe voltage parasitically from the microsequencer.

18. A system according to claim 11, wherein the microsequencer supplies power to each individual OID by maintaining a voltage on a respective pair of lines, and the OID communicates data to the microsequencer by substantially reduce the ohmic resistance between said lines temporarily for pulse periods having two different time durations.

19. A system according to claim 18, wherein after receiving the data on a card read by an OID the microsequencer transmits the signals from the microcomputer indicative of the validity of the data to the respective OID by pulses generated by momentarily reversing the polarity of the power lines.

20. A system according to claim 11, wherein the validity checking of data from an individual OID includes a check as to whether the operative at the work station of the OID has inserted a plurality of different cards in the card reader in the correct order.

* * * * *